(12) United States Patent
O'Brien

(10) Patent No.: US 10,906,379 B1
(45) Date of Patent: Feb. 2, 2021

(54) COMPACT AIR CONDITIONING APPARATUS, CORD HARNESS AND METHOD OF USE THEREOF

(71) Applicant: TSI Products, Inc., Arlington, TX (US)

(72) Inventor: Stephen William O'Brien, Fort Worth, TX (US)

(73) Assignee: TSI Products, Inc., Arlington, TX (US)

( * ) Notice: Subject to any disclaimer, the term of this patent is extended or adjusted under 35 U.S.C. 154(b) by 475 days.

(21) Appl. No.: 15/810,717

(22) Filed: Nov. 13, 2017

Related U.S. Application Data

(60) Provisional application No. 62/427,668, filed on Nov. 29, 2016, provisional application No. 62/430,330,
(Continued)

(51) Int. Cl.
*B60H 1/22* (2006.01)
*B60H 1/00* (2006.01)

(52) U.S. Cl.
CPC ....... *B60H 1/2225* (2013.01); *B60H 1/00464* (2013.01); *B60H 2001/229* (2013.01); *B60H 2001/2281* (2013.01)

(58) Field of Classification Search
CPC .............. B60H 1/2225; B60H 1/00464; B60H 2001/2281; B60H 2001/229;
(Continued)

(56) References Cited

U.S. PATENT DOCUMENTS

| 4,242,567 A | 12/1980 | Carter |
| 4,878,038 A | 10/1989 | Tsai |

(Continued)

FOREIGN PATENT DOCUMENTS

| EP | 2741568 A1 | 6/2014 |
| WO | 2016079054 A1 | 5/2016 |

OTHER PUBLICATIONS

Climate Caddy, posted at Climatecaddy.com, posted on Sep. 22, 2017, [online], [site visited Sep. 22, 2017]. Available from Internet, http://webcache.googleusercontent.com/search?q=cache:climatecaddy.com>.

(Continued)

*Primary Examiner* — Shawntina T Fuqua

(74) *Attorney, Agent, or Firm* — Hitchcock Evert LLP

(57) ABSTRACT

A compact air conditioning apparatus and supporting assembly for electric vehicle and other battery driven applications, and a cord harness for sheathing a power cord. The air conditioning apparatus may include a PTC heater array with stacked PTC heaters with a fan blowing air through the PTC heater array to raise air temperature. The apparatus includes power management features to limit the power consumption, such as staggered PTC heater start-up, a user presence detector and battery threshold monitoring. The air conditioning apparatus may include cooling components to lower air temperature. The cord harness including a series of guard sections and hinges facilitating a foldable protective design for wiring. The air conditioning apparatus may attach to a supporting assembly configured to fit in a cupholder. The supporting assembly may be configured to fit multiple cupholder designs. The air conditioning apparatus and supporting assembly may include additional accessory components.

20 Claims, 34 Drawing Sheets

Related U.S. Application Data filed on Dec. 5, 2016, provisional application No. 62/481,896, filed on Apr. 5, 2017.

(58) Field of Classification Search
CPC .... F24H 9/1872; F24H 9/2071; F24H 3/0411; F24H 3/0417; F24H 3/0423; F24H 3/0429; F24H 3/0435
See application file for complete search history.

(56) References Cited

U.S. PATENT DOCUMENTS

| | | | |
|---|---|---|---|
| 5,079,798 A | 1/1992 | Burke et al. | |
| 5,412,842 A | 5/1995 | Riblett | |
| 5,422,461 A | 6/1995 | Weiss et al. | |
| D372,852 S | 8/1996 | Noll et al. | |
| 5,808,538 A | 9/1998 | Nguyen | |
| 5,992,231 A | 7/1999 | Karst et al. | |
| D415,112 S | 10/1999 | Henry | |
| D415,471 S | 10/1999 | Henry | |
| 6,136,280 A | 10/2000 | Golan et al. | |
| 6,161,373 A | 12/2000 | Heidrich et al. | |
| D436,515 S | 1/2001 | Sonntag | |
| 6,202,565 B1 | 3/2001 | Henry | |
| 6,262,400 B1 | 7/2001 | Urbank et al. | |
| 6,355,912 B2 | 3/2002 | Allard | |
| 7,001,538 B2 | 2/2006 | Lee et al. | |
| D531,020 S | 10/2006 | Chustak | |
| 7,659,492 B2 | 2/2010 | Etzkorn et al. | |
| D618,623 S | 6/2010 | Peng | |
| D649,009 S | 11/2011 | Caffin et al. | |
| 8,151,414 B2 | 4/2012 | Baudasse et al. | |
| 8,164,911 B2 | 4/2012 | Hassler | |
| 8,170,406 B2 | 5/2012 | Wu | |
| D661,173 S | 6/2012 | Caffin et al. | |
| 8,235,686 B2 | 8/2012 | Wark | |
| 8,309,894 B2 | 11/2012 | Zimmer et al. | |
| D673,024 S | 12/2012 | Caffin et al. | |
| D679,570 S | 4/2013 | Farnsworth et al. | |
| D699,093 S | 2/2014 | Farnsworth et al. | |
| D716,237 S | 10/2014 | Baldwin et al. | |
| D717,248 S | 11/2014 | Coffman et al. | |
| 8,961,152 B2 | 2/2015 | Wark et al. | |
| D735,251 S | 7/2015 | Jeon et al. | |
| 9,198,231 B2 | 11/2015 | Nagasaka et al. | |
| D748,451 S | 2/2016 | Tung | |
| 9,334,872 B2 | 5/2016 | Wark | |
| D763,414 S | 8/2016 | Allin | |
| D765,603 S | 9/2016 | Baldwin et al. | |
| D765,604 S | 9/2016 | Baldwin et al. | |
| D783,533 S | 4/2017 | Tress et al. | |
| D789,172 S | 6/2017 | Tomizawa et al. | |
| D789,302 S | 6/2017 | Hsu et al. | |
| D790,325 S | 6/2017 | Gupta | |
| D791,079 S | 7/2017 | Todoverto et al. | |
| D791,576 S | 7/2017 | Holmes | |
| 9,831,615 B2 | 11/2017 | Saito et al. | |
| D873,205 S | 1/2020 | MacNeil et al. | |
| 2006/0182429 A1* | 8/2006 | Shapiro | F24H 3/0411 392/365 |
| 2006/0263073 A1* | 11/2006 | Clarke | F24H 9/2071 392/347 |
| 2009/0020305 A1 | 1/2009 | Fidler | |
| 2009/0096118 A1* | 4/2009 | Brown | F24F 6/04 261/128 |
| 2016/0290438 A1 | 10/2016 | Komiya | |
| 2017/0165877 A1 | 6/2017 | Hanson | |
| 2017/0207612 A1 | 7/2017 | Handler | |

OTHER PUBLICATIONS

Drop Trak Cable, posted at Amazon.com, posted on Oct. 24, 2014, [online], [site visited on Sep. 24, 2017]. Available from Internet, <https://www.amazon.com/Drop-Trak-Cable-Hose-Protector/dp/B01L9PWW6O>.

Dobravel Proteccao, posted at Pt.made-in-china.com, posted on Aug. 23, 2017, [online], [site visited Sep. 24, 2017]. Available from Internet, <http://pt.made-in-china.com/co_zjeastsea/product_17mm-Channel-Collapsible-Floor-Cable-Protection_eooshsneg.html>.

Cellet, Car Cup Holder Mount, posted at Amazon.com, [online], [site visited May 11, 2017]. Available from Internet, <https://www.amazon.com/Adjustable%ADiPhones%ADSmartphones%ADPlayers%ADSystems/dp/B006BIQBMQ>.

Electric Golf Cart Heaters from PSC Inc., Golfcartheaters.biz website, http://Golfcartheaters.biz, as printed Oct. 31, 2017 and a copy as saved by web.archive.org on Oct. 28, 2016.

E-Z-GO Heater-Defroster 48V Kit, EZGO website, https://shop.ezgo.com/products/Heater%2540dDefroster-Kit%2540c-48-Volt.html?product_id=4255, as printed Oct. 31, 2017 and a copy as saved by web.archive.org on Aug. 5, 2016.

Golf Cart Heaters, Frugal Dougal's Golf Cart Accessories website, http://www.frugaldougalsgolf.com/heater#.VSqN4v_bJD8, as printed Oct. 31, 2017a copy of http://www.frugaldougalsgolf.com/heater, as saved by web.archive.org on Oct. 8, 2016.

Heaters & Fans, Golf Cart Trader website, http://www.golfcarttrader.com/Heater_Fan_Pics_/Heaters_Fans.htm, as printed Oct. 31, 2017and a copy as saved by web.archive.org on Nov. 1, 2016.

Golf Heater—heatercraft, Heatercraft website, https://heatercraft.com/products/copy-of-off-road-automotive-heaters, as printed Oct. 31, 2017 and a copy as saved by web.archive.org on Jan. 4, 2016.

* cited by examiner

COMPACT AIR CONDITIONING APPARATUS, CORD HARNESS AND METHOD OF USE THEREOF

CROSS-REFERENCE TO RELATED APPLICATION

This application claims the benefit of priority from U.S. Provisional Application Nos. 62/427,668 filed on Nov. 29, 2016, 62/430,330 filed on Dec. 5, 2016 and 62/481,896 filed on Apr. 5, 2017, which are incorporated herein by reference.

FIELD OF THE DISCLOSURE

The invention relates generally to the field of heating and cooling devices.

BACKGROUND

Heaters or fans have been mounted within vehicles that do not have integrated heating and air conditioning systems in order to provide comfort to the user. The heaters often provide insufficient heat to the people in the vehicle. The insufficient heating capability is especially prevalent in open air vehicles, such as golf carts, off-road vehicles, boats, tractors, etc. As such, heaters for use in these vehicles are often large and bulky in order to provide more heat.

In addition, the heaters draw a significant amount of power from the vehicle battery in order to operate. Electric vehicles that operate on a limited battery charge, such as golf carts, must be recharged when the battery charge level falls below a minimum charge. When electric heaters or air conditioners draw a significant amount of power from the vehicle battery for operation, the charge of the battery drops faster and requires the battery to be charged more frequently.

SUMMARY

The present disclosure provides an apparatus for improved heating and/or air conditioning a vehicle. The apparatus provides efficient heating and/or cooling while maintaining a compact design that allows for embodiments of the apparatus to be portable. The apparatus may be used in vehicles including but not limited to all-terrain vehicles (ATVs), boats, snow mobiles, tractors, farm equipment, motorcycles, golf carts, electric vehicles, etc. While the apparatus is discussed in the context of vehicles, embodiments of the apparatus may also be used in other apparatuses and environments, such as construction.

Embodiments of the apparatus include a housing that includes a fan located near the back and outlet openings at and/or around the front of the housing, wherein during operation the fan causes air to flow through the housing from the back to the front and out through the outlet openings. Embodiments of the apparatus include a controlled heating component within the housing between the fan and the outlet openings. The heating component heats the air passing through the housing.

Embodiments of the apparatus include one or more support elements for holding the housing in place. Supporting elements may be fixed mounting components in some embodiments for attaching the housing to a structural component. In other embodiments, the supporting elements may be a base element that may be placed in a cupholder or other available area in the vehicle. In some embodiments, the supporting elements may include mounting elements and base elements. The housing may include a structure operable to connect to different types of supporting elements. In addition, some embodiments of the supporting elements may include adjustable elements to fit structures having different sizes. Some embodiments of supporting elements also allow adjustment features to modify the orientation of the apparatus.

In some embodiments, the apparatus includes a plurality of compact heating components with a control circuit or control module to manage the operation of the compact heating components. The compact heating components are positive thermal coefficient (PTC) heaters in some embodiments. As electricity is applied to a PTC material, the material heats up causing an increase in electrical resistance reducing the flow of current effectively creating a heat threshold for a given applied voltage. Accordingly, when a voltage is applied to a PTC heater a high current inrush occurs as the material heats up then reduces significantly to an operational flow of current once the heat threshold is reached based on the high electric resistance of the material.

In some embodiments, the plurality of compact heating components include at least two compact heating elements stacked with one in front of the other along the housing axis from the back to the front of the housing. In some embodiments, there are six compact heating components with two rows of three compact heating components stacked along the back to front axis of the housing.

During operation of some embodiments having a plurality of stacked PTC heaters, the control module operates to manage the inrush current to the PTC heaters. The control module also may manage the power consumption of the plurality of PTC heaters. In some embodiments, the control circuit uses pulse width modulation (PWM) techniques to manage the current and voltage to the PTC heaters. Embodiments may stagger the start-up of PTC heaters to manage the inrush current. In some embodiments having a plurality of stacked PTC heaters, the control module will turn on a first row of PTC heaters separate from a second row of PTC heaters.

Some embodiments of the apparatus incorporate one or more power management features. Power management features may include an operator detection system in some embodiments. The operator detection system determines whether a person is present and turns the apparatus off and on depending on whether a person is present. The operator detection system may include a sensor, such as an optical sensor, that determines whether a person is within a specific range of the sensor.

In some embodiments, the power management feature is a limitation on high heat options. For example, the control circuit may only operate at a high heat setting for a limited amount of time and then operate at a lower heat setting. Embodiments of the power management features may include battery monitoring and device shut-off features. For example, the control circuit may shut off the apparatus and/or features thereof when the battery charge level reaches a minimum threshold level.

Some embodiments of the apparatus include cooling features. In some embodiments, the fan may provide a cooling airflow when the heat components are not activated. The cooling features may include a misting feature to provide a mist of water with air from the fan. In some embodiments, the cooling features may be integrated in a structure that can fit in the housing in place of the heating component. In some embodiments, the heating and cooling features are integrated in the same device. Some of the cooling features may be located in a supporting component in some embodiment.

In some embodiments, the housing and supporting elements are configured to fit in limited spaces available. For example, the supporting elements and housing may be configured to fit in a cupholder of a golf cart with sufficient clearance between the back of the housing and the golf cart dash while having an appropriate angle to direct the air output of the device to one or more seat locations in the golf cart.

In some embodiments for an electric vehicle, the heating and/or cooling device is powered by the vehicle's internal battery via a cord. The cord may be integrated into a harness to protect the cord while holding it safely in place in some embodiments. Such a harness may also cover the cord in a manner to prevent or limit the likelihood of someone tripping over the cord. In some embodiments, the harness may snap into a locked position to prevent curling or other affects that may cause the harness or wiring cord to separate from the floor. Embodiments may also be configured to allow the harness to hold the cord against the front frame of a seat. In such embodiments, the harness may include a variable extension allowing the harness to fit different heights of a frame. In some embodiments, a cord harness assembly is designed to provide a protective sheath to a power cord and will fold into and out of a folded state.

Some embodiments include a supporting element configured to be secured in a cupholder. The supporting element may be designed to fit a variety of cupholder sizes with an upper portion large enough to cover the top of a variety of cupholders and variable height configuration. The supporting element may include an upper structure that may facilitate a connection with the heating and/or cooling device and a lower structure configured to engage with the upper portion during use.

In some embodiments, the bottom section of the upper structure may include a spline or series of ribs which correspond with protrusions or teeth at the top of the lower structure facilitating a friction connection. In some embodiments, the connection between the spline and protrusions will hold the upper and lower structures in place relative to one another unless a sufficient force overcoming the connection is applied. For example, a downward force on the upper structure will cause the upper and lower structure to vertically compact reducing the height of the supporting element. A connector such as a bolt may pass from below the cupholder to the bottom of the lower structure to secure the supporting element to the cupholder. In some embodiments, tightening the bolt will cause the center of the lower structure to pull downward and pull the upper portion of the lower structure (with the teeth) to pull inward causing a tighter connection with the ribs of the upper structure.

In some embodiments, the base structure may include a foot component configured to fit around the bottom of the base structure and within the cupholder. The foot component may be configured to facilitate a connection between the cupholder and the base structure. In some embodiments, the foot component includes a plurality of flexible protrusions that are configured to compress to fit different size cupholders. In some embodiments, the foot component includes a lip that protrudes outward to engage the interior walls of a cupholder. In some embodiments, the foot component is cylindrical in shape. Other embodiments may be conical in shape. In some embodiments, the sides of the foot component expand outward when the base is installed in a cupholder. The foot component may be configured of flexible materials and/or materials with a high friction coefficient.

Some embodiments of the supporting assembly include accessory components. Embodiments may include speakers, charging apparatus, device holders, cupholders and/or other accessory features. In some embodiments, the multiple accessory components may be attached to the base structure and/or arm attachment element of the supporting structure. In some embodiments, the speaker may be configured to attach to the frame of another accessory component which connects to the attachment arm. In some embodiments, the device holder and/or cupholder may include a bracket that connects to the supporting assembly and supports the device holder or cupholder to a side of the apparatus. In some embodiments, the cupholder may include features to hold different size cups, such as flexible arms extending inwardly.

A BRIEF DESCRIPTION OF THE DRAWINGS

Embodiments will now be described, by way of example only, with references to the accompanying drawings in which.

DETAILED DESCRIPTION

While this invention may be embodied in many different forms, there will herein be described in detail preferred embodiments of the invention with the understanding that the present disclosure is to be considered as an exemplification of the principles of the invention and is not intended to limit the broad aspects of the invention to the embodiments illustrated. As used herein, the terms "and", "or" and "and/or" may be used interchangeably. It will be understood that the invention may be embodied in other specific forms without departing from the spirit or central characteristics thereof. The present embodiments, therefore, are to be considered in all respects as illustrative and not restrictive, and the invention is not to be limited to the details given herein. As used herein, air conditioning may refer to conditioning of the air by heating, cooling, modifying speed of the airflow and/or other conditioning.

Figure 1:
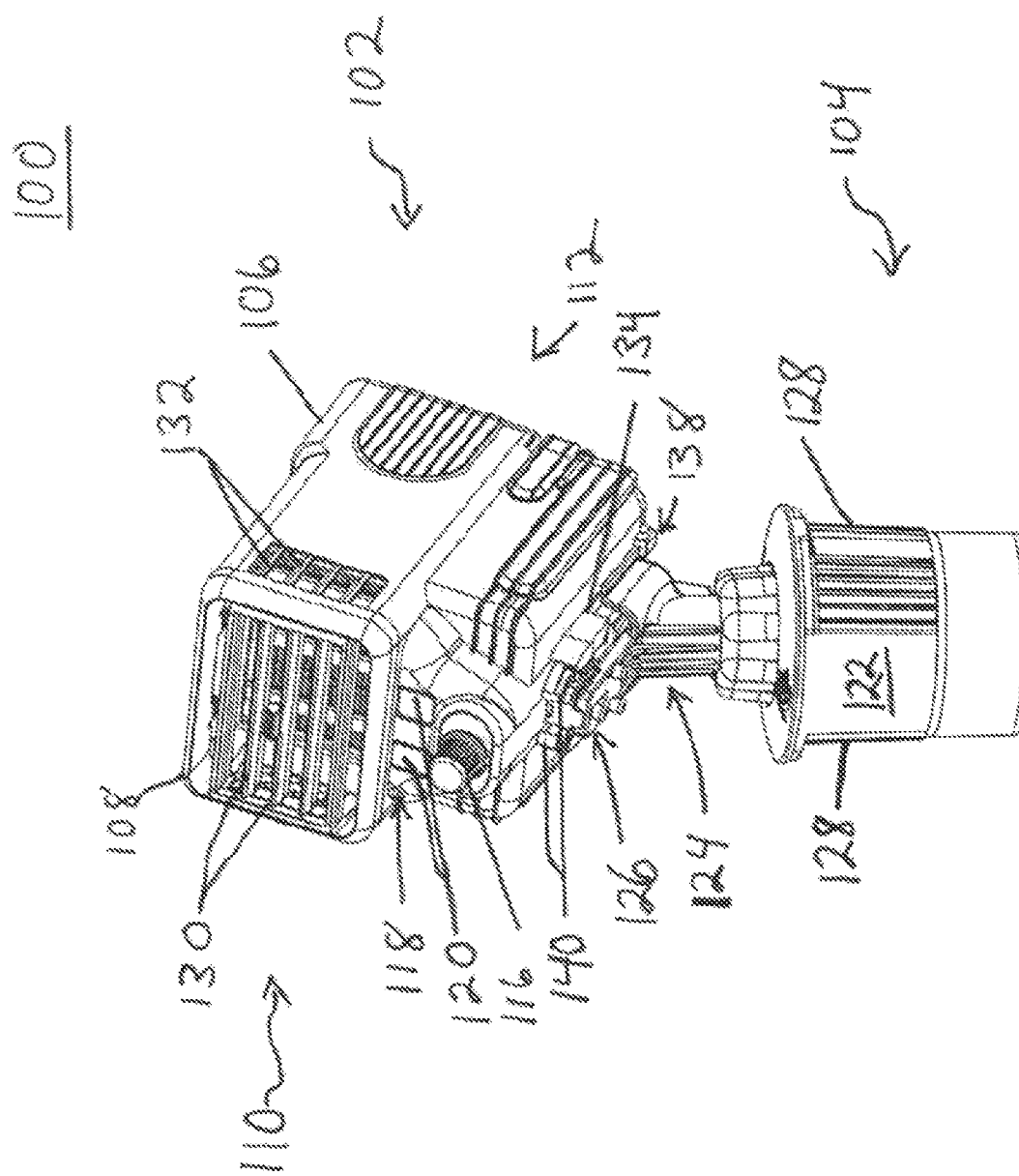
FIG. 1 is a perspective view of an embodiment of an air conditioning assembly.
Figure 2:
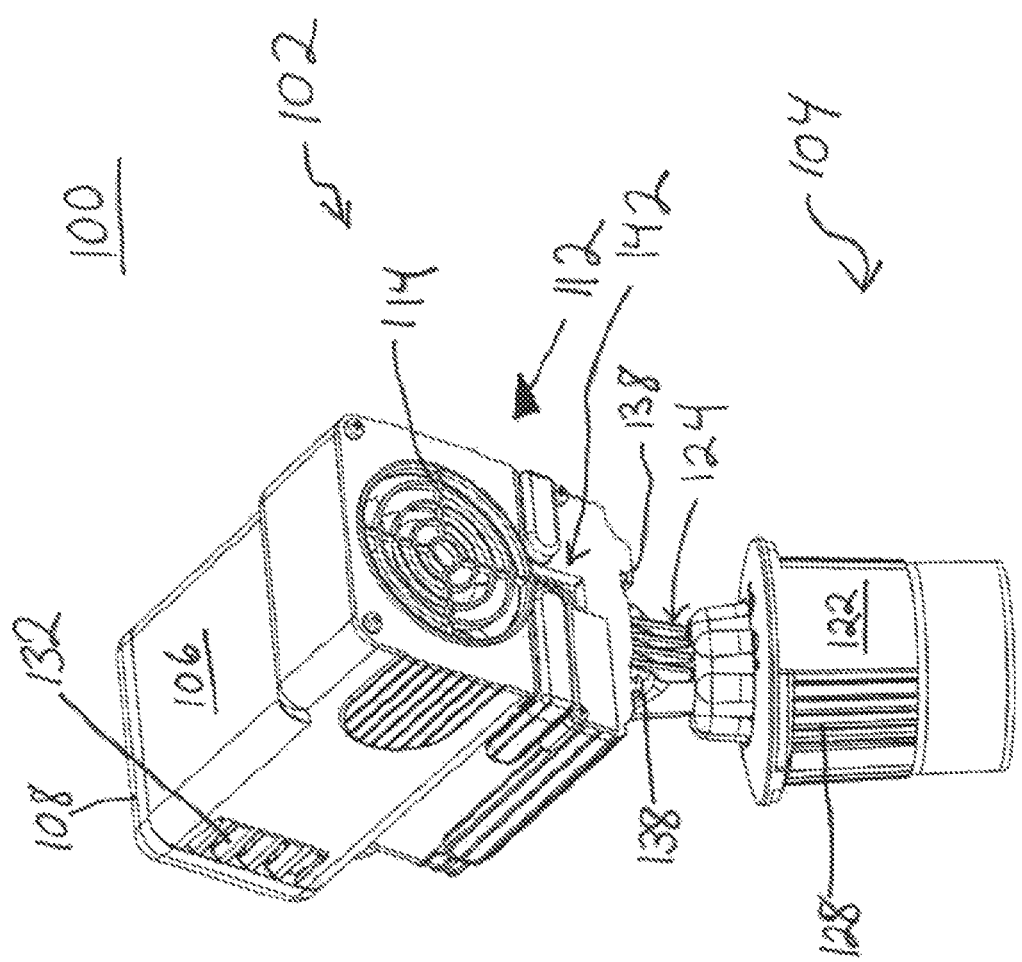
FIG. 2 is a rear perspective view of an embodiment of an air conditioning assembly.
Figure 3:
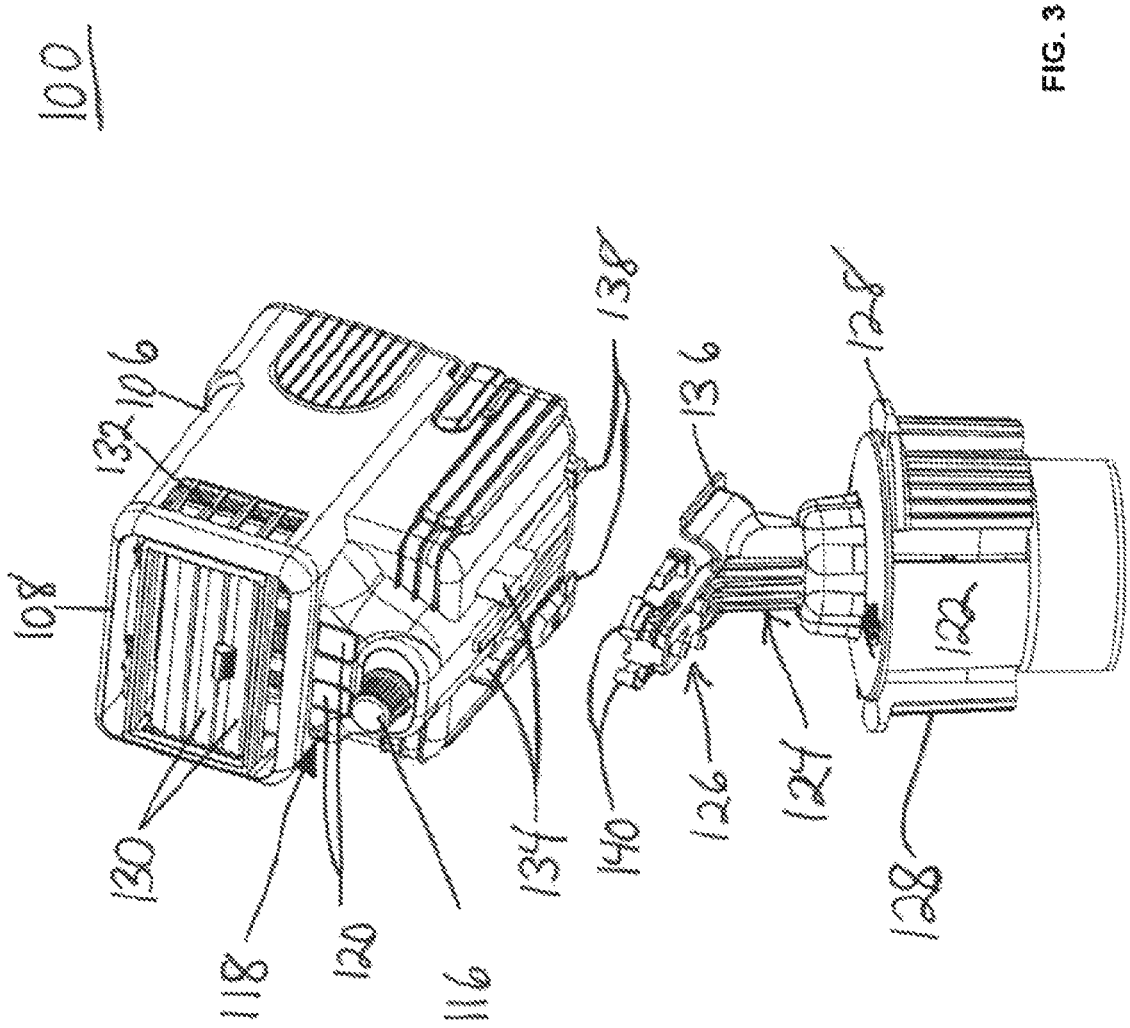
FIG. 3 is a perspective view of an embodiment of an air conditioning assembly with support and air conditioning components separate.
Figure 4:
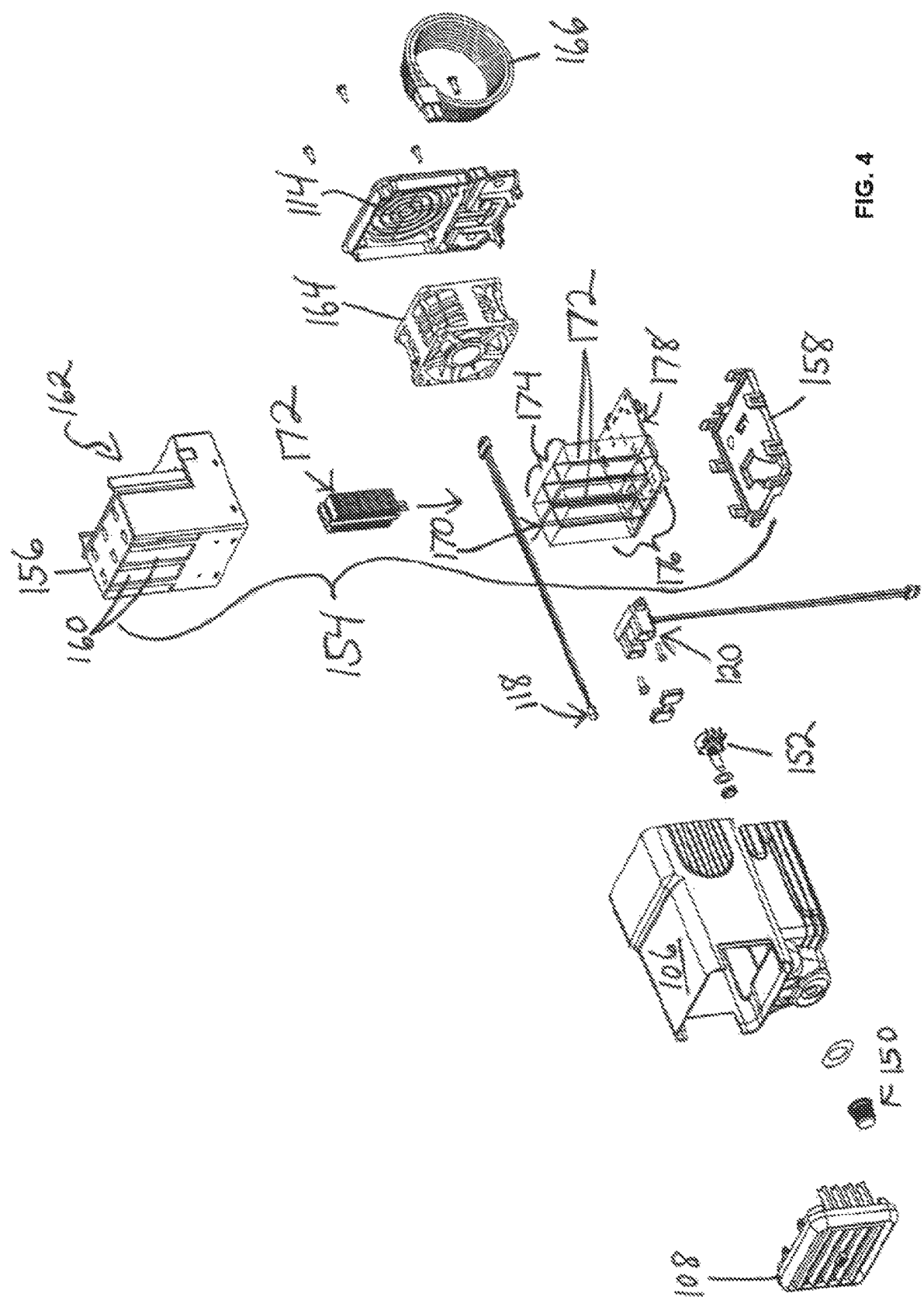
FIG. 4 is an exploded view of an embodiment of an air conditioning assembly.

FIGS. 1, 2 and 3 show an air conditioning assembly 100 including an air conditioning apparatus 102 and a supporting assembly 104. FIG. 1 illustrates the air conditioning assembly 100 from a forward perspective view and FIG. 2 illustrates the air conditioning assembly 100 from a rear view. FIG. 3 illustrates the air conditioning assembly 100 from a forward view with the air conditioning apparatus 102 and the supporting assembly 104 separated. FIG. 4 further shows an exploded view of the air conditioning apparatus 102.

The compact air conditioning apparatus 102 includes housing 106 having a front, back, top, bottom and two sides. In some embodiments, the housing 106 is designed to be resistant to thermal conductivity. For example, the housing 106 may be constructed from an insulating material and/or configured to be resistant to thermal conductivity.

In the front of the air conditioning apparatus 102, is an air outlet 110 with a vent assembly 108 through which air is blown toward a user. An air inlet 112 having an inlet vent 114 is located at the back of the air conditioning apparatus 102 and allows air to be drawn into the air conditioning apparatus 102.

The vent assembly 108 includes adjustable fins 130 in the front and stationary fins 132 on the sides of the air conditioning apparatus 102 near the front in this embodiment. In other embodiments, the fins 130 may be stationary and/or the fins 132 may be adjustable. In FIG. 1, the adjustable fins 130 are illustrated in an open position allowing air to pass through openings by the adjustable fins 130 and out openings by the stationary fins 132. In FIG. 3, the adjustable fins 130 are illustrated in a closed position shutting the openings and limiting the escape of air through the front of vent assembly 108. When the adjustable fins 130 are closed, more air is directed out through the openings by the stationary fins 132. During operation, the adjustable fins 130 may be adjusted at any angle between the open and closed positions and may be used to direct air. In the embodiment shown, the adjustable fins 130 are able to adjust in a vertical direction up or down. In some embodiments, the adjustable fins 130 may be able to adjust horizontally in addition to or instead of the vertical adjustment. In some embodiments, the adjustable fins 130 may include two sets of coordinated fins that collectively allow vertical and horizontal adjustment.

This embodiment also includes a control switch 116 (shown in FIG. 4 as comprising a knob 150 and a rotatable control 152), a visual output (shown as LED 118) and an optical sensor 120 located below the vent assembly 108 in the front of the housing 106. The control switch 116 operates as the user interface control in this embodiment, and is configured to turn the device on and select the state of operation. For example, the control switch 116 may select from four distinct operations including off, fan, low heat and high heat. The number and type of operations may vary depending on the air conditioning apparatus 102. In some embodiments, the control switch 116 may include relative options similar to a dimmer switch to select a desired output within a range. One having ordinary skill in the art will recognize that alternative control/user interface options may be implemented in the place of control switch 116, including additional analog controls, digital controls, buttons, knobs, switches and/or other controls or combinations of different types of controls. In some embodiments, the air conditioning apparatus 102 may incorporate elements (such as near field wireless communication elements) to facilitate remote control features for managing operation of the air conditioning apparatus 102. In such designs, a person's phone or other wireless device may be used to operate the air conditioning apparatus 102.

The air conditioning apparatus 102 includes the LED 118 as a visual output to indicate the status of the device. During operation, the output of LED 118 may change to reflect a different operational state of the device. For example, when the device is powered and turned off, the LED 118 may provide a steady red light. The LED 118 may provide a green light when the control switch 116 is turned to a fan only setting. The LED 118 may provide an orange light when the control switch 116 is turned to a low heat setting. The LED 118 may provide a blinking orange light when the control switch 116 is turned to a high heat setting. The LED 118 may provide a blue light when the control switch 116 is turned to a cooling setting. Other embodiments may utilize alternative indications for various states of operation that include blinking patterns, a variety of colors and/or other outputs. Other embodiments may include additional and/or alternative visual outputs to indicate the status of the device. For example, a display may be included to visually show the current operational state of the device. For another example, an array of lights/LEDs may be used wherein each light/LED may indicate different alternative states of operation. In some embodiments, other outputs may be used with or instead of the visual output, such as audible outputs, mechanical outputs and/or other outputs.

In this embodiment, the optical sensor 120 is configured to determine whether or not a person is within a certain distance of the air conditioning apparatus 102. As discussed further herein, the optical sensor 120 operates as a power management feature by shutting off the device (or features thereof) when a user is not present and restarting the device when the user returns. In some embodiments, multiple optical sensors 120 may be incorporated to determine whether one of a plurality of possible users is present. For example, one optical sensor 120 may be directed to the driver seat and one optical sensor 120 directed to a passenger seat of an electric vehicle. In some embodiments, optical sensors may have alternative designs and/or be located in alternative locations. Alternative means of detecting the presence of a user may be integrated in some embodiments in addition to or instead of the optical sensor 120.

The air conditioning apparatus 102 also includes one or more electrical ports 142 underneath the inlet vent 114 in this embodiment. The electrical ports 142 may include a power input port to connect a vehicle battery with the air conditioning apparatus 102 via a power cord. In some embodiments, one of the electrical ports 142 may be facilitate a connection to an external control, such as a phone. In some embodiments, one of the electrical ports 142 may be a charging port for an external device, such as a music player, mapping apparatus and/or other device.

The supporting assembly 104 includes a base 122 connected to an attachment arm 124 with a snap connector 126. In the embodiment shown, the base 122 is configured to fit into a vehicle cupholder. The base 122 includes adjustable braces 128 that are configured to expand thereby allowing the base 122 to fit into cupholders having different dimensions. FIG. 3 illustrates braces 128 in an extended state allowing the base 122 to fit a larger cupholder. In some embodiments, the base 122 may be configured to fit into structural elements other than a cupholder. Alternatives to base 122 may be used in some embodiments. For example, a fixed structural support base may be used to attach the air conditioning apparatus 102 to a structure. For another example, a clamp structure may be used for a base element to allow the air conditioning apparatus 102 to be attached to tubes or bars of a structure.

The air conditioning assembly 100 may be a portable device that may be moved from location to location in some embodiments. For example, a user may take the air conditioning assembly 100 with them to each golf course they play and temporarily install the air conditioning assembly 100 in a club's golf cart while playing one course, then remove the air conditioning assembly 100 to take to another location. In some embodiments, the air conditioning assembly 100 may be installed in a more permanent manner. For example, a golf club may install the air conditioning assembly 100 in each of its golf carts using a fixed mount with screws, bolts, adhesives and/or other connection mechanisms to keep the air conditioning assembly 100 from being easily removed.

In this embodiment, the attachment arm 124 connects to the top of the base 122 and the snap connector 126 feature of the attachment arm 124 extends at a forward and upward angle from the bottom of the attachment arm 124 that connects to the base 122. The obtuse angle of the attachment arm 124 is configured to direct the airflow exiting the front air outlet 110 in the direction of a user. Accordingly, the angle may be configured to correspond with the location of a cupholder or other mounting location in the environment in which the air conditioning assembly 100 will be used. For example, the angle may be based on the placement of a cupholder in a golf cart and the height of the seat in the golf cart. One having ordinary skill in the art will recognize that the angle may vary widely depending on the mounting location and environment of use. In some embodiments, the attachment arm 124 may include features to allow the angle to be modified.

In some embodiments, the attachment arm 124 may be rotatable around a vertical axis approximately perpendicular to the top of the base 122. In some embodiments, the base 122 may be rotated to adjust the forward direction of airflow. Other embodiments may incorporate alternative mechanisms to allow the air conditioning apparatus 102 to rotate relative to a supporting structure (e.g. a cupholder) and/or the supporting assembly 104. In some embodiments, the air conditioning assembly 100 may include one or more features designed to lock the orientation of the air conditioning apparatus 102 in place.

In this embodiment, the air conditioning apparatus 102 includes a set of forward prongs 134 extending below the bottom of the air conditioning apparatus 102 configured to correspond to the snap connector 126 of the attachment arm 124. Specifically, the snap connector 126 includes a pair of flexible clips 140 designed to narrow when external pressure is applied and return to their standard state when external pressure is not applied. The separated view shown in FIG. 3 illustrates the flexible clips 140 of the snap connector 126 and the forward prongs 134 in an unconnected state. Each of these forward prongs 134 includes a lip that extends inward towards the other forward prong 134. These lips are designed to hold the corresponding snap connector 126 in an abutting relationship with the bottom surface of the air conditioning apparatus 102 when connected. In addition to the forward prongs 134, the air conditioning apparatus 102 includes a set of rear prongs 138 extending below the bottom and near the back of the air conditioning apparatus 102. These rear prongs 138 extend downward and each includes a lip that extends inward towards the other rear prong 138. The attachment arm 124 also includes extensions 136 that correspond to the rear prongs 138.

When the supporting assembly 104 is connected to the air conditioning apparatus 102, the flexible clips 140 at the forward end of the snap connector 126 slide between forward prongs 134 compressing until the flexible clips 140 pass the forward prongs 134 and expand to the normal position holding the air conditioning apparatus 102 in place. At the same time, the extensions 136 of the attachment arm 124 slide into position between the rear prongs 138 of the air conditioning apparatus 102 wherein the lips of the rear prongs 138 hold the extensions 136 in an abutting relationship with the air conditioning apparatus 102. Collectively, the prongs 134 and 138 and the snap connector 126 and extensions 136 provide multiple points of connection on a broad footprint of the bottom of the air conditioning apparatus 102 to provide a stable and secure attachment.

The air conditioning apparatus 102 may be removed from the supporting assembly 104 by squeezing the flexible clips 140 at the forward end of the snap connector 126 and sliding the air conditioning apparatus 102 off of the snap connector 126 until the clips 140 are free from the forward prongs 134 and the extensions 136 are free from the rear prongs 138. In some embodiments, the flexible clips 140 of the snap connector 126 and the forward prongs 134 may be located on the opposite component and facilitate a similar snap connection. Other embodiments may include alternative mechanisms to connect the air conditioning apparatus 102 to the supporting assembly 104, such as friction connections, straps, fitted connections, locks and/or other connections.

FIG. 4 shows an exploded view of the air conditioning apparatus 102 illustrating additional detail of the air conditioning apparatus 102. In this embodiment, a fan 164 and a heater core 154 are within the housing 106. The fan 164 operates to draw air into the back of the housing 106 through the inlet vent 114. The fan 164 pushes air through the heater core 154 and out through the vent assembly 108. In some embodiments, the fan 164 may be operated at multiple speeds. The embodiment in FIG. 4 shows the fan 164 near the back of the air conditioning apparatus 102 with the heater core 154 between the fan 164 and the front of the air conditioning apparatus 102. In some embodiments, the order of components may vary. For example, the fan 164 may be located in front of the heater core 154 and operate to pull air through the air inlet 112 and the heater core 154 then push heated air out the vent assembly 108. In some embodiments, additional elements may be incorporated. For example, the air conditioning apparatus 102 may include two fans sandwiched around the heater core 154 that are coordinated to push and pull air through the air conditioning apparatus 102 collectively.

In this embodiment, the heater core 154 includes an upper housing 156 and a lower housing 158 configured to fit together to form the housing for the heater core 154. The upper housing 156 includes a top section and a base section forming an L shape when viewed from the side with the top section narrower than the base section and forming a seat 162 in which the fan 164 fits. A PTC array 170 connected to a control module 178, illustrated as a board with an integrated circuit in this embodiment, is within the housing defined by the upper housing 156 and the lower housing 158. In some embodiments, the control module 178 may be separate from the heater core 154.

The upper housing 156 includes openings 160 on the front and back of the top section adjacent to the PTC array 170 allowing air to be blown through the PTC array 170 by the fan 164. The housing for the heater core 154 also include ports or openings to allow additional elements to connect to the control module 178, such as the control switch 116, the LED 118, the optical sensor 120, the fan 164, a power cord 166 and/or other elements.

The PTC array 170 includes a plurality of PTC heaters 172 in a stacked arrangement with a first row 174 in back and a second row 176 in front. In this embodiment, there are six PTC heaters 172 with three in the front row 176 and three in the second row 174. One of the PTC heaters 172 from the second row 176 is pulled out from the control module 178 for illustrative purposes and the other five PTC heaters 172 in the PTC array 170 are shown as box representations attached to the control module 178. As used herein for the arrangement of PTC heaters 172, the term "stacked" refers to the alignment of at least two PTC heaters 172 with one in front of the other. In some embodiments, the number of PTC heaters 172 in each row may vary and/or the number of rows in the PTC array 170 may vary.

Figure 5:
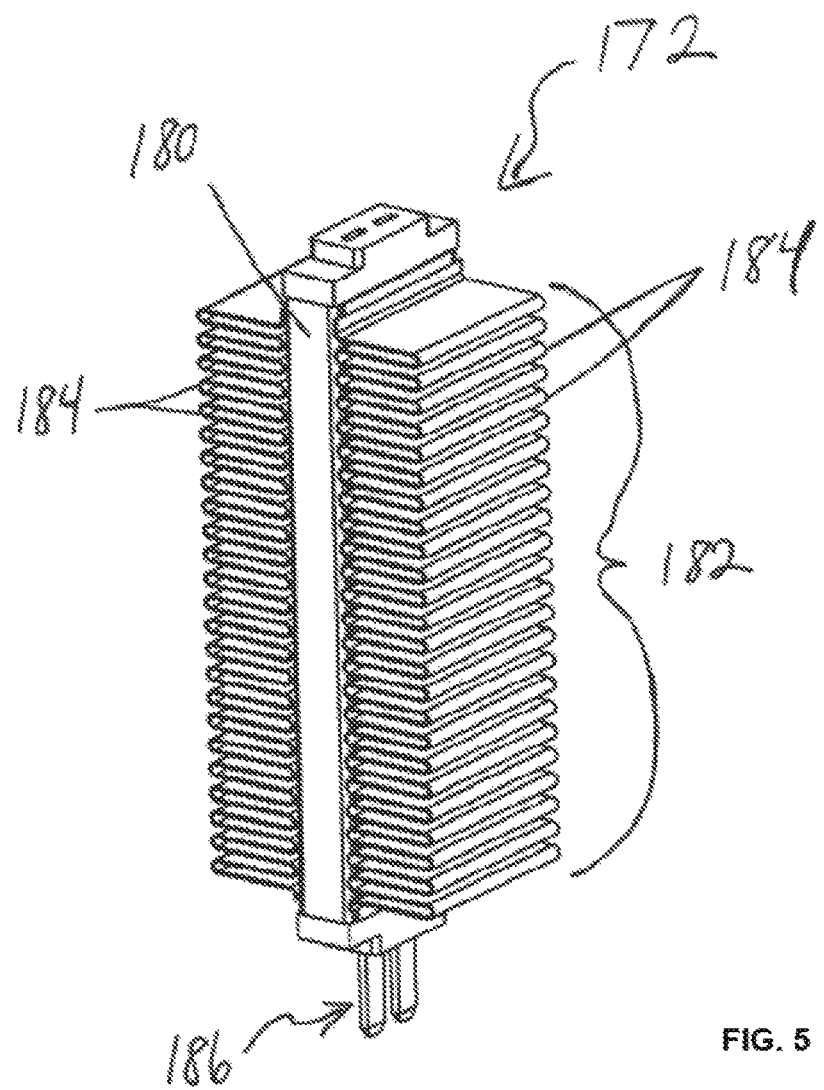
FIG. 5 is a perspective view of an embodiment of a PTC heater.

FIG. 5 provides an enlarged view of one of the PTC heaters 172. The PTC heater 172 includes a PTC core 180 that houses a PTC material and facilitates the thermal conduction to the fin array 182 comprising a plurality of conductive fins 184. In some embodiments, the PTC core 180 surrounding the PTC material and the fins 184 are constructed from the same type of conductive material. For example, the PTC core 180 and the fins 184 may be made of aluminum or an aluminum composite. In other embodiments, the materials may be different. In some embodiments the PTC core 180 and the fins 184 are a single molded material.

The fin array 182 is designed to increase the surface area for facilitating a thermal exchange from the PTC core 180 to the air passing through the PTC heater 172. The increased surface area provided by the fins 184 increases the efficiency of the thermal transfer into the air. In some embodiments, the fins 184 may include louvers or other smaller fin elements to further increase the surface area for heat exchange. In some embodiments, such louvers in the fins may be sections cut from the fins 184 and angled to cause air to pass through the fins 184. The efficiency and effectiveness of the heat transfer may increase based on this additional effect on the flow of air through the fin array 182.

The PTC heater 172 also includes electrical connection 186 that connects the PTC material within the PTC core 180 to an external electricity source. In the heater core 154, the electrical connection 186 is configured to connect to the power module 178. When the electricity is applied to the electrical connection 186, the PTC material heats up to a threshold level and heats the PTC core and fin array 182 of the PTC heater 172 to a temperature based on the threshold heat level. The PTC core 180 is designed to conduct the heat generated by the PTC material to the fin array 182 without conducting electricity to the fins 184.

As discussed above, the heat threshold of a PTC material may be determined based on the specific applied voltage. Accordingly, the intended heat threshold for a PTC heater 172 may be controlled by selecting characteristics of the PTC material that provide a desired heat threshold at a given voltage or voltage range. The characteristics of the PTC material include the composition, size and/or shape of the material. For example, the PTC material may be a rectangular block of a specific composition of barium titanate or lead titanate. The PTC material may be located between two electrical terminals or plates that direct electricity to pass through the PTC material when a voltage is applied to the connection 186.

Different PTC heaters 172 may be developed for distinct voltage applications. For example, a PTC heater 172 may be configured for operation in 48V electric vehicles. Another PTC heater 172 may be configured for 36V electric vehicles. One skilled in the art will recognize that the PTC heaters 172 may be configured for any voltage application, including applications in the 12-72V range.

In this embodiment, the switch 116 is comprised of a knob 150 and a rotatable control 152, such as a potentiometer, within the housing 106. As the knob 150 rotates, the rotatable control 152 causes the control module 178, such as the integrated circuit within the heater core, to modify the operation of the air conditioning apparatus 102. In some embodiments, the rotatable control 152 may be correlated to certain selectable settings along the rotation.

While the following discussion of the operation of the air conditioning assembly 100 is in the context of application in a golf cart, the air conditioning assembly 100 may be used in other contexts/environments as discussed above and the description of the operation is applicable to other contexts as will be understood by one skilled in the art. A user may place and/or install the air conditioning assembly 100 in the golf cart. For embodiments using the cupholder supporting assembly 104, the user may adjust the braces 128 to securely fit the size of the cupholder in the golf cart and place the base 122 into the cupholder. In some embodiments, the user will assemble the air conditioning assembly 100 by connecting the supporting assembly 104 to the air conditioning apparatus 102 prior to installation. In other embodiments, the user may place or install the supporting assembly 104 prior to connecting the air conditioning apparatus 102 to the supporting assembly 104. As part of the placement or installation, a user will connect the air conditioning assembly 100 to a power source, such as the golf cart battery.

After installation or placement of the air conditioning assembly 100, the user may turn on the air conditioning apparatus 102 using the control switch 116. For example, the user may turn the control switch 116 to one of a plurality of settings, such as low fan, high fan, low heat, high heat, low cooling, high cooling and/or another setting. When the air conditioning apparatus 102 is turned on, the control module 178 operates the fan 164, heater core 154 and/or other elements based upon the selected setting. For example, the control module 178 may turn the fan 164 to a first speed when the low fan setting is selected. The control module 178 may turn the fan 164 to a second, higher speed when the higher fan setting is selected. When the low heat setting is selected, the control module 178 may turn on the fan 164 at a select speed and turn on one row of the PTC heaters 172 in the PTC array 170, such as the first row 174. When the high heat setting is selected, the control module 178 may turn on the fan 164 at another select speed and turn on both rows 174 and 176 of the PTC heaters 172 in the PTC array 170. Similarly, when a cooling setting is selected, the control module 178 may turn on the fan 164 and a cooling element. The low and high cooling settings may be based upon the operation of the cooling element and/or the fan speed.

When the air conditioning apparatus 102 is operating in a fan only setting, the fan 164 blows air through the PTC array 170 and out the vent assembly 108. When the air conditioning apparatus 102 is operating in a heat setting, the fan 164 blows air through the PTC heaters 172 in a heated state causing the air to increase in temperature as it passes through the PTC array 170. The heated air then passes through the vent assembly 108. In the low heat setting, the air temperature is increased by only one row 174 or 176 of the PTC heaters 172. In the high heat setting, the air temperature is increased when passing through each row 174 and 176 of the PTC heaters 172 causing a higher temperature output than the low setting. During operation, the user may adjust the control switch 116 to change settings. One skilled in the art will recognize that embodiments with alternative control mechanisms (e.g. buttons, switches, touch screen controls, etc.) and/or components may facilitate different operations and/or settings options.

As discussed above, the user may also move the adjustable vents 130 to direct air at a desired location. For example, the user may angle the adjustable vents 130 upward to direct air towards the user's face. Alternatively, the user may angle the adjustable vents 130 downward to direct air towards the user's feet. As another alternative, the user may close the adjustable vents 130 to direct more air out through the vents 132 on the side of the air conditioning apparatus 102.

In some embodiments, the air conditioning apparatus 102 includes power management features to minimize power consumption while efficiently providing heating and cooling to the user. The optical sensor 120 may facilitate power management features by allowing the control module 178 to limit operation of the air conditioning apparatus 102 based upon the presence of a user. During operation, the optical sensor 120 operates to determine whether a person is within a given distance. For example, the optical sensor 120 may use a light output and a light sensor to determine a range to the nearest object in the directed line (or lines) of sight. If the range is above a threshold distance based on the expected distance to a user, the control module 178 may determine that a person is not present and shut-off one or more features (e.g. the heater core 154, the fan 164, etc.) to limit power consumption while the user is not present. The optical sensor 120 may continue to detect the relevant distance to the nearest object and the control module 178 may resume the operation of the features associated with the user's prior setting selection when the range detected by the optical sensor 120 indicates a person is present again.

In some embodiments, the air conditioning apparatus 102 may include an initializing mode wherein the optical sensor 120 may be used to determine a distance to a set object, such as a seat in a vehicle, and an operational mode that uses the distance determined in the initializing mode as a threshold distance. The air conditioning apparatus 102 may determine the presence of a person when the distance indicated by the optical sensor 120 is sufficiently less than the threshold distance. The distance may be sufficiently less when the difference is more than a standard deviation that could represent error in the distance calculation. Alternatively, the air conditioning apparatus 102 may include a set requirement for the difference that is indicative of a person sitting in the seat. One skilled in the art will recognize that other presence detectors may be used with or instead of the optical sensor 120 to facilitate power management based on the presence of a user.

In some embodiments, the optical sensor 120 will detect the applicable distance multiple times in order to verify the accuracy of the detected distance and limit the likelihood of turning one or more features of the air conditioning apparatus 102 on or off based on an errant distance reading, an anomaly and/or another temporary change (e.g. a person reaches across the optical sensor 120 momentarily without getting in the vehicle). For example, the optical sensor 120 may confirm the current distance every few seconds until a new distance is detected. Upon detecting the new distance, the optical sensor 120 may increase the rate of distance readings to confirm that the new distance is accurate and indicates the presence of a person has changed.

In some embodiments, the optical sensor 120 operates solely as the optical output and input and sends the detected data to the control module 178 for processing the distance and further action by the air conditioning apparatus 102, if applicable. In some embodiments, the optical sensor 120 includes internal processing features for determining one or more results. For example, the optical sensor 120 may receive the detected data, calculate the distance and send the distance result to the control module 178. For another example, the optical sensor 120 may receive the detected data, calculate the distance and determine whether a change in distance has occurred. In such an embodiment, the optical sensor 120 may only send a signal to the control module 178 when the distance has changed. One skilled in the art will recognize that various embodiments may include one or more features of the processing in the optical sensor 120 and/or the control module 178.

In some embodiments, the operation of the PTC array 170 is managed to minimize power consumption. For example, the control module 178 may turn on one or more of the PTC heaters 172 separately to minimize the high current inrush caused by collectively turning on the entire PTC array 170. In some embodiments, when high heat is selected, the control module 178 may turn on the first row 174 of PTC heaters 172 and then delay turning on the second row 176 of the PTC heaters 172 for a sufficient time to limit the inrush current. For example, the control module 178 may apply a preset time delay calculated to allow inrush current caused by the first row 174 to fall to an operational current level before power is supplied to the second row 176. For another example, the control module 178 may detect the electrical current level of the first row 174 and delay turning on the second row 176 until the electrical current level of the first row 174 reduces to a maximum threshold level.

The control module 178 may also limit the time of operation in a high heat setting to reduce power consumption in some embodiments. For example, when the user selects the high heat setting on the control switch 116, the control module 178 may turn on the first row 174 of the PTC heaters 172 and the second row 176 of the PTC heaters 172 and begin a timer. Once the timer reaches a threshold, the control module 178 will shut off one of the rows 174 or 176 of PTC heaters 172. In some embodiments, the threshold may be a preset amount of time, such as 30 seconds, 45 seconds, one minute, two minutes or any amount of time. Other embodiments may determine the time threshold based on other inputs, such as user selections, current temperatures, current battery charge and/or another input. In some embodiments, the control module 178 will also cause the control switch 116 to return to the position of the low heat setting. In some embodiments, the control module 178 may manage the operation of the air conditioning apparatus 102 based upon readings from a temperature sensor.

In some embodiments, the air conditioning apparatus 102 includes one or more features to monitor the charge of an attached battery and modify operation of the air conditioning apparatus 102 based upon the battery charge level. For example, the air conditioning apparatus 102 may receive or detect the charge level for the battery in an electric vehicle. If the battery charge level drops below a threshold charge level, the air conditioning apparatus 102 may automatically turn off. The threshold charge level may be preset by a manufacturer, selected by a user and/or determined by the air conditioning apparatus 102 based upon various factors, such as the type of battery, type of environment, battery usage rates and/or other factors. For example, when the air conditioning apparatus 102 is installed in a golf cart, the threshold level may be based upon the necessary battery level to ensure that the golf cart can be driven back to the clubhouse.

Figure 6:
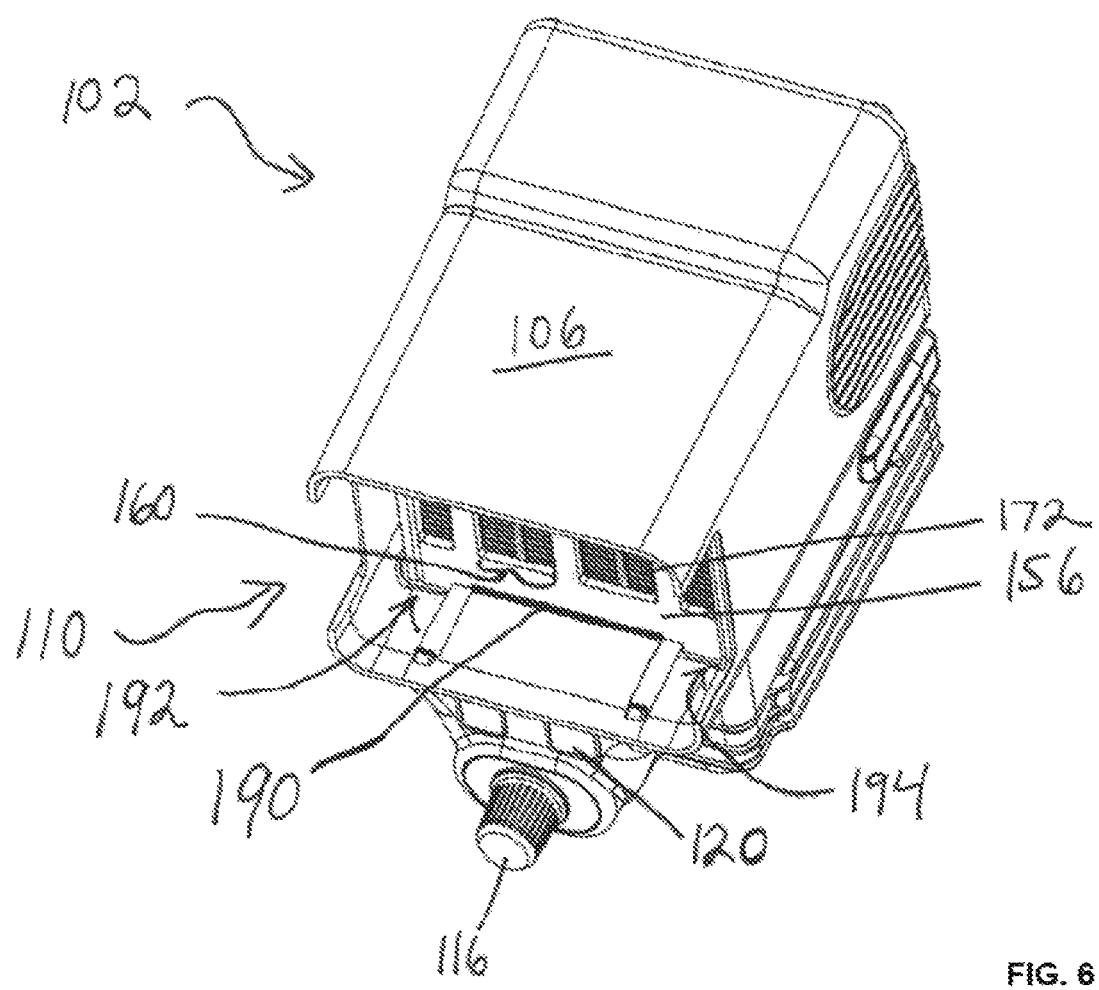
FIG. 6 is a top perspective view of an embodiment of an air conditioning component.

FIG. 6 shows an embodiment of the air conditioning apparatus 102 without the vent 108 covering the air outlet 110. The upper housing 156 of the heater core 154 is shown with PTC heaters 172 visible in the openings 160. In this embodiment, a seal 190 is located at the junction of the housing 106 and the upper housing 156. The seal 190 minimizes or prevents water or debris from getting between the housing 106 and the upper housing 156. In addition, the air conditioning apparatus 102 includes passages 192 and 194 to direct liquids away from internal components of the air conditioning apparatus 102. During operation, when any liquids enter the air conditioning apparatus 102, the seal 190 prevents the liquid from getting between the housing 106 and the upper housing 156 causing liquid to flow toward the passages 192 and 194 located in the bottom of the housing 106 on the sides.

Figure 7:
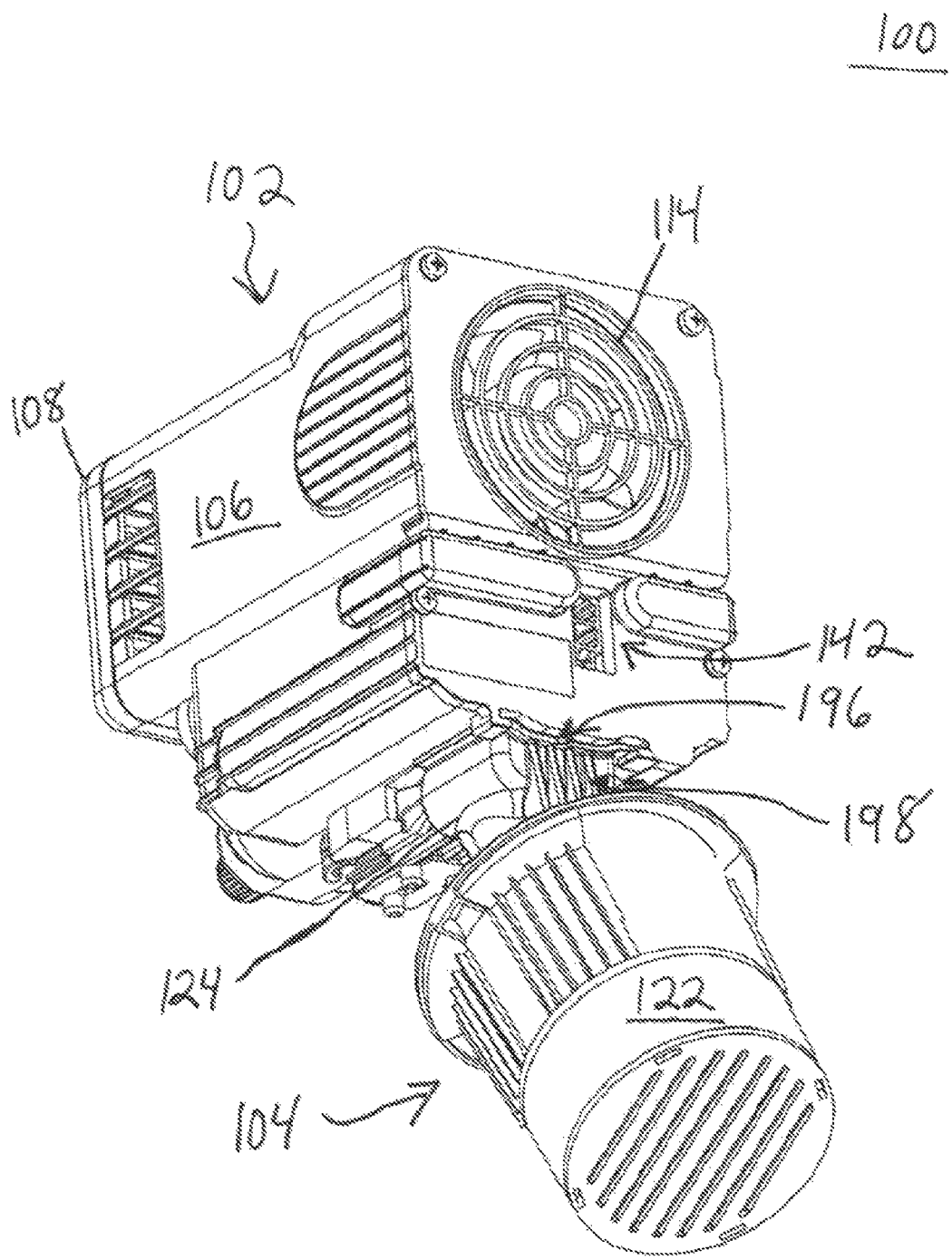
FIG. 7 is a bottom perspective view of an embodiment of an air conditioning assembly.

In this embodiment, the passages 192 and 194 direct fluids away from internal components of the air conditioning apparatus 102 to the drain 196 (shown in FIG. 7) located in the bottom of the housing 106 near the back of the air conditioning apparatus 102. In the embodiment shown, the drain 196 is aligned over channels 198 in the back of the attachment arm 124. The channels 198 further direct any fluids from drain 196 away from the air conditioning apparatus 102. In some embodiments, the air conditioning apparatus 102 may incorporate other configurations or features to divert liquids and/or debris from the components of the air conditioning apparatus 102.

Figure 8:
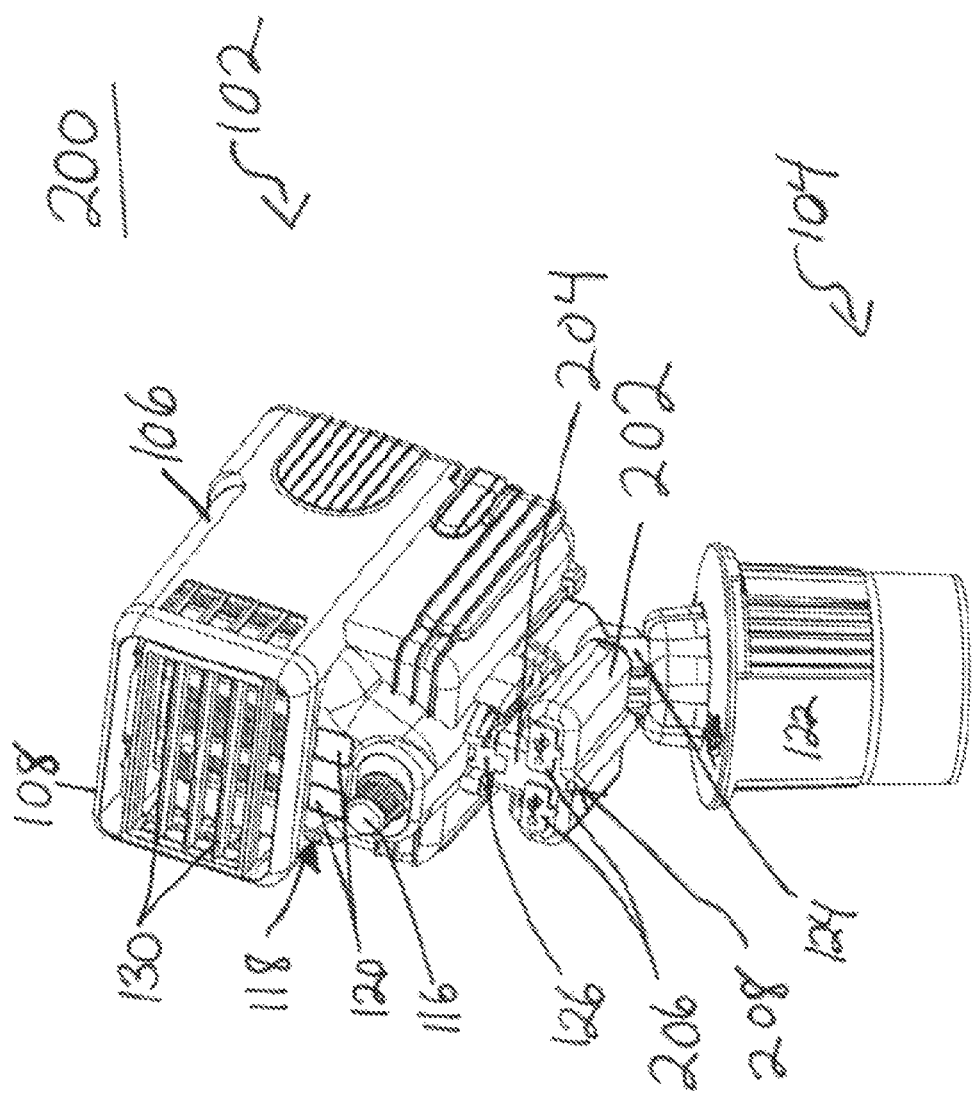
FIG. 8 is a perspective view of an embodiment of an air conditioning assembly with a charging accessory.

FIG. 8 shows another embodiment of an air conditioning assembly 200 including the air conditioning apparatus 102, the supporting assembly 104 and a charging apparatus 202. The air conditioning apparatus 102 and the supporting assembly 104 in this embodiment are described above. In some embodiments, an alternative air conditioning apparatus and/or supporting assembly may be used in air conditioning assembly 200.

In some embodiments, the charging apparatus 202 is a separate component that may be attached to an air conditioning assembly. In other embodiments, the charging apparatus 202 may be built into the air conditioning apparatus 102 or the supporting assembly 104. In this embodiment, the charging apparatus 202 is shown on the underside of the snap connector 126 opposite from the air conditioning apparatus 102. A connection frame 204 is on the top portion of the charging apparatus 202. In this embodiment, the connection frame 204 is configured to correspond with the structure of the attachment arm 124 and, specifically, the underside of the snap connector 126. In some embodiments, the connection frame 204 may define a friction connection similar to the snap connection between the snap connector 126 and the prongs 134 on the bottom of the air conditioning apparatus 102. In some embodiments, the connection frame 204 may facilitate a fitted connection with the snap connector 204 and/or the prongs 134. For example, the connection frame 204 may include one or more ridges that correspond to ridges or grooves on the attachment arm 124, wherein the corresponding features are designed to hold the charging apparatus 202 in place. For another example, the connection frame 204 may be configured to fit between one or more of the snap connector 126 features and one or more of the mounting features of the air conditioning apparatus 102. One skilled in the art will recognize that the connection frame 204 may be configured in other manners to facilitate a connection to the snap connector 126 and/or the air conditioning apparatus 102.

In the embodiment shown, the charging apparatus 202 includes two ports 206 with protective covers and an operation indicator 208. One skilled in the art will recognize that the number and type of port 206 may vary and remain within the scope and spirit of the application. The ports 206 are universal serial bus ("USB") ports in the embodiment shown. In other embodiments, the ports 206 may be other types of connection ports or plugs, such as HDMI ports, micro-USB, mini-USB, brand specific ports and/or combinations of ports.

The operation indicator 208 may be any type of output for indicating the current status of the charging apparatus 202, such as an LED, a display, a light, a speaker and/or other output. The output of the operation indicator 208 may change to indicate different states of operation. For example, an LED may be red to indicate the charger apparatus 202 has power. Once a user connects a device to one of the ports 206, the LED may turn blue to indicate that one device is connected. If a user connects two devices, the LED may turn purple to indicate that two devices are connected. When a device is charging, the LED may blink. The blink pattern and/or color may further change to indicate additional operations.

In some embodiments, the charging apparatus 202 may also facilitate other operations. For example, the charging apparatus 202 may include internal storage to allow data to be downloaded from an external device. For another example, the charging apparatus 202 may operate as a hub to facilitate transferring information, power, software or other signals from one external device connected to a first port 206 to another external device connected to a second port 206. In some embodiments, the charging apparatus 202 is operable to facilitate control instructions and/or updates to the air conditioning apparatus 102.

In some embodiments, the air conditioning assembly 200 may include an accessory in addition to or instead of the charging apparatus 202. For example, the air conditioning assembly 200 may include an external control box that is attachable to facilitate further control options for the air conditioning apparatus 102. In some embodiments, accessory elements may include holders for a phone, a range finder, a walkie-talkie, a radio and/or other devices. For example, a user may attach a phone holder on the side of housing 106 to hold a smart phone.

Figure 9:
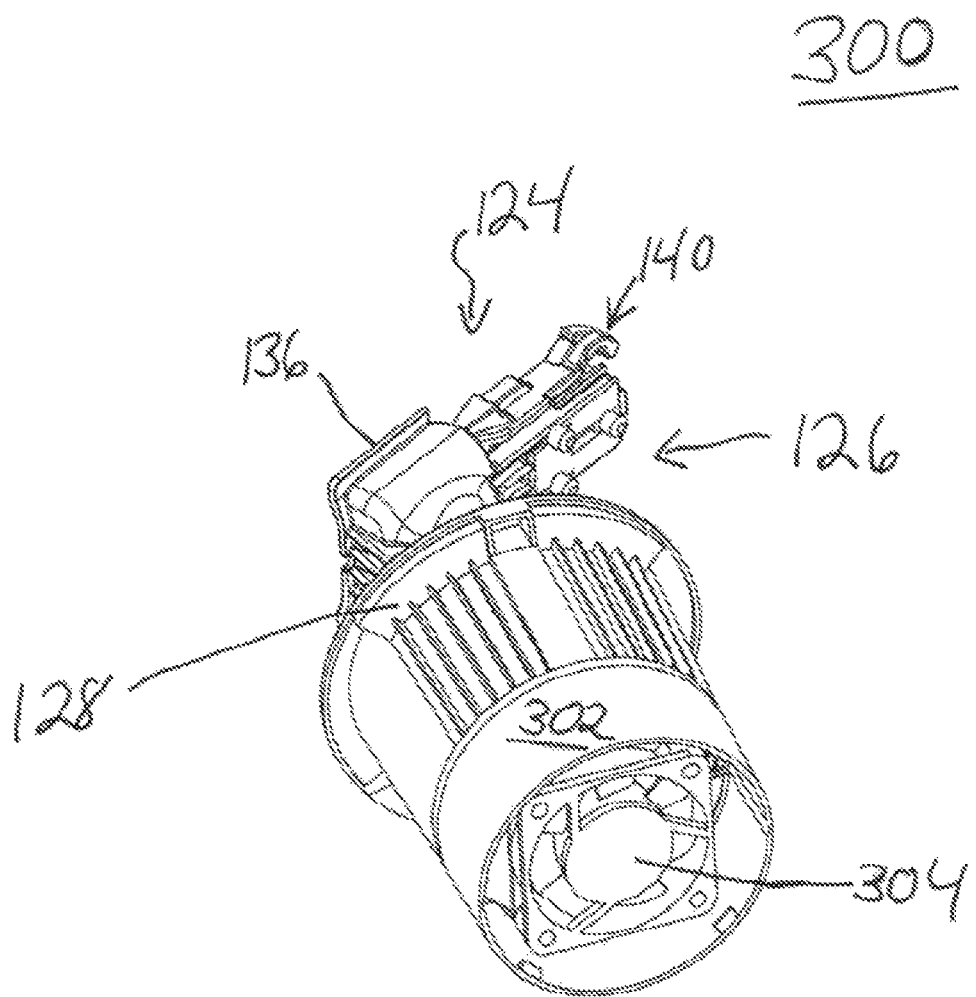
FIG. 9 is a bottom perspective view of an embodiment of a support component with a fan.

FIG. 9 shows an embodiment of a supporting assembly 300 with a cooling feature. This embodiment is similar to the supporting assembly 104 discussed above, including the attachment arm 124. An alternative base 302 is depicted with an exhaust fan 304 located in the bottom. The exhaust fan 304 is configured to operate with an air conditioning apparatus 102 to provide a cooling effect. In some embodiments, the base 302 may include a heat sink to draw heat from components within the air conditioning apparatus 102 with the exhaust fan 304 operating to blow or draw air across the heat sink causing a cooling effect. For example, the heat sink may connect to the fins 184 of the PTC heaters 172 when the supporting assembly 300 is connected to the air conditioning apparatus 102. When the fan 164 blows air through the heater core 154 while the cooling feature is selected, the fins 184 (cooled by the heat sink and exhaust fan 304) cool the airflow through the air conditioning apparatus 102.

Figure 10:
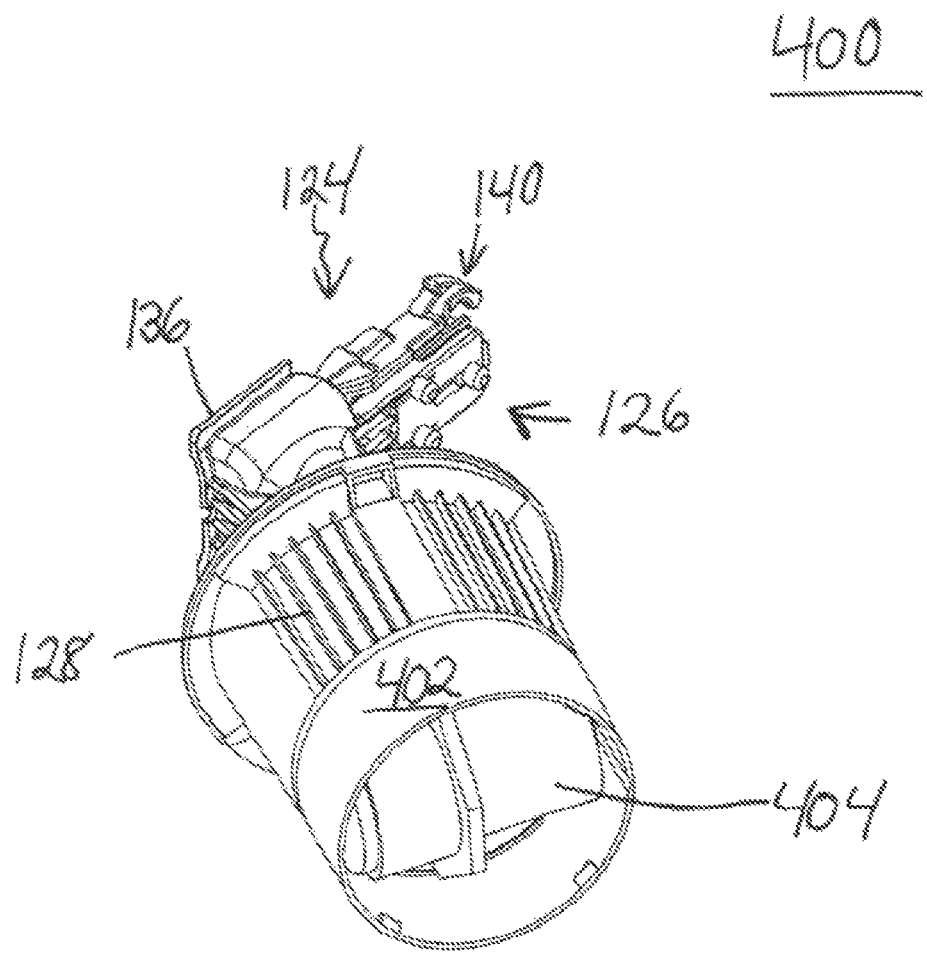
FIG. 10 is a bottom perspective view of another embodiment of a support component with a pump.

FIG. 10 shows another embodiment of a supporting assembly 400 with a cooling feature. This embodiment is similar to the supporting assemblies 104 and 300 discussed above, including the attachment arm 124. An alternative base 402 is depicted with a pump 404 located in the bottom. The pump 404 is configured to operate with an air conditioning apparatus 102 to provide a cooling effect. In some embodiments, the base 402 may include a heat sink to draw heat from components within the air conditioning apparatus 102 with the pump 404 operating to move cooled fluid through tubes connected to the heat sink causing a cooling effect. For example, the heat sink may connect to the fins 184 of the PTC heaters 172 when the supporting assembly 400 is connected to the air conditioning apparatus 102. When the fan 164 blows air through the heater core 154 while the cooling feature is selected, the fins 184 (cooled by the heat sink and pump 404) cool the airflow through the air conditioning apparatus 102. In some embodiments, the pump 404 may be connected to one or more tubes designed to provide a mist into the airflow through the air conditioning apparatus 102.

Figure 11:
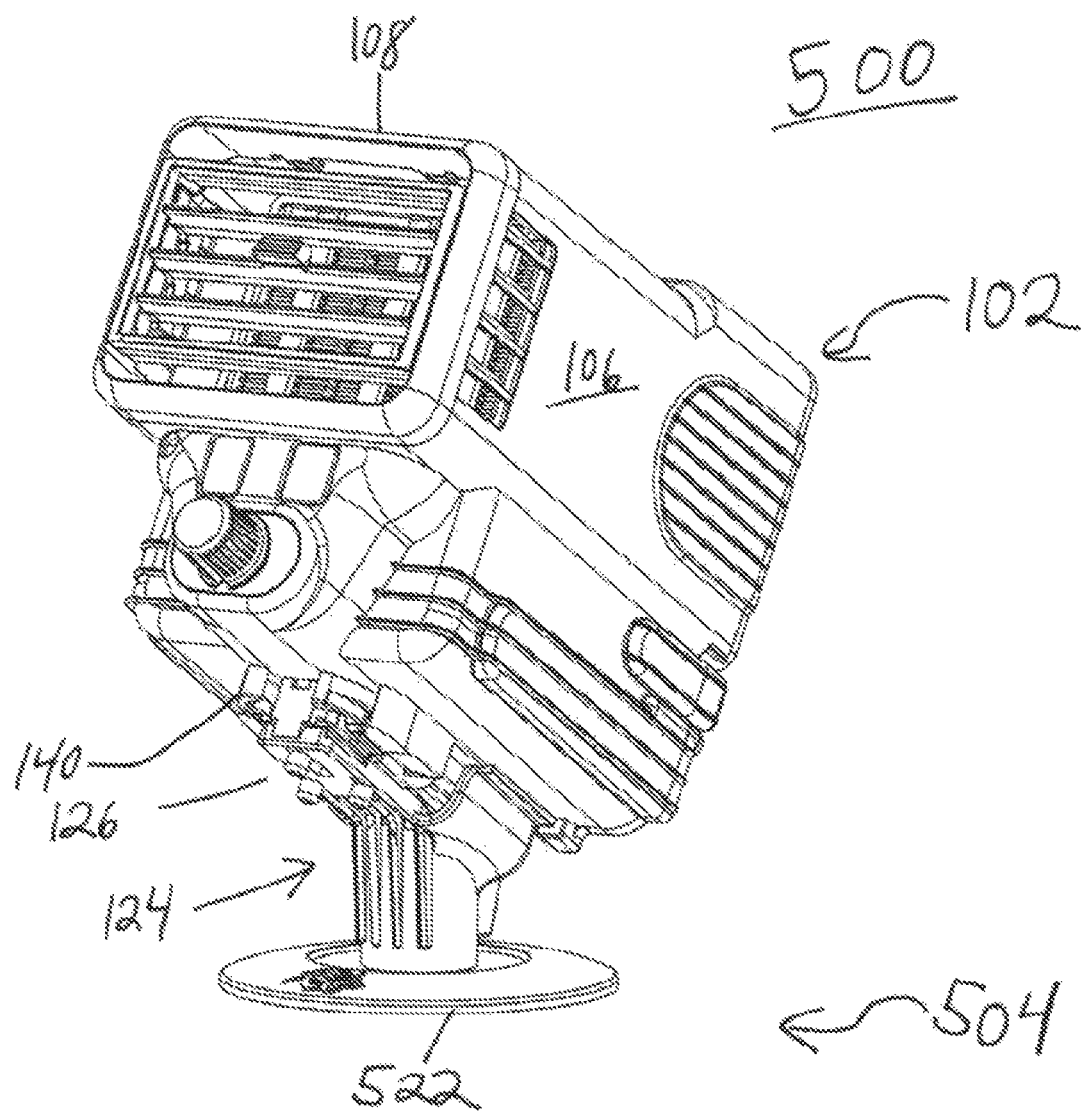
FIG. 11 is a perspective view of another embodiment of an air conditioning assembly.

FIG. 11 shows another embodiment of an air conditioning assembly 500 including the air conditioning apparatus 102 and a supporting assembly 504. The air conditioning apparatus 102 in this embodiment is described above. In some embodiments, an alternative air conditioning apparatus may be used in air conditioning assembly 500.

The supporting assembly 504 includes base 522 and attachment arm 124. In this embodiment, the base 522 is shown as a flat plate that may be attached to a structure. For example, the base 522 may be attached to the dash of a recreational vehicle. The base 522 may be attached by any form of connection, such as screws, bolts, adhesives, welded connections, friction connections, fitted connections and/or other connections. In some embodiments, the base 522 allows the supporting assembly 504 of the air conditioning assembly 500 to be fixedly mounted or fastened to a structure.

Figure 12:
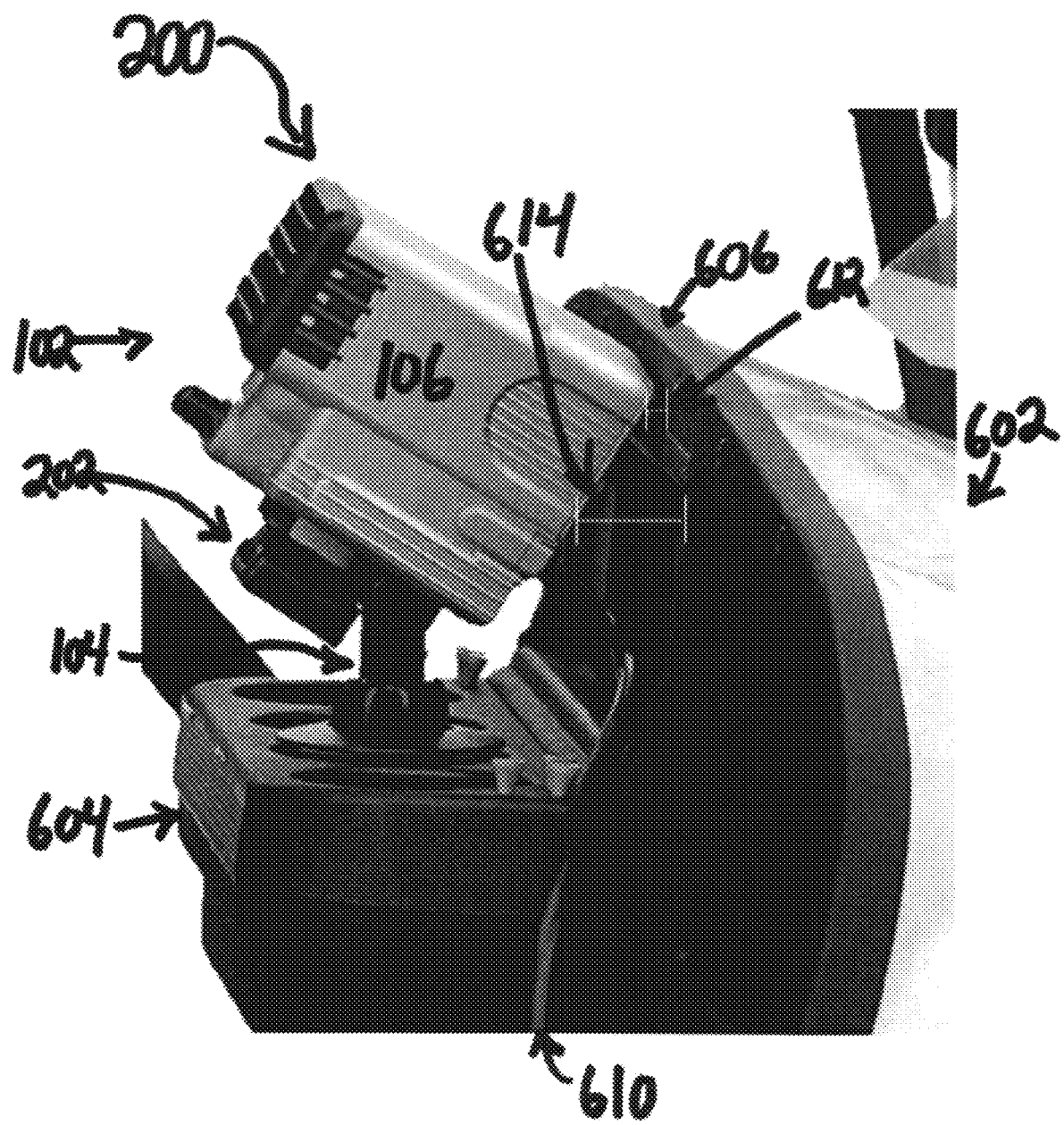
FIG. 12 is a perspective view of an embodiment of an air conditioning assembly in a golf cart.

FIG. 12 shows an embodiment of the air conditioning assembly 200 installed in a golf cart 602. The elements of the air conditioning assembly 200, including the air conditioning apparatus 102, the supporting assembly 104 and the charging apparatus 202 are described further above. This embodiment further depicts a power cord 610 connected to the back of the housing 106 of the air conditioning apparatus 102. The power cord 610 is directed down the front of the dash 612 and to the battery of the golf cart 602 providing power to the air conditioning assembly 200.

In this installation, the supporting assembly 104 is placed within one of four cupholders 604 of the golf cart 602. The supporting assembly 104 holds the air conditioning apparatus 102 above the cupholder 604 and in front of a dash 606 of the golf cart. In this embodiment, the supporting assembly 104 holds the housing 106 of the air conditioning apparatus 102 at an angle with the top of the housing 106 having a small clearance 612 in front of the dash 606 and the housing 106 having a larger clearance 614 in front of the dash 606 near the bottom of the inlet vent 114. This spacing shown by the clearances 612 and 614 illustrates the area adjacent to the air inlet 112 through which air is pulled into the housing 106. In some embodiments, the configuration and design of components of the air conditioning assembly 200, including the supporting assembly 104 and the air conditioning apparatus 102, may be configured to correspond with specific vehicle spacing configurations based on placement of cupholders, the location of the dash and/or other components of the vehicle. In some embodiments, elements of the supporting assembly 104 and the air conditioning apparatus 102 may be designed to fit multiple vehicle configurations. In some embodiments, the elements of the supporting assembly 104 and the air conditioning apparatus 102 may be variable to allow adjustment of the angle of the air conditioning apparatus 102 and/or the forward placement of the air conditioning apparatus 102.

Embodiments of the electric air conditioning apparatus may comprise a housing having an air inlet and an air outlet, a user interface on an external surface of the housing, a power input configured to facilitate an electric connection to an external battery, a fan within the housing between the air inlet and air outlet configured to move air through said housing from the air inlet to the air outlet and a heater core within said housing between the air inlet and air outlet, wherein said fan moves air through said heater core. The heater core may comprise a control module operably connected to said power input, said user interface and said fan, and configured to operate said electric air conditioning apparatus based on an operation input received through said user interface, a first PTC heater operably connected to said control module, a second PTC heater in a stacked configuration with said first PTC heater and operably connected to said control module, wherein during operation said fan is configured to move air through said first PTC heater and said second PTC heater serially and said control module is configured to control the operation of said first PTC heater separate from said second PTC heater; and wherein, when said operation input is received, said control module staggers application of power to said first PTC heater and to said second PTC heater, wherein said application of power is configured to limit overall power loss during start-up of the first PTC heater and second PTC heater.

In some embodiments, the electric air conditioning apparatus may comprise an optical sensor operably connected to said control module, wherein said optical sensor is configured to sense distance to an object and said control module modifies the operation of said electric air conditioning apparatus based upon a determination of whether the distance to said object indicates that the user is present. Said control module may turn the air conditioning apparatus off when said determination indicates that the user is not present and turn the air conditioning apparatus on when said determination indicates that the user is present.

In some embodiments, the electric air conditioning apparatus may comprise a plurality of PTC heaters with a first row of PTC heaters including said first PTC heater and a second row of PTC heaters including said second PTC heater, wherein said first row of PTC heaters and said second row of PTC heaters are in a stacked configuration, and wherein, when said operation input is received, said control module applies power to said first row of PTC heaters and separately to said second row PTC heaters, wherein said application of power is configured to limit overall power loss during start-up of said plurality of PTC heaters.

In some embodiments, the electric air conditioning apparatus may comprise a visual output configured to indicate an operational state of said electric air conditioning apparatus. Said visual output may be a light emitting diode.

In some embodiments, the electric air conditioning apparatus may be configured to include a first heat setting and a second heat setting which may be selected with said user interface, wherein during operation at said first heat setting, said control module turns on said first PTC heater and does not turn on said second PTC heater, and during operation at said second heat setting, said control module turns on said first PTC heater and said second PTC heater. Said control module may be configured to limit operation at said second heat setting by turning off said second PTC heater after reaching a threshold parameter. Said threshold parameter may be at least one of an amount of time, a temperature and/or a battery charge level.

In some embodiments, the electric air conditioning apparatus may be configured to shut off when a charge level of said external battery falls below a threshold charge level.

In some embodiments, the electric air conditioning apparatus may comprise a support assembly configured to connect said housing to a structure. Said support assembly may be configured to fit in a cupholder of an electric vehicle. In some embodiments, said support assembly includes an attachment arm configured to connect to said housing and hold said housing at an angle towards a seat of said electric vehicle. Embodiments of said support assembly may be configured to fixedly mount to an electric vehicle.

In some embodiments, the support assembly houses a cooling component configured to facilitate cooling the air in said housing. Said cooling component may be at least one of a pump and/or a cooling fan.

In some embodiments, the electric air conditioning apparatus is portable.

In some embodiments, the electric air conditioning apparatus may comprise a misting system, wherein said misting system facilitates supplying a mist into the air.

Figure 13:
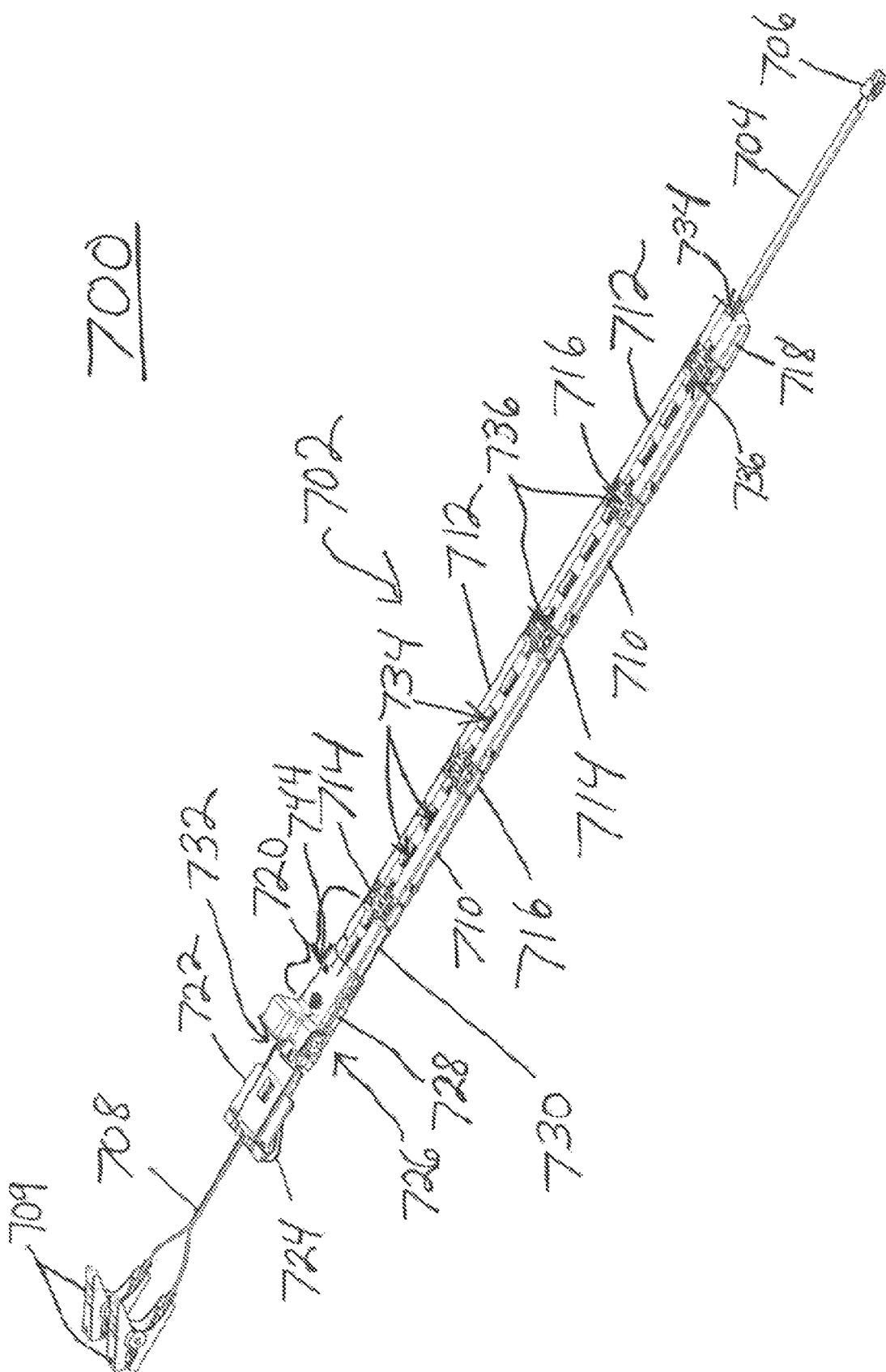
FIG. 13 is a top perspective view of an embodiment of a cord harness assembly.
Figure 14:
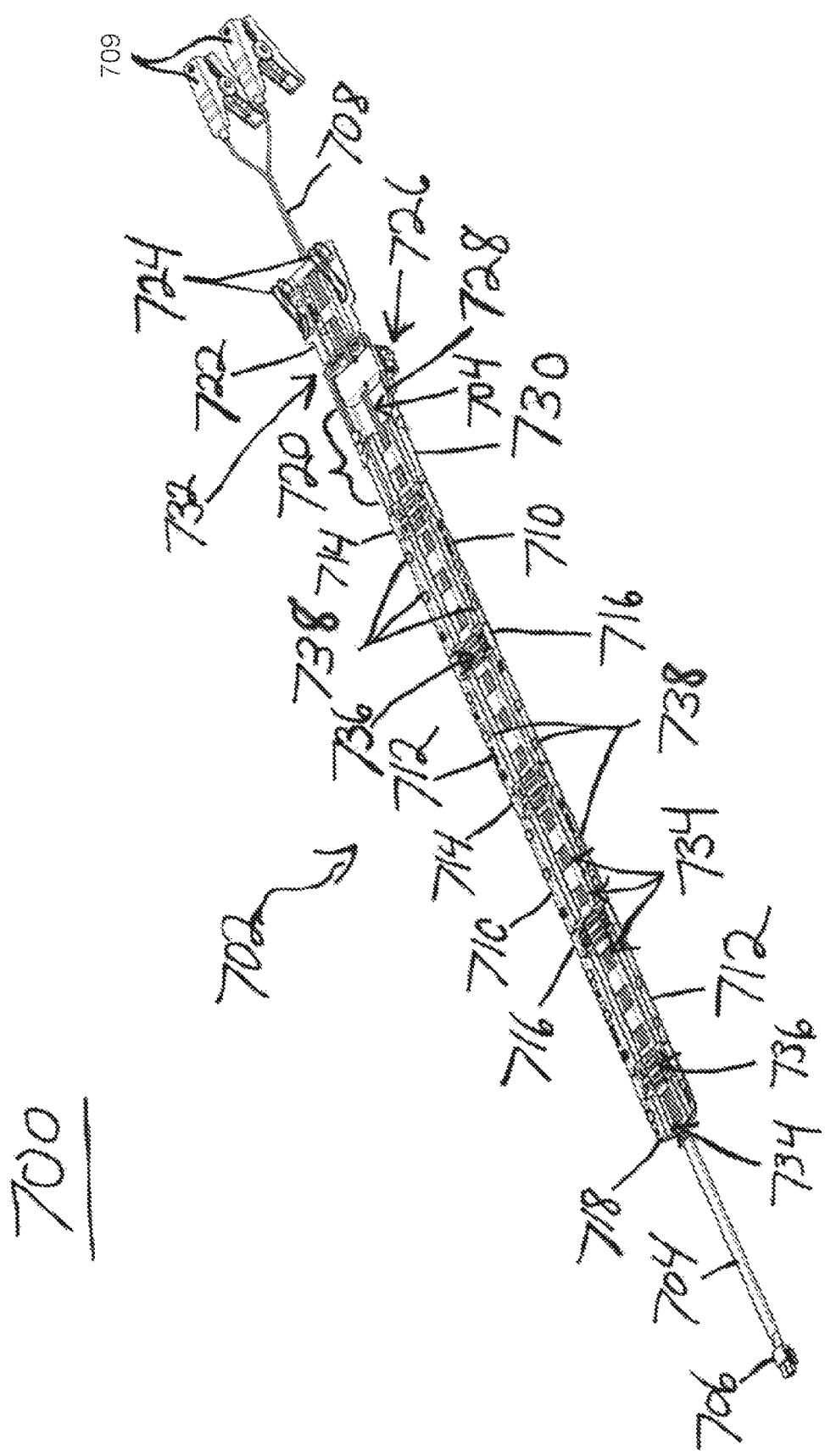
FIG. 14 is a bottom perspective view of an embodiment of a cord harness assembly.
Figure 15:
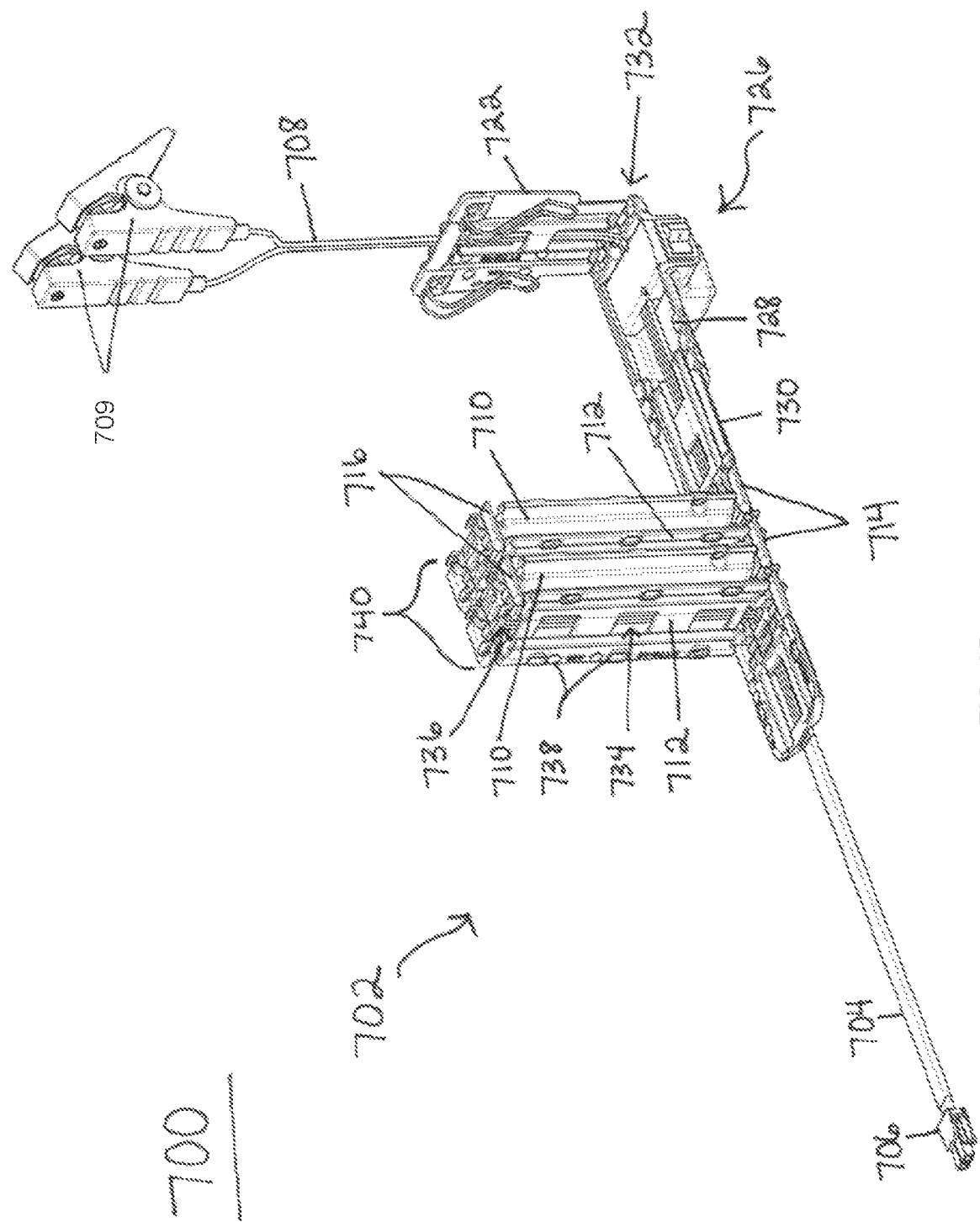
FIG. 15 is a perspective view of an embodiment of a cord harness assembly in a partially folded state.
Figure 16:
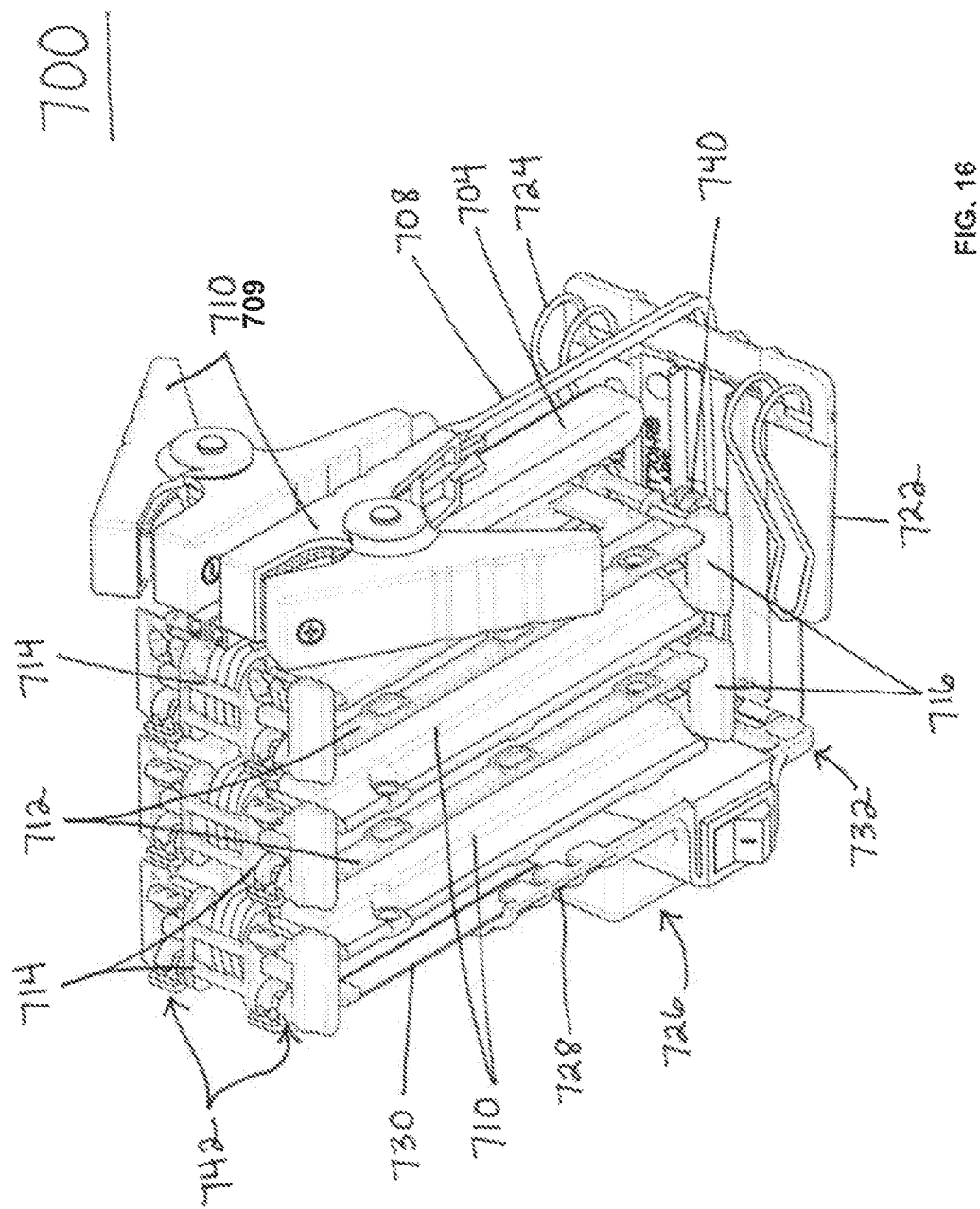
FIG. 16 is a perspective view of an embodiment of a cord harness assembly in a compact state.
Figure 17:
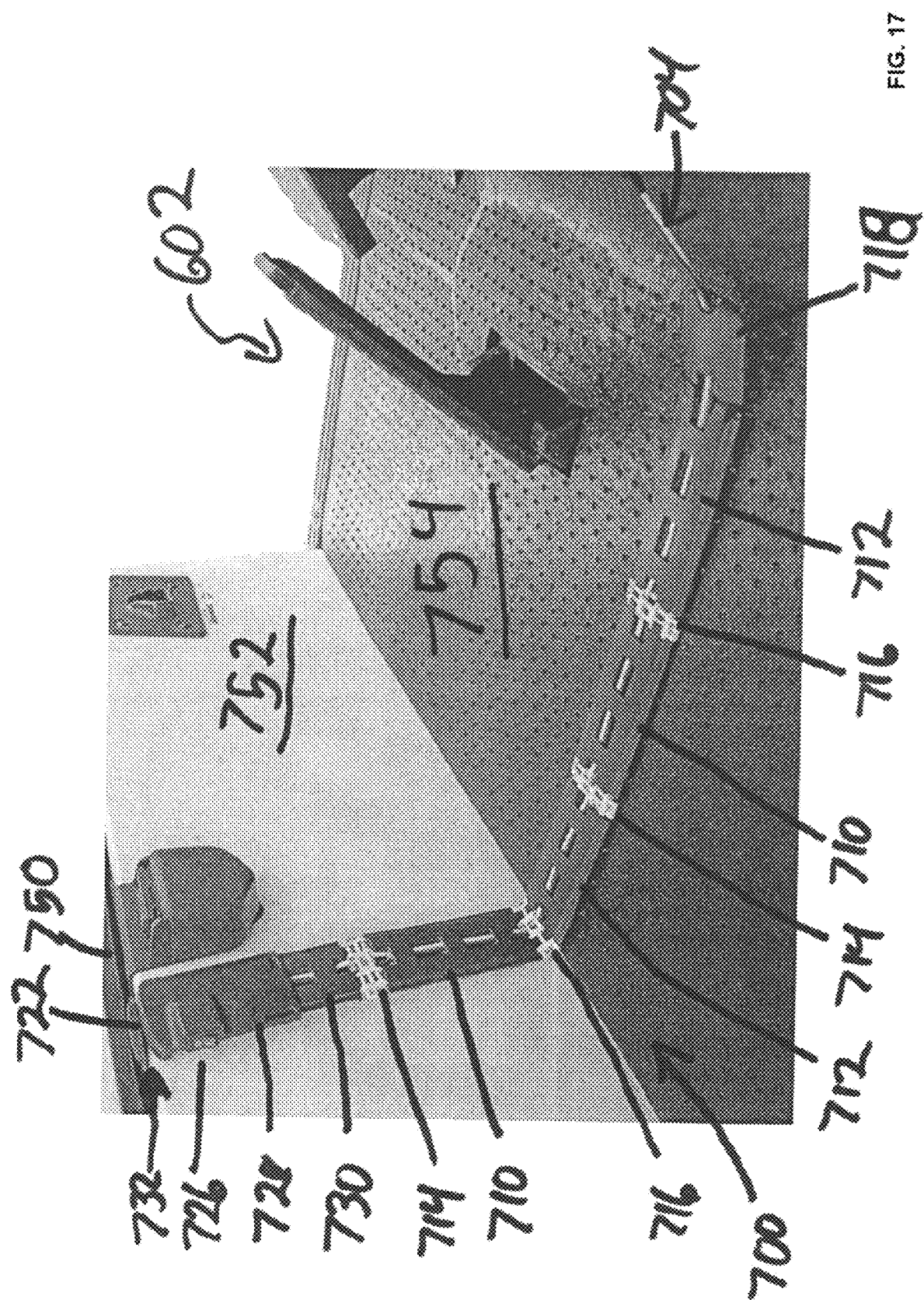
FIG. 17 is a perspective view of an embodiment of a cord harness assembly in a golf cart.

FIGS. 13 through 17 depict an embodiment of a power cord assembly 700 that may be used with an air conditioning apparatus or other device. FIGS. 13 and 14 respectively provide top and bottom perspective views of the power cord assembly 700 in an extended state. FIG. 15 illustrates the power cord assembly 700 in a partially folded state. FIG. 16 illustrates the power cord assembly 700 in a compact or folded state. FIG. 17 shows the power cord assembly 700 in a golf cart 602.

Some embodiments of the power cord assembly 700 are designed to be foldable allowing the power cord assembly 700 to transition between an expanded state and a compact state. In the embodiment shown, the power cord assembly 700 includes a cord harness 702, a first wire 704 attached to a connector 706 and a second wire 708 attached to clip connectors 709. The connector 706 is depicted as a male plug connector and the connectors 709 are depicted as clip connectors in this embodiment. In some embodiments, the connectors 706 and/or 709 may be replaced with alternative forms of electrical connectors, including prongs, receptacles, fitted connections, abutting connection, clips, plugs, induction connections and/or any other type of connection components. In addition, the connectors 706 and/or 709 may not be included in some embodiments allowing the wire ends to be connected directly to a power source or electronic device or a customized connector. In some embodiments, a protective fuse may be incorporated into one of the wires 704 and/or 708. For example, a fuse may be placed in line in the wire 708 between the cord harness 702 and the connectors 709.

The first wire 704 is shown with an insulation or protective sheath between one end of the cord harness 702 and the connector 706. In some embodiments, the sheath may be molded onto the first wire 704. In some embodiments, the sheath may continue through the open channel of the cord harness 702. In this embodiment, the first wire 704 continues through the open channel of the cord harness 702 until it reaches the end of the second wire 708 at a junction within said cord harness 702. In some embodiments without a junction, the first wire 704 and the second wire 708 are the same wire. In the embodiment shown, the second wire 708 comprises two sections of the second wire 708 that split prior to reaching two of the clip connectors 709. The distance of the two sections of the second wire 708 may be configured to allow the two clip connectors 709 sufficient space to connect to separate terminals of a battery, another power source, and/or an electric device.

In some embodiments, the cord harness 702 includes a series of guard sections 710 and 712 connected with hinges 714 and 716. The hinges 714 and 716 are designed to allow the guard sections 710 and 712 to fold between a first position (e.g. against one another as shown in FIGS. 15 and 16) to a second position (e.g. extended as shown in FIGS. 13, 14 and 17) and/or other positions. The guard sections 710 and 712 include connectors at both ends configured to attach to hinges 714 and 716. In some embodiments, the guard sections 710 and 712 are designed to be the same configuration. In some embodiments with the same guard sections 710 and 712, the orientation of each of the guard sections 710 and 712 may be reversed. In some embodiments, the guard sections 710 and 712 may have distinct design features.

Similar to the guard sections 710 and 712, the hinges 714 and 716 are designed to be the same configuration in some embodiments and distinct configurations in other embodiments. In addition, some configurations of the hinges 714 and 716 may allow each of the hinges 714 and 716 to be in attached in a reversed orientation.

The guard sections 710 and 712 include guard channels 734 and the hinges 714 and 716 include hinge channels 736. Collectively, the guard channels 734 and the hinge channels 736 provide a path for one or both of the wires 704 and 708 through the guard sections 710 and 712 and the hinge sections 714 and 716. In some embodiments, the guard sections 710 and 712 and the hinges 714 and 716 are configured to provide structural protection to the wires 704 and 708 and keep the wires 704 and 708 in a set location that is out of the way.

In some embodiments, the connections between one of the guard sections 710 and 712 and one of the hinges 714 and 716 may be designed to lock into place in certain positions unless sufficient force is applied to change the state of the connection. For example, the connections may open into an extended state and lock into place to prevent the cord harness 702 from folding without applying a sufficient external force. Such a locking design may help prevent the cord harness 702 from rising off the floor or adjacent surface which could increase the likelihood of causing someone to trip or otherwise get caught on the cord harness 702. In some embodiments, the connections between one of the guard sections 710 and 712 and one of the hinges 714 and 716 may be designed to limit the rotation of the guard section 710 or 712 relative to the hinge 714 or 716. For example, the guard section 710 or 712 may only be able to rotate over a range of 180 degrees relative to the connected hinge 714 or 716. For another example, the guard section 710 or 712 may only be able to rotate over a range of 90 degrees relative to the connected hinge 714 or 716. For another example, the guard section 710 or 712 may only be able to rotate over a range of 225 degrees relative to the connected hinge 714 or 716. One skilled in the art will recognize that the range of rotation may vary and remain within the scope of the disclosure. Limiting the range of motion may further protect the wires 704 and 708 from repetitive stresses caused by bending in opposite directions.

This embodiment also includes a terminal guard section 718 at one end of the cord harness 702. The terminal guard section 718 is configured as an end piece with connectors only located at one end of the terminal guard section 718. The wire 704 extends outward from the end of the guard channel 734 of the terminal guard section 718.

In some embodiments, the cord harness 702 includes an adjustable section 720 comprising a slide guard section 730 and a slide cover 728 configured to slide along the slide guard section 730 allowing the length of section 720 to adjust. Embodiments of the adjustable section 720 may include additional or alternative adjustment mechanisms to the slide configuration shown. In some embodiments, the slide cover 728 includes a view opening 744 to facilitate the selection of set length configurations. In some embodiments, the set length configurations may be based upon specific characteristics of an environment for installation, such as an electric vehicle seat height or floorboard depth. In such embodiments, the set length configurations may be tied to a brand, model and/or style of the vehicle or other environment for installation.

In some embodiments, the slide cover 728 includes a control 726 to turn the power on and off. In this embodiment, the control 726 is a switch configured to connect the first wire 704 to the second wire 708 or disconnect the wires 704 and 708 to control the flow of power. In some embodiments, the control 726 operates as a battery isolation switch that simulates an ignition accessory function of a vehicle. For example, the control 726 may include a relay to operate an LED or other visual output (e.g. the visual output 118 of the air conditioning assembly 100) to indicate whether power is turned on or off at the control 726. In such embodiments, a user may be notified that power is on and draining the battery using a visual output, thereby reminding the user to shut off power using the control 726.

At the second end of the slide cover 728, away from the slide guard section 730, is the structural attachment section 722 connected by a hinge connection 732. The structural attachment section 722 is configured to attach the end of cord harness 702 to a structure. In some embodiments, the structural attachment section 722 is configured to fit a structure. For example, the structural attachment section 722 may include surface texturing designed to correspond with the surface of a structure to hold the cord harness 702 in place. In some embodiments, the structural attachment section 722 includes additional connectors, such as springs or the clips 724 shown in this embodiment. In some embodiments, the additional connectors may be any type of connector to facilitate a temporary connection with a structure, such as a magnet, a clip, a button, a hook, a snap, a clamp and/or any other connector. In some embodiments, the additional connectors may be any type of connector to facilitate a permanent or semi-permanent connection with a structure, such as a bolt, a screw, an adhesive and/or any other connector. In some embodiments, the structural attachment section 722 may not include any springs, clips 724 or other additional connectors.

In some embodiments, the cord harness 702 also includes traction elements 738 configured to grip, adhere and/or fit with the surface of a structure to hold the cord harness 702 in place. In this embodiment, the traction elements 738 are located on the bottom surface of the guard sections 710 and 712 in multiple locations. In some embodiments, the traction elements 738 are configured for specific surfaces. For example, the design and spacing of the traction elements 738 may be configured to fit the bumps on the surface of the floorboard of a golf cart. For another example, multiple detents or cleats may extend downward to grip a carpet, a grooved surface and/or a resilient surface that will mold to the cleats. In such specifically configured designs, the features of the surface and usable surface area may be leveraged to create a stable and/or non-slip fit between the traction elements 738 and the specific surface.

FIG. 15 illustrates a view of the power cord assembly 700 from a bottom perspective view in a partially folded state at folded section 740. In this embodiment, the folded section 740 includes a group of guard sections 710 and 712 that have been folded with the corresponding hinges 714 and 716. The folded section 740 shows the component folded creating an "S" or "snake" pattern with the first wire 704. Based on the snake pattern in this embodiment, the guard sections 710 face towards one end of the cord harness 702 and each of the guard sections 712 face towards the opposite end of the cord harness 702. Similarly, each of the hinges 714 are located on the bottom of the view and each of the hinges 716 are on the top of the view. In addition, all of the hinges 714 and 716 continue to face the same direction with the bottom of each hinge facing upward in this view.

FIG. 16 illustrates a view of the power cord assembly 700 from a top perspective view in a fully folded or compact state. In this embodiment, the guard sections 710 and 712, the terminal guard section 718 and the slide guard section 730 have been folded with the corresponding hinges 714 and 716. These elements are folded creating an "S" or "snake" pattern with the first wire 704. In this embodiment, the snake pattern causes each of the guard sections 710 to face towards the terminal guard section 718 and each of the guard sections 712 to face towards the slide guard section 730. Similarly, each of the hinges 714 are located on the top of this view and each of the hinges 716 are on the bottom of the view. In addition, all of the hinges 714 and 716 continue to face the same direction with the top of each hinge facing upward in this view.

In the embodiment shown, the structural attachment arm 722 folds under the bottom side of the guard and hinge section. In addition, the portion of the wires 704 and 708 that extend beyond the cord harness 702 are layered adjacent to the folded guard sections 710 and 712. Among other benefits, this compact state of the power cord assembly 700 may facilitate reduced storage space and a reduced cost for packaging, shipping and handling.

FIG. 17 shows the power cord assembly 700 installed in a golf cart 602. The power cord assembly 700 is laid out in an extended state fitted to the golf cart 602. In this embodiment, the golf cart 602 holds a battery underneath a seat top 750. The first end of the cord harness 702 having the structural attachment 722 is located proximate to the junction of the seat top 750 and a seat front 752. In some embodiments, the structural attachment 722 is folded outward to fit under the front of the seat top 750. The structural attachment 722 may provide protection for the wire 708 by structurally supporting the weight of the seat top 750 and any passengers or items placed on the seat top 750. This support provided by the structural attachment 722 limits or prevents the weight from being applied as a compressive force directly on the wire 708 which may cause damage to the wire 708. In addition, the structural attachment 722 may guide the wire 708 to the battery compartment of the golf cart 602, wherein the clip connectors 709 are used to connect the wire 708 to the battery. In some embodiments, the clips 724 on the structural attachment 722 may attach or grip the interior frame of the seat front 752 and/or other structural elements within the seat structure.

In some embodiments, the structural attachment 722 holds the slide cover 728 against the seat front 752. Embodiments of the design of the structural attachment 722, the slide cover 728 and the connection 732 may be configured to hold the slide cover 728 flat against the surface of the seat front 752 to minimize any obstruction within the golf cart 602. In addition, the configuration may hold the slide guard section 730, other guard sections 710 and 712 and/or hinges 714 and 716 flat against the seat front 752. In some embodiments, the angle between the structural attachment 722 and the slide cover 728 at the connection 732 may be around 90 degrees. One skilled in the art will recognize that the angle may vary depending on the structural design of the seat top 750 and the seat front 752. In some embodiments, the connection 732 may be configured to correspond to specific installation applications.

In this embodiment, guard sections 710 and 712 and the hinges 714 and 716 are directed downward along the seat front 752 then turn to follow the floorboard 754 of the golf cart 602 to the front of the golf cart 602 under the dash 612. The terminal guard section 718 is located approximately underneath the dash 612 and the wire 704 extending beyond the cord harness 702 continues up to the electronic device, such as the air conditioning assembly 100.

In some embodiments, the cord harness 702 is configured to have a hinge 714 or 716 located at the junction of the seat front 752 and the floorboard 754. A hinge 714 or 716 located in this position facilitates a transition from the vertical portion of the cord harness 702 to the horizontal portion of the cord harness 702 with the vertical portion being flat against the seat front 752 and the horizontal section being flat against the floorboard 754. As discussed above, the slide cover 728 and the slide guard section 730 are configured to allow adjusting the length of the cord harness 702. In the configuration shown, the slide cover 728 and the slide guard section 730 allow the user to adjust the height of the cord harness 702 such that a hinge 714 or 716 is located at the junction between the seat front 752 and the floorboard 754.

In some embodiments, the slide components 728 and 730 may be configured to have select heights corresponding to known structures. For example, the slide components 728 and 730 may have settings that are each associated with different heights corresponding to various heights of the seat front 752 for alternative models, brands or styles of golf carts 602. In such embodiments, each model, brand and/or style may be indicated on one of the slide components 728 and 730 such that a user may select the appropriate setting prior to installation. For example, the slide guard section 730 may include brands listed at the appropriate height setting and the slide cover 728 may include the view opening 744 that allows a user to see the brand marking on the slide guard section 730 to select the proper height for installation.

In some embodiments, the cord harness 702 is configured to have a specific hinge 714 or 716 located at the junction between the seat front 752 and the floorboard 754. For example, the cord harness 702 may be configured to have the hinge 716 fit into the junction in part because the angle at the junction is within an operational range of orientation for the guard sections 710 and 712 adjacent to the hinge 716. Such a configuration may be necessary for embodiments that have hinges 714 and 716 that only allow the connected guard sections 710 and 712 to rotate in over a single range that is 180 degrees or less.

In the embodiment shown, the cord harness 702 includes four guard sections 710 and 712. In some embodiments, the cord harness 702 may include fewer or more of the guard sections 710 and 712. Similarly, embodiments may include fewer or more hinges 714 and 716. In some embodiments, additional guard sections 710 and 712 and hinges 714 and 716 may be added to lengthen the cord harness 702. Alternatively, guard sections 710 and 712 and hinges 714 and 716 may be removed to shorten the cord harness 702.

During installation, a user may begin with the power cord assembly 700 in a compact state (see FIG. 16). The user may then extend the power cord assembly 700 by pulling the first end of the cord harness 702 with the structural attachment 722 around and then unfolding the snaked guard sections 710 and 712 and hinges 714 and 716. The user may then modify the position of the slide components 728 and 730 to select an appropriate height. The view opening 744 may be used to select the appropriate setting for a specific golf cart 602. The user can lift the seat 750 to expose the battery compartment of the golf cart 602. The user may then place the structural attachment 722 and attach the clips 724 to a frame portion of the seat front 752 or another frame within the battery compartment to hold the structural attachment 722 in position. While the battery compartment is open, the user may use the clip connectors 709 to attach the second wire 708 to a set of battery terminals.

With the structural attachment 722 in position, the user may layout the rest of the cord harness 702. In the embodiment shown, the first guard section 710 extends downward from the slide guard section 730 and connects to the hinge 716 at the junction between the seat front 752 and the floorboard 754. The user lays the additional guard sections 710 and 712 flat against the floorboard 754 directed to the front of the golf cart 602. In some embodiments, the user may ensure that the traction elements 738 are engaged with the floorboard 754. In embodiments with specialized traction elements 738, the user may adjust the placement of the cord harness 702 to match the corresponding configuration on the floorboard 754. For example, if the traction elements 738 are designed to fit on a pattern of bumps on the floorboard 754, the user may ensure the traction elements 738 are fitted to the pattern of bumps.

Once the cord harness is in place, the user may lead the first wire 704 to an external device (e.g. the air conditioning assembly 100) and connect the first wire 704 to the external device using the connector 706. When the power cord assembly 700 is installed with the clip connectors 709 attached to a battery and the connector 706 attached to the external device, the control 726 of the power cord assembly 700 operates to control the delivery of power from the battery to the external device. When the user turns the control 726 to an on setting, power is supplied to the external device. When the user turns the control 726 to an off setting, power is not able to reach the external device.

Figure 18:
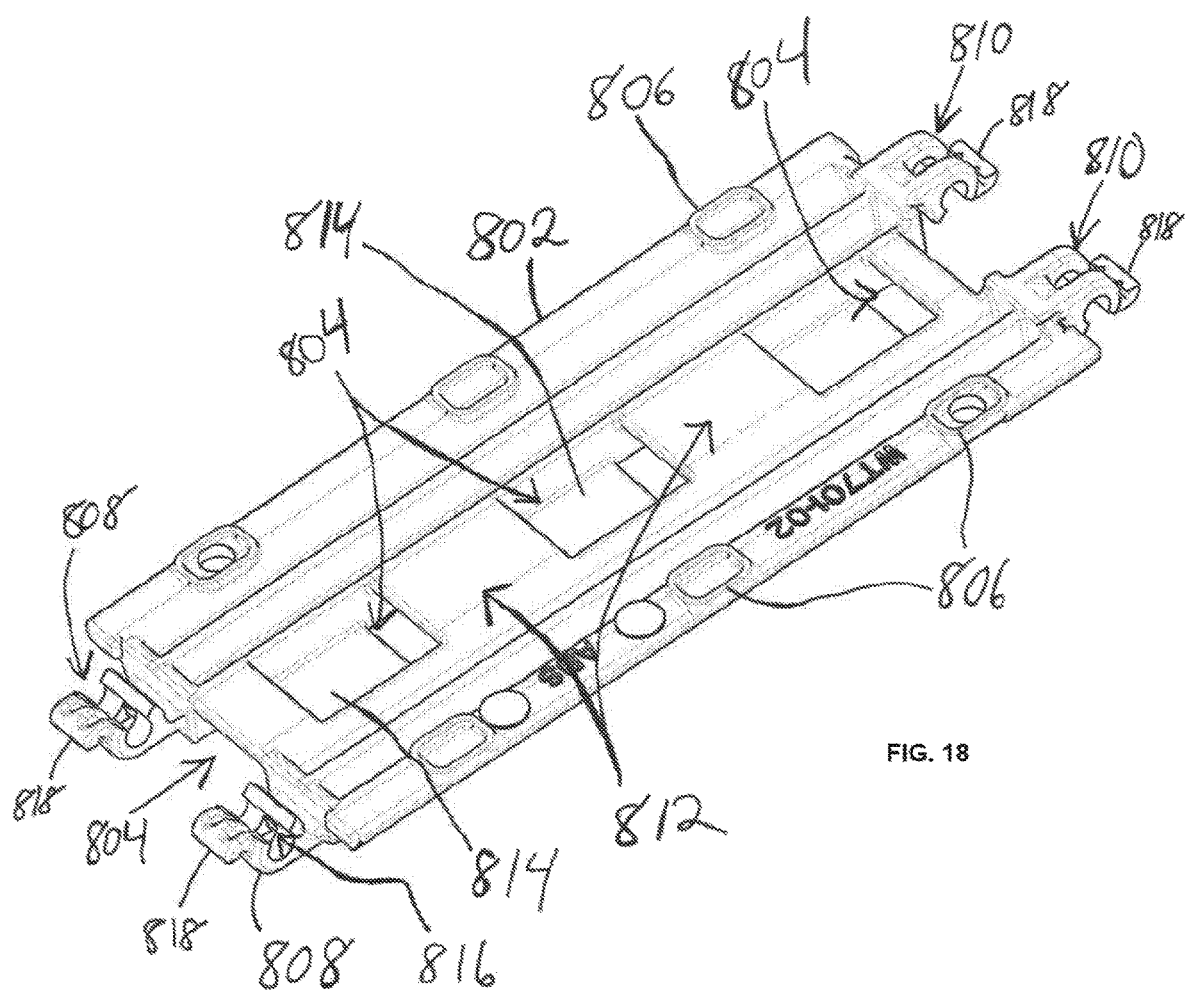
FIG. 18 is a bottom perspective view of an embodiment of a guard section.

FIG. 18 shows a bottom view an embodiment of a guard section 802 for a cord harness, such as cord harness 702. The guard section 802 includes a channel 804 passing along the long axis through the guard section 802. Embodiments of the guard section 802 may be narrower at the outer edges than at the center where the channel 804 is located to reduce the likelihood of something getting caught by the cord harness. In the embodiment shown, the channel 804 has a series of top frame sections 814 and a series bottom frame sections 812. When the guard section 802 is in use, a cord or wire may pass through the channel 804 between the top frame sections 814 and bottom frame sections 812. In some embodiments, a single top frame and a single bottom frame may be used to define the top and bottom portions of the channel 804.

In some embodiments, the guard section 802 includes a series of traction elements 806. The traction elements 806 are configured to increase the traction between the guard section 802 and the surface against which the guard section 802 is installed. The traction elements 806 may be cleats, hooks, prongs and/or any other gripping element. In some embodiments, the guard section 802 may include holes or other options to facilitate a permanent or semi-permanent attachment with a structure. For example, the guard section 802 may be secured to a floorboard of a vehicle using screws or bolts passing through a hole in the guard section 802.

The guard section 802 depicted also includes a first set of connectors 808 and a second set of connectors 810 at the ends of the long axis of the guard section. In some embodiments, the connectors 808 and 810 are configured to snap onto a corresponding section of a hinge to create a rotatable connection between the hinge component and the guard section 802. In some embodiments, the first set of connectors 808 and the second set of connectors 810 are in inverse orientations. For example, one set of connectors 808 or 810 may be designed to face downward (i.e. to the bottom) and the other set of connectors 808 or 810 may be designed to face upward (i.e. to the top). In some embodiments, the sets of connectors 808 and 810 may face the same direction. In some embodiments, each connector 808 and 810 may be oriented in a different direction.

In some embodiments, each of the connectors 808 and 810 have a groove 816 on the inside of the connector 808 and 810 configured to fit a corresponding extension or detent on a hinge. In addition, each of the connectors 808 and 810 include an extension 818 configured to limit rotation of the guard section 802.

Figure 19:
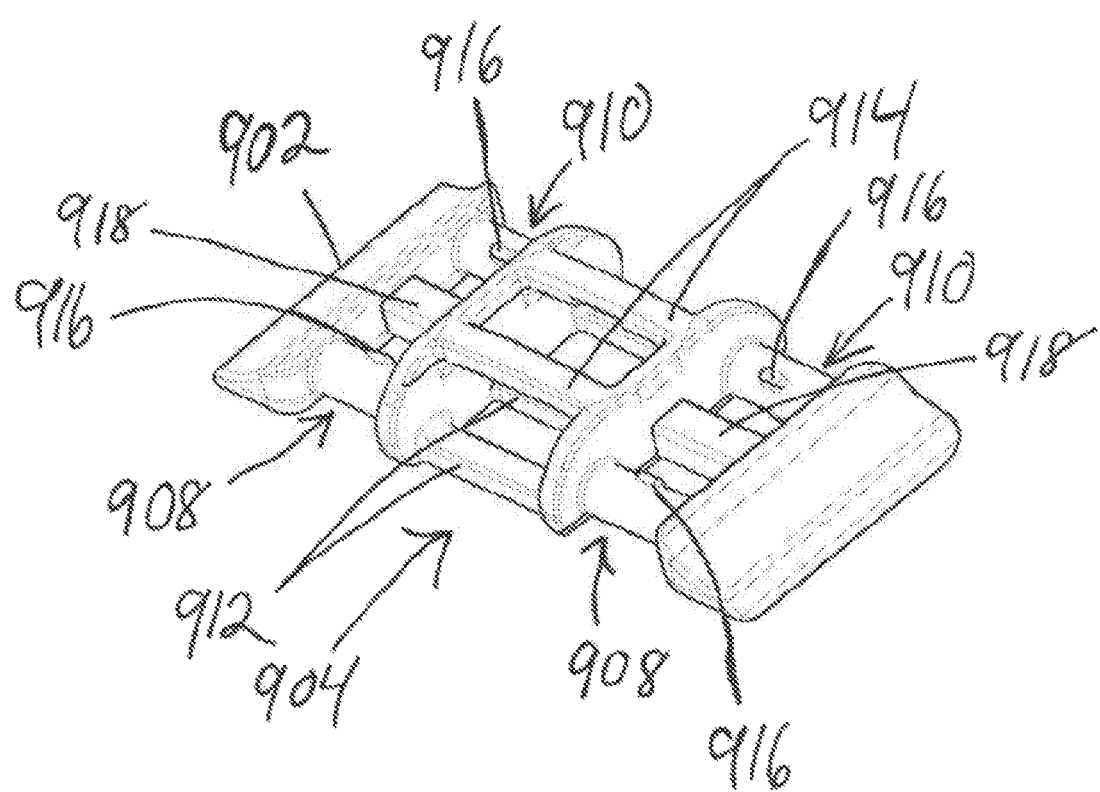
FIG. 19 is a top perspective view of an embodiment of a hinge.

FIG. 19 shows a top view of an embodiment of a hinge 902 for a cord harness, such as cord harness 702. The hinge 902 includes a channel 904 through the middle defined by top frames 914 and bottom frames 912. In some embodiments, the hinge 902 may include a single top frame element and a single bottom frame element to define the top and bottom of the channel 904. In some embodiments, the length of the hinge 902 along the channel 904 is designed to protect wires or cords passing through the channel 904 by limiting the ability to over bend and stress the wires or cords.

In addition, the hinge 902 includes a first set of connection bars 908 and a second set of connection bars 910. In some embodiments, the connection bars 908 and 910 are configured to correspond to connectors 808 and 810 of the guard section 802. The connection bars 908 and 910 also include a detent or prong 916 that extends from the connection bars 908 and 910 in this embodiment. In addition, the hinge 902 includes a brace 918. In some embodiments, the brace 918 is configured to stop the rotation of the hinge 902 by preventing the extension 818 from moving past the brace 918.

When the guard section 802 is attached to the hinge 902, one set of connector 808 or 810 is snapped onto one set of the connection bars 908 or 910. In some embodiments, the grooves 816 are configured to fit over the prongs 916, wherein the rotation of the guard section 802 and the hinge 902 is limited to a certain range (e.g. a 90 degree range, a 170 degree range, etc.) around the axis of the connection bars 908 or 910. Similarly, the extension 818 may rotate into an abutting position with brace 918 wherein the brace 918 and extension 818 prevent further rotation of the guard section 802 relative to the hinge 902.

In some embodiments, the range of rotation may be extended by applying a threshold force to turn the guard section 802 further around the hinge 902. In some embodiments, limits on the angle of rotation may be applied through other placements and/or combinations of fitted components. In some embodiments, alternative mechanisms may be employed to limit the rotation of the components.

In some embodiments, a foldable cord harness may be configured from attaching a series of guard sections 802 and hinges 902. The length may be modifiable by adding or removing more components. In addition, the orientation for connecting the guard sections 802 and hinges 902 may vary to provide alternative options for folding the harness into a compact state.

In some embodiments, the elements may be designed to allow a cord to be fitted into the cord harness by threading the cord through the channels 804 and 904 or opening the top sections or bottom sections to fit a cord into the channels 804 and 904. In some embodiments, cords may be designed to have cord harnesses attached thereto. In some embodiments, additional cordage may be provided on one or both ends of the cord harness. In such embodiments, the placement of the cord harness may be varied by moving the cord harness along the cord to a desired placement.

Embodiments of the power cord assembly may comprise a power cord and a cord harness comprising a plurality of guard sections and a plurality of hinges. Each said guard section may have a top, a bottom, a first side and a second side, and a first connector at a first end of said guard section and a second connector at a second end of said guard section. Each said guard section may include a guard channel through the guard section from said first end of said guard section to said second end of said guard section that is between said top and said bottom and between said first side and said second side. Each hinge may have a hinge top, a hinge bottom, a first hinge side and a second hinge side, and having a first hinge connector at a first end of said hinge and a second hinge connector at a second end of said hinge. Each said hinge may have a hinge channel through the hinge from said first end of said hinge to said second end of said hinge that is between said hinge top and said hinge bottom and between said first hinge side and said second hinge side. Each of said first hinge connector and said second hinge connector may be configured to connect with one of said first connector or said second connector of the guard section to create a rotatable connection. Said plurality of guard sections and said plurality of hinges may be connected serially with one of said guard sections followed by one of said hinges, wherein the pattern continues for additional said guard sections and said hinges. The power cord may comprise a wire, a first electrical connector and a second electrical connector, wherein said wire passes through a cord harness channel comprised of a plurality of said guard channels and a plurality of said hinge channels. In addition, said first electrical connector is located on said wire extending from a first end of said cord harness and said second electrical connector is located on said wire extending from a second end of the cord harness.

Embodiments of the power cord assembly may comprise an adjustable guard section operable to adjust a dimension of the cord harness along a direction consistent with said wire. Said adjustable guard section may comprise a slide guard section and a slide cover configured to slide relative to said slide guard section.

Embodiments of the power cord assembly may also comprise an electrical control operable to control a flow of electricity through said power cord assembly.

Embodiments of the cord harness may comprise a plurality of guard sections and a plurality of hinges. Each said guard section may have a top, a bottom, a first side and a second side, and a first connector at a first end of said guard section and a second connector at a second end of said guard section. Each said guard section may include a guard channel through the guard section from said first end of said guard section to said second end of said guard section that is between said top and said bottom and between said first side and said second side. Each hinge may have a hinge top, a hinge bottom, a first hinge side and a second hinge side, and having a first hinge connector at a first end of said hinge and a second hinge connector at a second end of said hinge. Each said hinge may have a hinge channel through the hinge from said first end of said hinge to said second end of said hinge that is between said hinge top and said hinge bottom and between said first hinge side and said second hinge side. Each of said first hinge connector and said second hinge connector may be configured to connect with one of said first connector or said second connector of the guard section to create a rotatable connection. Said plurality of guard sections and said plurality of hinges may be connected serially with one of said guard sections followed by one of said hinges, wherein the pattern continues for additional said guard sections and said hinges. Said cord harness may be configured to have a cord in a cord harness channel comprised of a plurality of said guard channels and a plurality of said hinge channels.

Embodiments of the plurality of guard sections may be foldable into a compact state by rotating each of said guard sections relative to each of said hinges.

Figure 20:
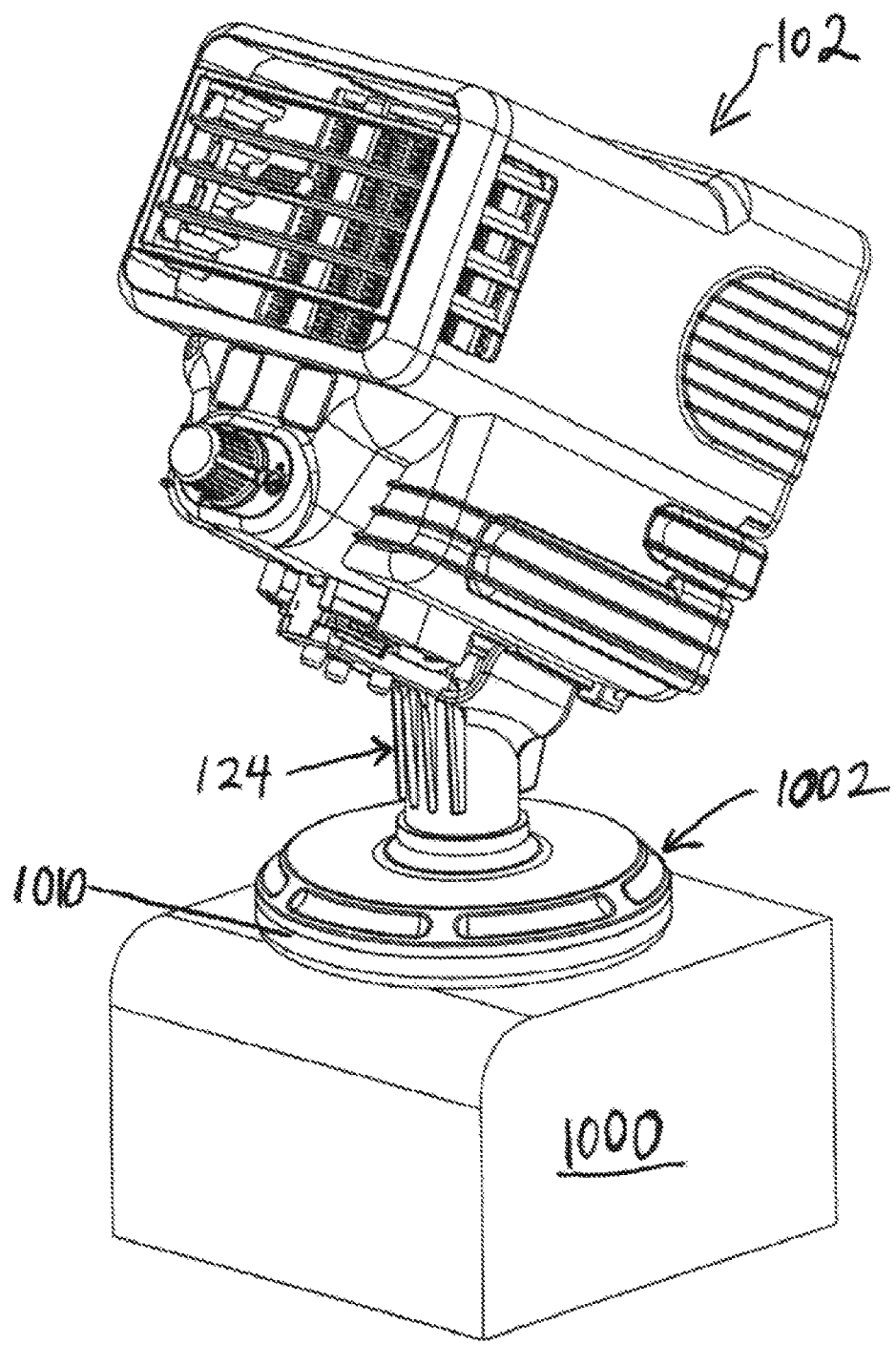
FIG. 20 is a perspective view of an embodiment of an air conditioning assembly in a cupholder.

FIG. 20 depicts an embodiment of the air conditioning apparatus 102 secured to a cupholder 1000. The cupholder 1000 is an illustrative cupholder for descriptive purposes. The cupholder 1000 may be any type of cupholder, including standalone cupholders (e.g. chairs, strollers, etc.), vehicle cupholders (e.g. cars, trucks, tractors, ATVs, electric carts, etc.) and/or other cupholders. In addition, the design and/or configuration of the cupholder 1000 may vary. For example, cupholder designs may vary in shape, height, width, surfaces, materials, etc. While the base 1002 is depicted and discussed in the context of the cupholder 1000 herein, the base 1002 and/or the concepts may be applied to other cupholder configurations. The air conditioning apparatus 102 is attached to a supporting element comprising a base 1002 with the attachment arm 124. The base 1002 includes a seal 1010 configured to form to the upper surface of the cupholder 1000. The seal 1010 may compress when the base 1002 is secured in the cupholder 1000 and help secure the base 1002 in place. In some embodiments, the seal 1010 may provide an aesthetic finish to the connection between the base 1002 and the cupholder 1000. In some embodiments, the seal 1010 may operate to create a liquid tight seal between the base 1002 and the cupholder 1000.

Figure 21:
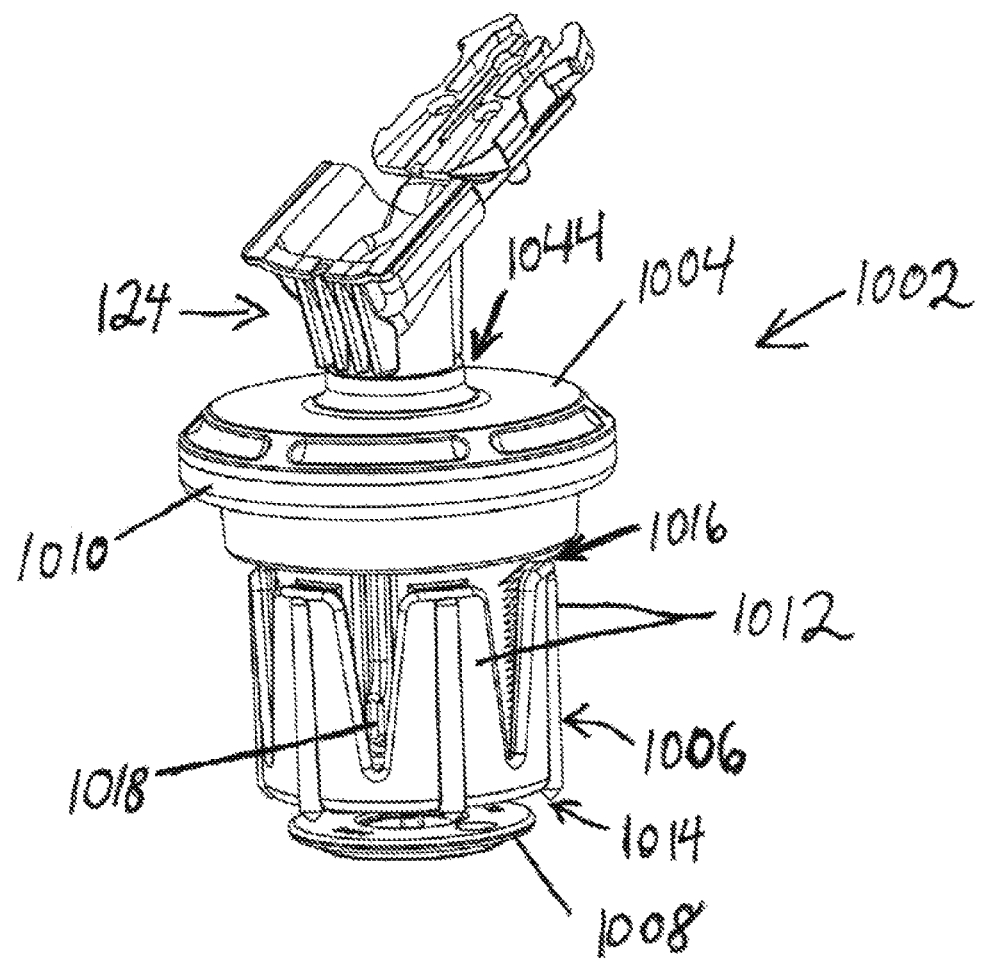
FIG. 21 is a perspective view of another embodiment of a support element.
Figure 22:
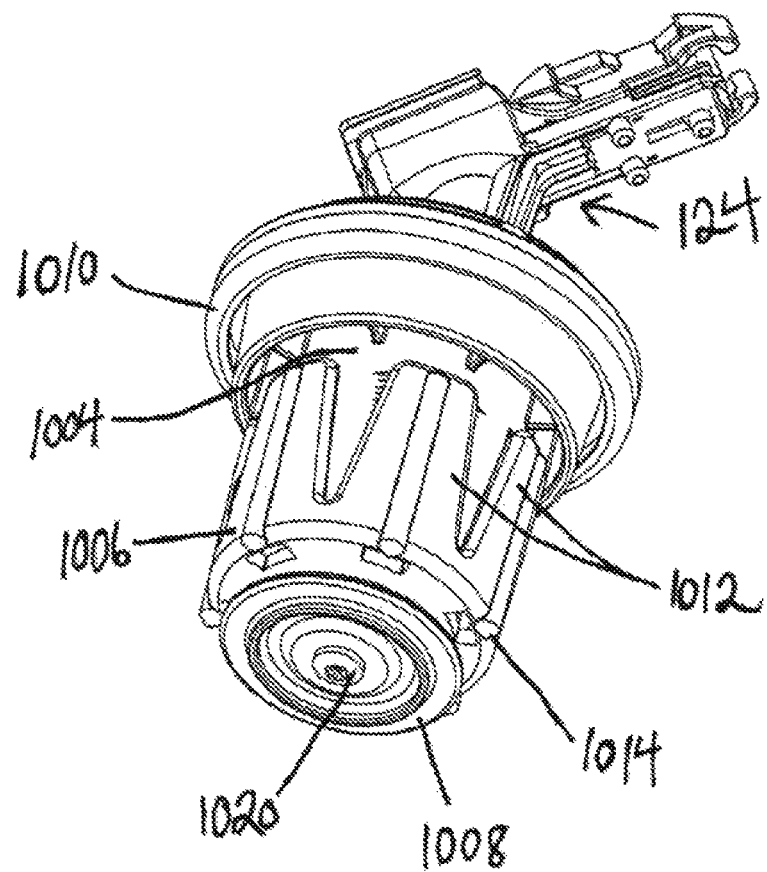
FIG. 22 is a bottom perspective view of an embodiment of a support element.
Figure 23:
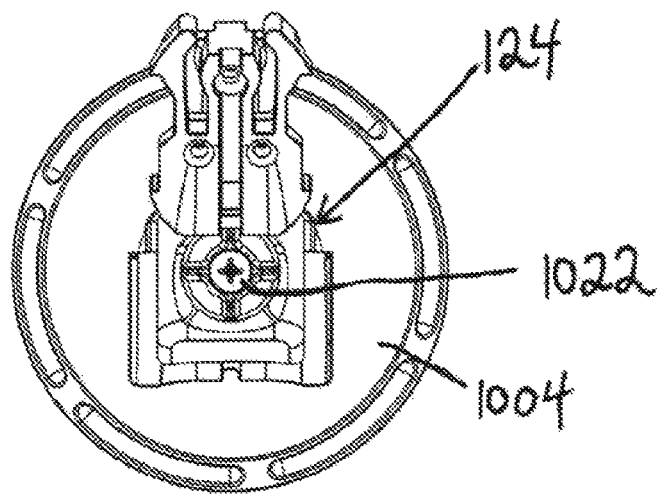
FIG. 23 is a top view of an embodiment of a support element.
Figure 24:
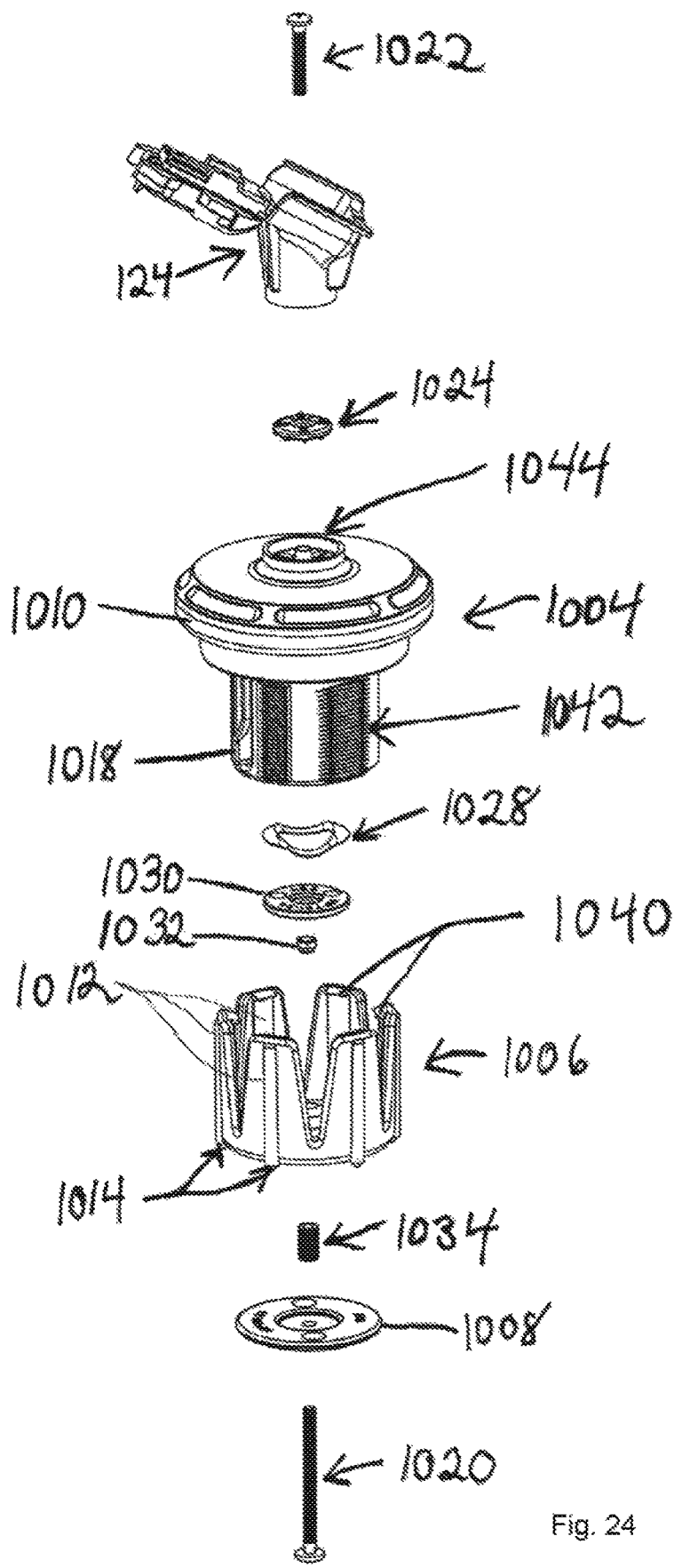
FIG. 24 is an exploded view of an embodiment of a support element.
Figure 25:
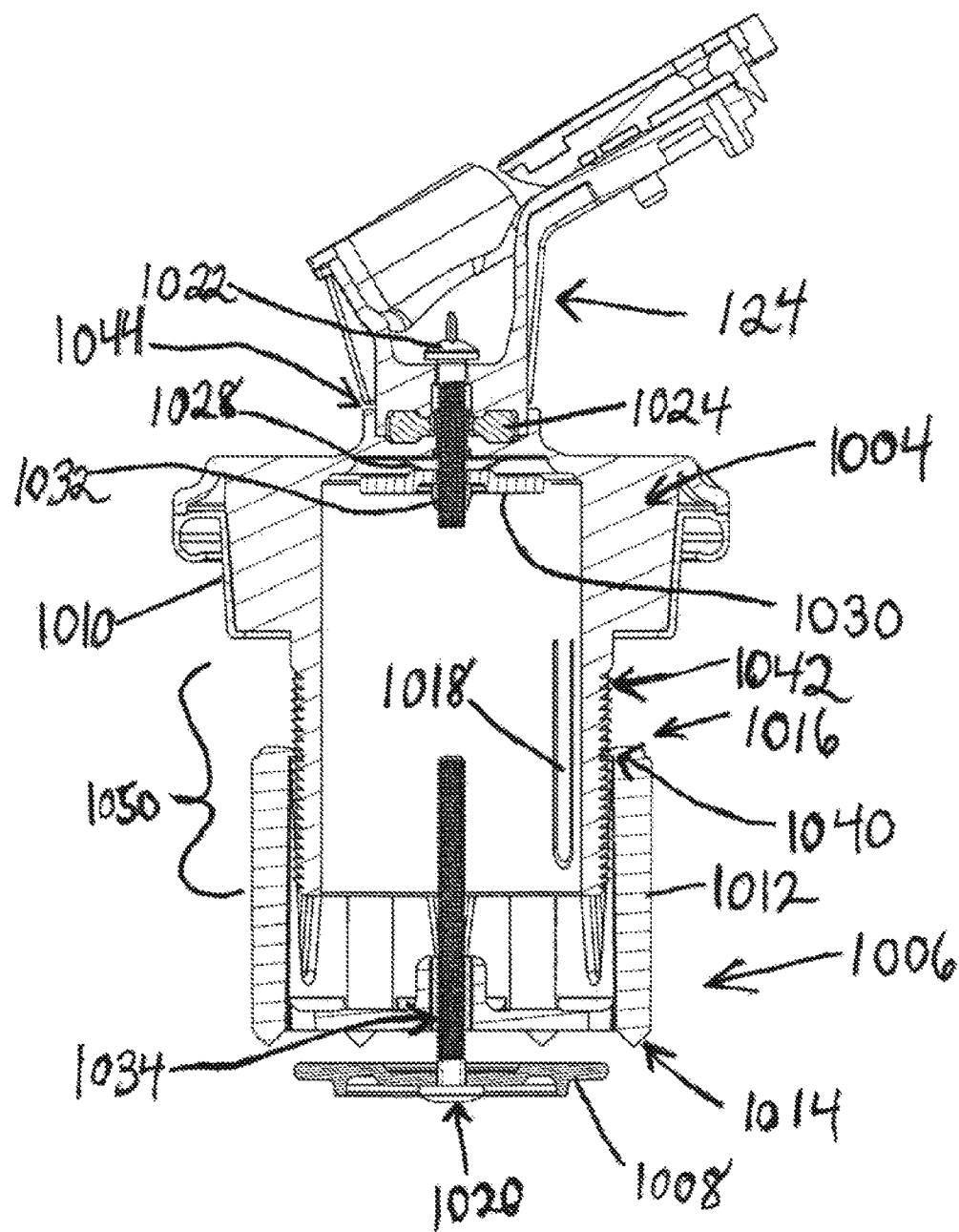
FIG. 25 is a side cross-section view of an embodiment of a support element.
Figure 26:
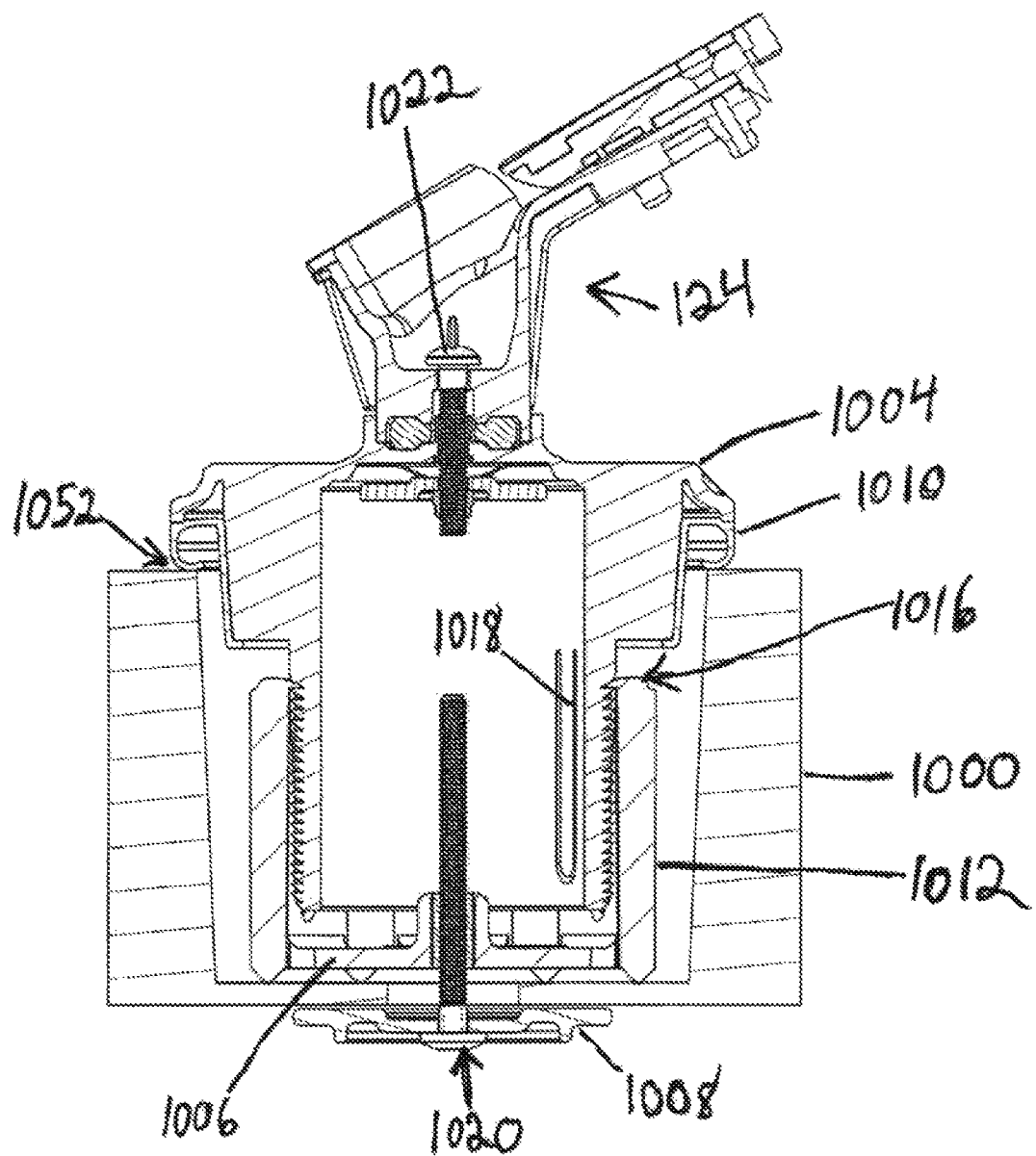
FIG. 26 is a side cross-section view of an embodiment of a support element in a cupholder.
Figure 27:
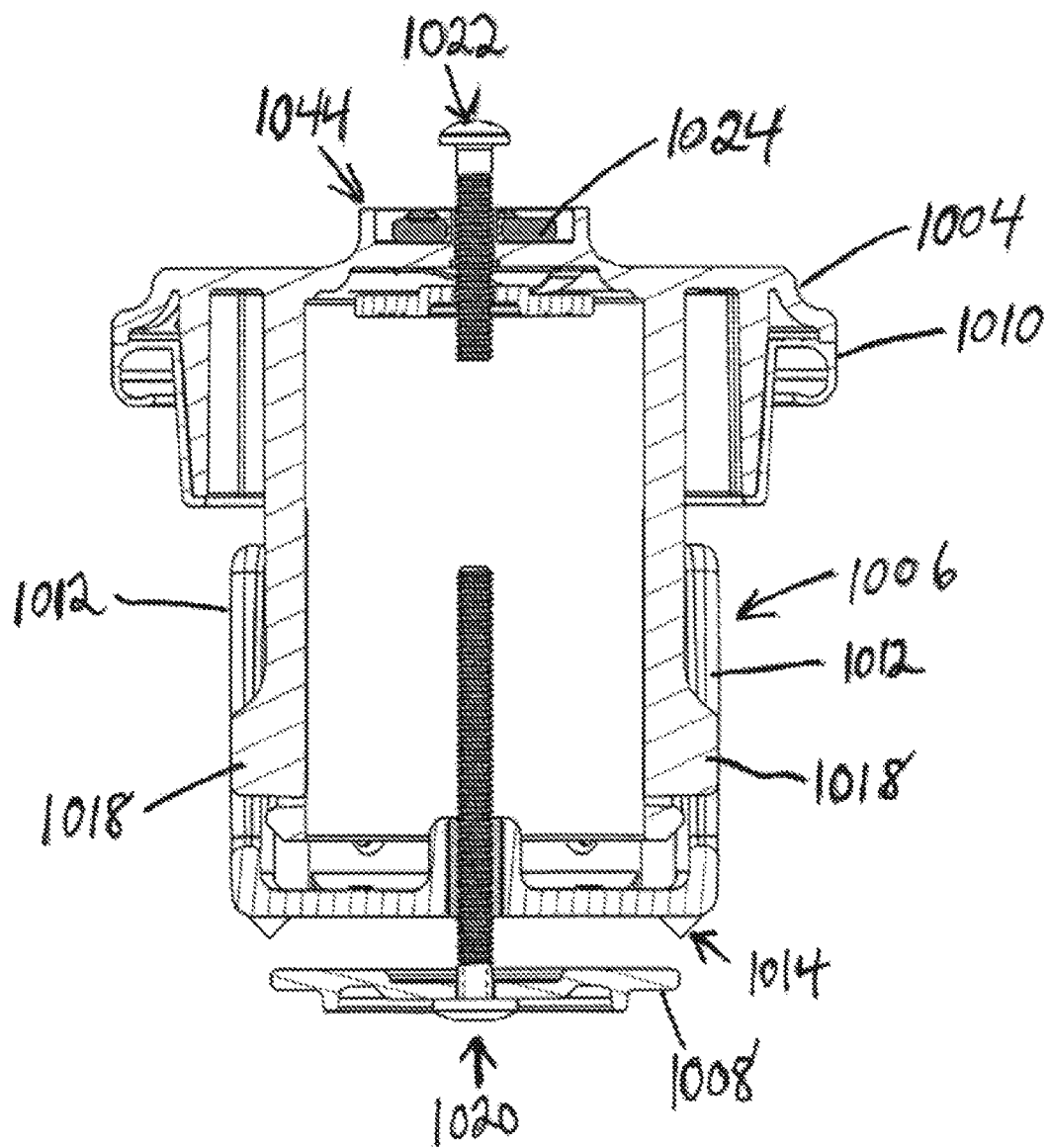
FIG. 27 is a side cross-section view of an embodiment of a base.

FIGS. 21 through 27 depict an embodiment of the supporting element with the base 1002 that may be used with an air conditioning apparatus or other device. FIGS. 21 through 23 show the supporting element from a side perspective view, a bottom perspective view and a top view respectively. FIG. 24 illustrates the supporting element in an exploded state. FIGS. 25 and 26 show cross-section views of the supporting assembly in an uninstalled and an installed state respectively. FIG. 27 shows an alternative cross-section view of the base 1002.

In the embodiment shown, the base 1002 is connected to the attachment arm 124 described in further detail above. In some embodiments, an alternative attachment arm or other supporting component may replace the attachment arm 124.

The base 1002 includes an upper structure 1004 (or upper component 1004) and a lower structure 1006 (or lower component 1006). The upper structure 1004 includes a top portion and a bottom portion. The bottom portion in this embodiment has a cylindrical shape and the top portion is generally shaped like a disk or plate that is larger in diameter than the diameter of the bottom portion. The upper structure 1004 may be made of a single material and formed as a single piece with the top and bottom portions. The bottom portion of the upper structure 1004 is configured to fit within the lower structure 1006 and collectively within a cupholder. The top portion of the upper structure 1004 is configured to fit over the top of a cupholder opening.

The top portion includes a support structure port 1044. The attachment arm 124 fits in the support structure port 1044 and is secured to the upper structure 1004 by upper bolt 1022 in this embodiment. In some embodiments, an alternative connector may be used to connect the attachment arm 124 to the upper structure 1004, such as a screw, a pin, a snap fit connection or other connector. In some embodiments, the connection may be configured to allow the attachment arm 124 to rotate relative to the base 1002.

This embodiment includes the seal 1010 located beneath the top portion and around the outside of the bottom portion of the upper structure 1004. In some embodiments, the seal 1010 may be adhered to the upper structure 1004. As discussed above, the seal 1010 may be configured to improve the fit, the look, create a liquid-tight seal or provide other advantages when the base 1002 is placed in a cupholder.

The bottom portion of the upper structure 1004 includes one or more sets of ribs 1042. Each of the ribs is horizontally disposed on the exterior of the bottom portion with a set of ribs 1042 including a series of horizontally disposed ribs arranged one above the other creating a vertical set of ribs 1042. The set of ribs 1042 is configured to extend vertically to facilitate an adjustable height feature of the base 1002. Embodiments of the set of ribs 1042 may extend from the bottom to the top of the bottom portion of the upper structure 1004. In some embodiments, the set of ribs 1042 may only extend over part of the height of the bottom portion. For example, the set of ribs 1042 may be between 1 and 3 inches tall. More specifically, the set of ribs 1042 may be between 1½ and 2 inches tall. The selected height of the set of ribs 1042 may vary based upon the configuration of the base 1002, the intended application and/or other considerations. Embodiments of the upper structure 1004 may include a plurality of sets of ribs 1042. For example, the upper structure 1004 may have six sets of ribs 1042.

The lower structure 1006 in this embodiment is shaped like a cylinder with a bottom plate and an open top. The diameter of the lower structure 1006 is configured to fit around the bottom portion of the upper structure 1004. In the embodiment shown, the sides of the lower structure 1006 have a series of fingers 1012 that are trapezoidal in shape with a wider base near the bottom of the lower structure 1006 and a narrower top. An open "V" shape is created between the fingers 1012.

A protrusion or tooth 1040 extends inwardly at the top of each finger 1012 in this embodiment. In some embodiments, a tooth 1040 may be located on a limited number of the fingers 1012. The tooth 1040 is configured to correspond with a set of ribs 1042 whereby the tooth 1040 fits between two ribs in the set of ribs 1042. The tooth 1040 creates a connection with the ribs to limit the movement of the lower structure 1006 relative to the upper structure 1004. In the depicted embodiment, the connection between the lower structure 1006 and the upper structure 1004 created by the teeth 1040 and the set of ribs 1042 is indicated by joint 1016. Embodiments of the design may include joints 1016 all around the circumference of the base 1002 at the locations where a tooth 1040 engages a set of ribs 1042.

The connection at joint 1016 is designed to prevent movement unless a sufficient vertical force is applied to overcome the connection. The threshold force may be designed to prevent inadvertent movement between the upper structure 1004 and the lower structure 1006 while allowing movement when a person applies sufficient vertical force. In some embodiments, the ribs and the tooth 1040 may be angled to prevent movement in one direction while allowing movement in the opposite direction. For example, each of the ribs may be angled upwards toward the top portion of the upper structure 1004 and the tooth 1040 may be angled downward toward the bottom of the lower structure 1006. In such a design, the tooth 1040 and the one of the ribs lock into each other when a force is applied to pull the upper structure 1004 from the lower structure 1006 and slide across each other when the upper structure 1004 and the lower structure 1006 are compressed.

Some embodiments of the lower structure 1006 include feet 1014 located on the bottom of the lower structure 1006 at locations along the outer edge. In the embodiment shown, a foot 1014 is associated with each of the fingers 1012. The feet 1014 extend below the bottom surface of the structure 1004. When the base 1002 is placed in a cupholder, the feet 1014 contact the bottom or a surface within the cupholder and creates a gap between the bottom surface of the lower structure 1006 and the upper surface of the bottom of the cupholder.

In this embodiment, the upper structure 1004 includes a pair of protrusions 1018 configured to prevent or limit rotation of the lower structure 1006 relative to the upper structure 1004. The protrusions 1018 are designed to fit in the "V" shape between the fingers 1012 of the lower structure 1006. When engaged, the lower structure 1006 is not able to turn more than the space between the protrusions 1018 and the edges of the fingers 1012.

In some embodiments, the protrusions 1018 are part of a flexible configuration whereby the protrusions are located on one end of a flexible member that allows the protrusions 1018 to bend inward towards the center of the bottom portion of the upper structure 1004. The flexibility of the protrusions 1018 may be dependent on the type of material, thickness of the material and/or other factors. In some embodiments, alternative forms of flexibility may be incorporated instead of the design shown and/or in addition to the design shown. For example, a spring may be located behind the protrusions 1018 that is compressible to allow the protrusion to be compressed to be flat or nearly flat with the adjacent surface of the bottom portion of the upper structure 1004. In some embodiments, a person may manually compress the protrusions 1018 to allow the lower structure 1006 to rotate relative to the upper structure 1004. In some embodiments, bottom of the "V" is configured to cause the protrusions 1018 to compress within the interior surface of the lower structure 1006 allowing the lower structure 1006 to rotate relative to the upper structure 1004. In some embodiments, the lower structure 1006 may be rotated when the protrusions 1018 are compressed to align the fingers 1012 between sets of ribs 1042. In this position, the lower structure 1006 will be able to slide downward off of the upper structure 1004 without the teeth 1040 engaging the sets of ribs 1042.

A base plate 1008 is shown below the bottom of the lower structure 1006. When the base 1002 is installed in a cupholder, the base plate 1008 is located below the bottom of the cupholder and connected through the cupholder to the lower structure by a lower bolt 1020. In some embodiments, an alternative connector may be used to connect the base plate 1008 to the lower structure 1006, such as a screw, a pin, a snap fit connection or other connector.

When the base 1002 is installed, the upper structure 1004 with the lower structure 1006 is placed in a cupholder and the upper structure 1004 is compressed downward into the lower structure 1006 to a height for the given cupholder. Then the lower bolt 1020 with the base plate 1008 is passed through the cupholder and engages the bottom of the lower structure 1006. As the lower bolt 1020 is tightened, the center of the lower structure 1006 pulls downward in the gap between the bottom surface of the lower structure 1006 and the cupholder created by the feet 1014. The downward pull on the lower structure 1006 causes the tops of the fingers 1012 with the teeth 1040 to pull inward against the corresponding ribs of the sets of ribs 1042 increasing the strength of the connection between the lower structure 1006 and the upper structure 1004. The increased strength of the connection causes the threshold force necessary to vertically move the lower structure 1006 relative to the upper structure 1004 to increase.

The exploded view provided in FIG. 24 illustrates a configuration of elements of the embodiment. This embodiment includes attachment arm 124, the upper structure 1004, the lower structure 1006 and the base plate 1008. Also depicted are connector elements including the upper bolt 1022, the lower bolt 1020, a positioning washer 1024, a spring washer 1028, a flat washer 1030, a nut 1032 and an anchor nut 1034. Some embodiments may incorporate alternative connector elements and/or configurations instead of or in conjunction with the element shown.

In this embodiment, the anchor nut 1034 is attached to the bottom of lower structure 1006 as illustrated in the cross-section shown in FIG. 25. The anchor nut 1034 may be attached to the lower structure 1006 by a threaded connection, a friction connection, an adhesive connection, welded connection and/or another type of connection. In some embodiments, the anchor nut 1034 may be constructed with the lower portion 1006 as a single component. During operation, the lower bolt 1020 is configured to connect with the anchor nut 1034 to tighten the base 1002 to a cupholder. The anchor nut 1034 is configured to allow one end of the lower bolt 1020 to pass through the anchor nut 1034 into the open cavity within this embodiment of the base 1002 as depicted in FIG. 25.

The upper bolt 1022, the positioning washer 1024, the spring washer 1028, the flat washer 1030 and the nut 1032 facilitate the connection between the attachment arm 124 and the upper structure 1004 in this embodiment. The upper bolt 1022 passes through the elements and connects to the nut 1032. The positioning washer 1024 is located between the attachment arm 124 and the upper structure 1004 and includes one or more ridges configured to correspond with one or more indentions in the attachment arm 124 and/or the upper structure 1004. The flat washer 1030 applies pressure to the spring washer 1028 as the upper bolt 1022 is tightened with respect to the nut 1032.

When the connection is engaged, the spring washer 1024 creates a tension holding the attachment arm 124 in a first position. The positioning washer 1024 engages the attachment arm 124 and/or the upper structure 1004 and prevents the attachment arm 124 from rotating around the axis of the upper bolt 1022 relative to the upper structure 1004 during normal operating conditions. The spring washer 1028 in conjunction with the positioning washer 1024 are configured to create a threshold force that must be overcome in order to rotate the attachment arm 124 relative to the upper structure 1004. If a user intends to rotate the attachment arm 124 relative to the upper structure, the user must apply a sufficient force to the attachment arm 124 and/or upper structure 1004 to overcome the threshold condition and allow the rotation. Once the user ceases to apply the sufficient force, the spring washer 1028 and positioning washer 1024 reengage to hold the attachment arm 124 in place. In combination, these features facilitate a detent mechanism that limits rotation unless a sufficient force is applied. In some embodiments, the ridges or protrusions in the positioning washer 1024 and/or corresponding ridges, protrusions or depressions in the attachment arm 124 and/or the upper structure 1004 may be configured to allow a set series of potential rotational orientations. In some embodiments, the ridges, protrusions and/or depressions may be located on the opposing structure. For example, the positioning washer 1024 may include a series of depressions and the attachment arm 124 and/or upper structure 1004 may include corresponding ridges.

FIG. 25 illustrates a cross-sectional view of an uninstalled version of the base 1002 with the attachment arm 124. The set of ribs 1042 includes a plurality of ribs along the engaging range indicated by bracket 1050. The connection between the lower structure 1006 and the upper structure 1004 indicated by joint 1016 may occur at any of the ribs along the bracket 1050. In this figure, the joint 1016 in approximately in the middle of the bracket 1050. In the uninstalled configuration, the lower structure 1006 and the upper structure 1004 are engaged based upon the constructed dimensions of the components with interior diameter of the lower structure 1006 (other than the teeth 1040) slightly larger than the outer diameter of the bottom portion of the upper structure 1004, wherein the teeth 1040 engage the exterior of the upper structure 1004.

FIG. 26 illustrates a cross-sectional view of the base 1002 with the attachment arm 124 installed in the cupholder 1000. In this embodiment, the upper structure 1004 is compacted with the lower structure 1006 causing the joint 1016 to be at the upper portion of the set of ribs 1042. In this embodiment, the upper structure 1004 compresses the seal 1010 against the top of the cupholder 1000 at juncture 1052. This embodiment further illustrates the tighter junction at the joint 1016 wherein the tops of the fingers 1012 are pulled inward by the downward force applied by the lower bolt 1020 on the lower structure 1006.

FIG. 27 illustrates another cross-sectional view of an uninstalled version of the base 1002 without the attachment arm 124. In this view, the cross-section is taken through two of the protrusions 1018. In addition, these cross-section views in FIGS. 25 and 26 illustrate the back of the protrusion 1018. In this embodiment, the back of the protrusion 1018 is shown as an elongated "U" shape opening with the lower portion of the "U" opposite from the extended portion of the protrusion shown in FIG. 27. In this embodiment, the "U" allows the protrusion 1018 to flex from the junction at the top of the "U". The extent of flexibility or elasticity in this embodiment may depend on a number of factors including the height of the "U", the material of the upper structure 1004, the thickness of the material and/or other factors.

Figure 28:
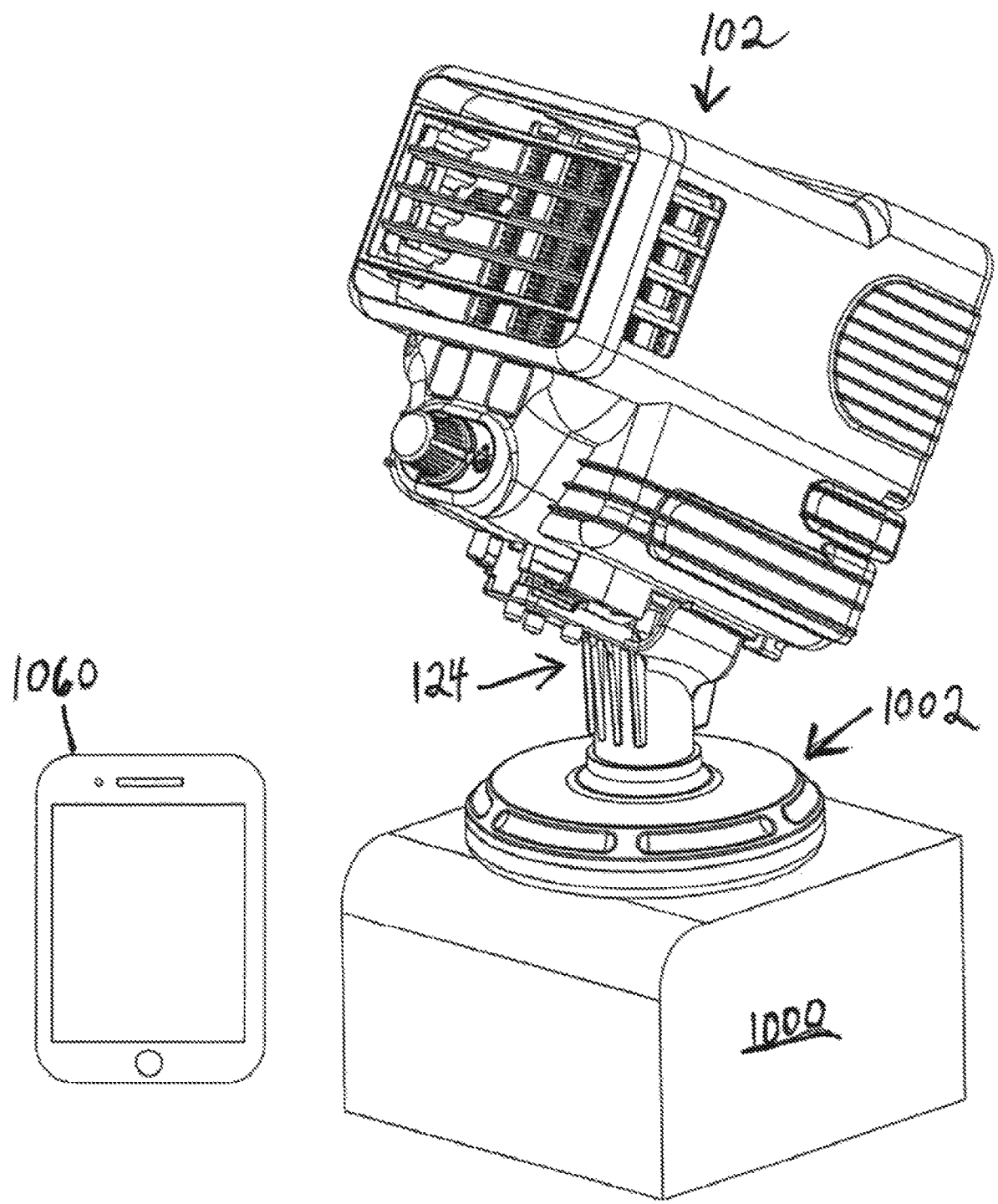
FIG. 28 is a perspective view of an embodiment of an air conditioning assembly in a cupholder with a remote device.

FIG. 28 depicts another embodiment of the air conditioning apparatus 102 secured to the cupholder 1000 with a supporting element comprising the base 1002 with the attachment arm 124. This embodiment also includes a phone 1060. As discussed with regard to other embodiments above, the air conditioning apparatus 102 may wirelessly communicate with the phone 1060. In some embodiments, the phone 1060 may be a smartphone, a tablet, a computer, a watch or another wireless phone or computing device. In some embodiments, the phone 1060 may be connected to the air conditioning apparatus 102 via a wired connection. For example, a wire connected from the phone 1060 to an electronics port, such as the ports 206 shown in FIG. 8.

In some embodiments, the phone 1060 operates as a remote control device to operate one or more features of the air conditioning apparatus 102. For example, the phone 1060 may include hardware and/or a software application to facilitate turning the fan, one or more heating elements and/or other components on or off. In addition, the phone 1060 may be operable to vary the fan speed and/or other modes of operation for the air conditioning apparatus 102. For example, the phone 1060 may be operable to control the heating and/or cooling functions of the air conditioning apparatus 102. During operation, a user may turn on the air conditioning apparatus 102 when the user is about to return to the driver's seat in order for the airflow to begin prior to the user's return.

In some embodiments, the phone 1060 may be operable to set parameters and/or operational features of the air conditioning apparatus 102. In some embodiments, a user may set the time for air conditioning apparatus 102 to operate after the optical sensor 120 indicates a user is no longer present. Embodiments may allow a user to set alarms related to usage of the air conditioning apparatus 102, vehicle data (e.g. battery charge, etc.). For example, a user may set an alarm to trigger immediately prior to shutting the air conditioning apparatus 102 off due to a sensor reading (e.g. an optical sensor, temperature sensor, etc.). As another example, the user may set a battery charge alarm setting at the user's selected charge level. In some embodiments, the phone 1060 may display a control option to easily turn features of the air conditioning apparatus 102 back on that have shut off while the user was away from the vehicle.

In some embodiments, the phone 1060 is operable as a remote monitoring device for the air conditioning apparatus 102 and/or features of the vehicle. The monitoring application of the phone 1060 may provide a user with operational data including fan settings, heating and/or cooling settings, operational mode, person presence indications, auxiliary feature settings of the air conditioning apparatus 102 (e.g. electronic port usage, etc.), vehicle battery charge level, ambient temperature level, output temperature level and/or other operational data. For example, the monitoring feature may show the air conditioning apparatus 102 is on a hold setting because no one is detected in the driver's seat. Additionally, the monitoring feature may show an icon indicating that one of the ports 206 is in use. The monitoring feature may also show a vehicle battery charge level along with an estimated battery life. In some embodiments, the monitoring feature may show an estimated battery life based upon the time until or charge level when the air conditioning apparatus 102 will be shut off to allow sufficient battery life to return the vehicle to a charging location. Some embodiments may also show sensor data including ambient temperature, air conditioning apparatus 102 output temperature and/or other data.

Embodiments of the base for supporting an air conditioning apparatus may comprise an upper component with a top portion above a bottom portion along a vertical axis. The top portion may be wider along a horizontal axis than the bottom portion and configured to support said air conditioning apparatus above the base. The bottom portion may include a set of ribs extending along the vertical axis on an exterior surface of the bottom portion with each of the ribs within the set of ribs horizontally disposed along a portion of said exterior surface. Embodiments may also include a lower component configured to fit within a cupholder having a plurality of fingers extending upwardly from a bottom plate of the lower component. The lower component may be configured to fit around the bottom portion of the upper component with the plurality of fingers including a tooth configured to engage at least one of the ribs. Some embodiments may include a base plate connected to the lower component via an adjustable connector, wherein, when installed, the base plate is configured to fit on a first side of a structure and the adjustable connector facilitates connection to the lower component on a second side of the structure. The height of the base from the bottom plate to the top portion may be variable based upon a location along the vertical axis of the rib which the tooth engages.

The structure may be a housing including the cupholder in some embodiments. Embodiments may include a seal below the top portion of the upper component wherein the seal abuts a bottom surface of the top portion and conforms to a top surface of the cupholder when installed in the structure.

In some embodiments, the bottom portion of the upper component and the fingers of the lower component comprise a round shape in a horizontal plane. The bottom portion of the upper component may include a plurality of the sets of ribs disposed around the exterior surface of the bottom portion and each of the plurality of fingers may correspond to one of the plurality of sets of ribs. Each of the plurality of fingers may include one tooth proximate to a top of the finger, and each tooth may be configured to engage at least one of the ribs in the corresponding one of the plurality of sets of ribs.

In some embodiments, the bottom portion of the upper component may include at least one locking feature configured to limit rotation of the upper component relative to the lower component. The locking feature may be a protrusion configured to fit between two of the plurality of fingers. In some embodiments, the protrusion may be flexible and configured to allow the rotation when a sufficient force is applied to move the protrusion within an inner surface of the lower component.

In some embodiments, the lower component may include a plurality of feet extending below the bottom plate and located along an outer edge of the bottom plate. The plurality of feet may raise the bottom plate above a surface of the structure when installed in the structure. In some embodiments, the bottom plate is configured to flex downward causing an inward force on the top of each of the plurality of fingers when downward pressure is applied by the adjustable connector.

Figure 29:
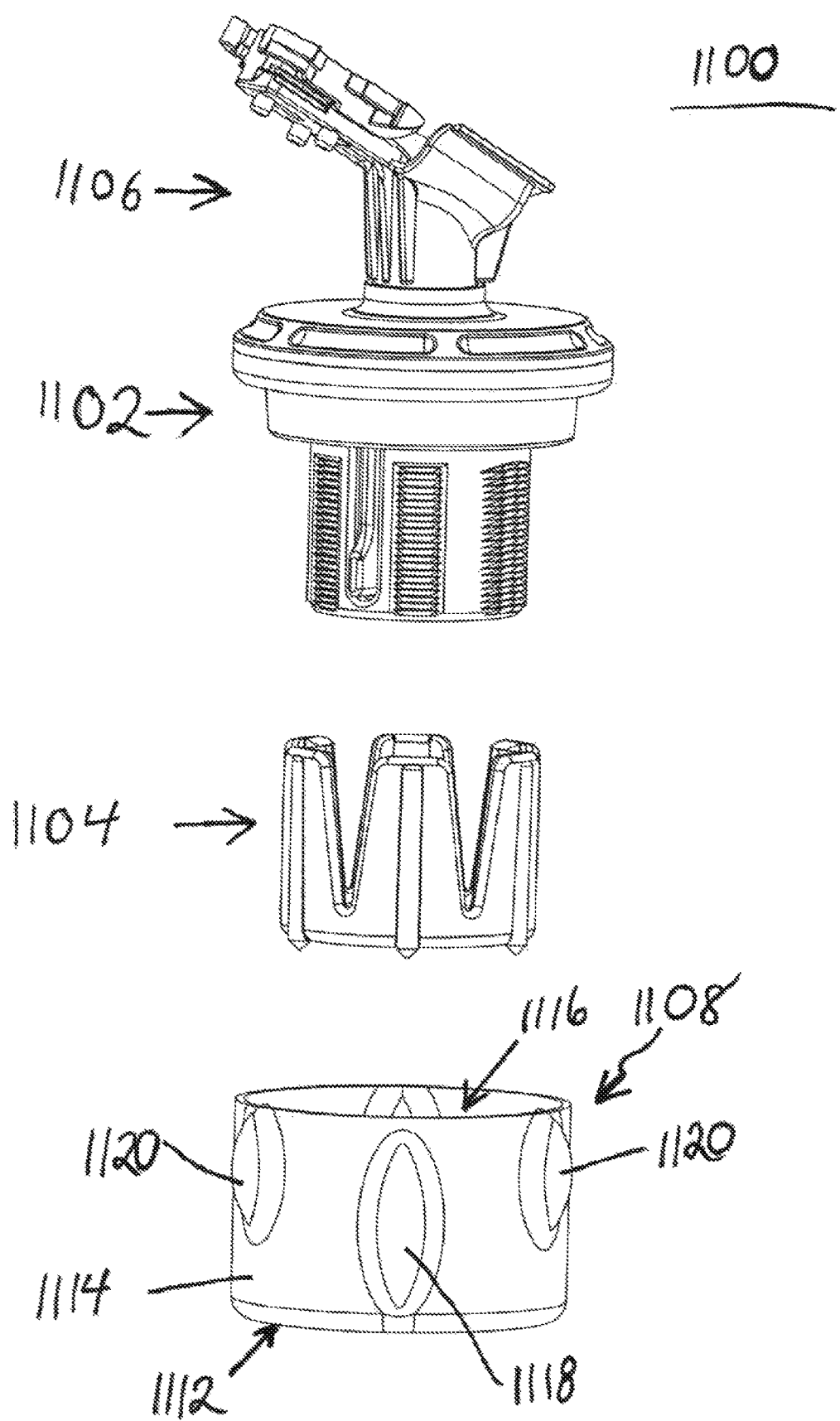
FIG. 29 is a partially exploded view of another embodiment of a support element.

FIG. 29 depicts a base 1100 for an air conditioning apparatus (such as those discussed above) or other devices. This embodiment of the base 1100 is similar to the base 1002 described above. The base 1100 includes an upper structure 1102 with an attachment arm 1106 and a lower structure 1104 which are similar to the upper structure 1004, the attachment arm 124 and the lower structure 1006 described above. In addition to these similar components, the base 1100 includes a foot component 1108.

This embodiment of the foot component 1108 includes a bottom 1112 and a side wall 1114 forming a cylindrical shape with an open top 1116. The foot component 1008 is configured to fit around the outside of the lower structure 1104. Some embodiments of the foot component 1108 may be different shapes to correspond to the shape of a lower structure component. In some embodiments, the foot component 1108 is configured to form a friction connection with the outside of the lower structure 1104. The materials of the foot component 1108 and/or the lower structure 1104 may be selected based in part on a friction coefficient of the material. The foot component 1108 is also configured to fit within a cupholder.

The foot component 1108 also includes a plurality of protrusions 1118 and 1120 incorporated in the side wall 1114. This embodiment illustrates multiple protrusion designs including first protrusions 1118 and second protrusions 1120 in this embodiment. In this embodiment, the first protrusions 1118 are elliptical and extend from the bottom 1112 upward nearly to the top of the side wall 1114, and the second protrusions 1120 are elliptical and extend down partially (approximately halfway as shown) from the top of the side wall 1114. In some embodiments, the design and shape of the protrusions 1118 and 1120 may vary.

In this embodiment, the protrusions 1118 and 1120 are spread around the surface of side wall 1114. In some embodiments, the protrusions 1118 and 1120 may be laid out in a pattern. For example, three of the first protrusions 1118 may be evenly spaced around the side wall 1114 and three of the second protrusions 1120 may be evenly spaced between the first protrusions 1118. In some embodiments, the protrusions 1118 and 1120 may be dispersed on the side wall 1114 in alternative patterns or random arrangements.

In some embodiments, the protrusions 1118 and 1120 are configured to be flexible or resilient. The flexibility may be incorporated through material selection and/or structural configurations. For example, the foot component 1108 may be a rubber material with the protrusions 1118 and 1120 structured as an elongated outward bubble that allows compression of the bubble. In such embodiments, the flexible protrusions 1118 and 1120 allow the foot component 1108 to fit cupholders having different designs. In addition, the flexible protrusions 1118 and 1120 increase friction between the foot component 1108 and the interior surface of the cupholder.

The embodiment shown illustrates the protrusions 1118 and 1120 as elliptical shaped elongated bubbles that may be compressed when inserted in a cupholder. When the protrusions 1118 and 1120 are compressed, the compression pressure is directed inward toward the lower structure 1104 and bottom portion of the upper structure 1102. Some embodiments of the foot component 1108 incorporate the protrusions 1118 and 1120 and materials to create a connection between the base 1100 and a cupholder using pressure and friction characteristics to limit the movement of the base 1100 relative to the cupholder. In some embodiments, the connection holds the base 1100 in place until a sufficient force is applied to move the base 1100 in the cupholder and/or remove the base 1100 from the cupholder.

For example, the foot component 1108 may be formed of a rubber material with a plurality of compressible protrusions 1118 and 1120 around the side wall 1114. When the base 1100 is placed in a cupholder, a plurality of the protrusions 1118 and 1120 (which could encompass all or a subset of the total protrusions 1118 and 1120) are compressed inward by the walls of the cupholder. When the protrusions 1118 and 1120 are compressed, they create a force between the walls of the cupholder and the lower structure 1104. In addition, the rubber material provides a friction between the materials of the lower structure 1104 on the inside surface and the cupholder on the outside surface. The compressive force on the protrusions 1118 and 1120 may also cause additional surface area of the foot component 1108 to contact the cupholder increasing the connection between the foot component 1108 and the cupholder. In such an embodiment, the combination of the friction of the rubber with the force created by the protrusions 1118 and 1120 creates a sufficient connection to hold the base 1100 in place when it is holding additional components, such as an air conditioning device.

The foot component 1108 may be applied to other base designs in some embodiments. For example, the foot component 1108 may be configured to fit on the bottom of the supporting assembly 104 discussed above.

Figure 30:
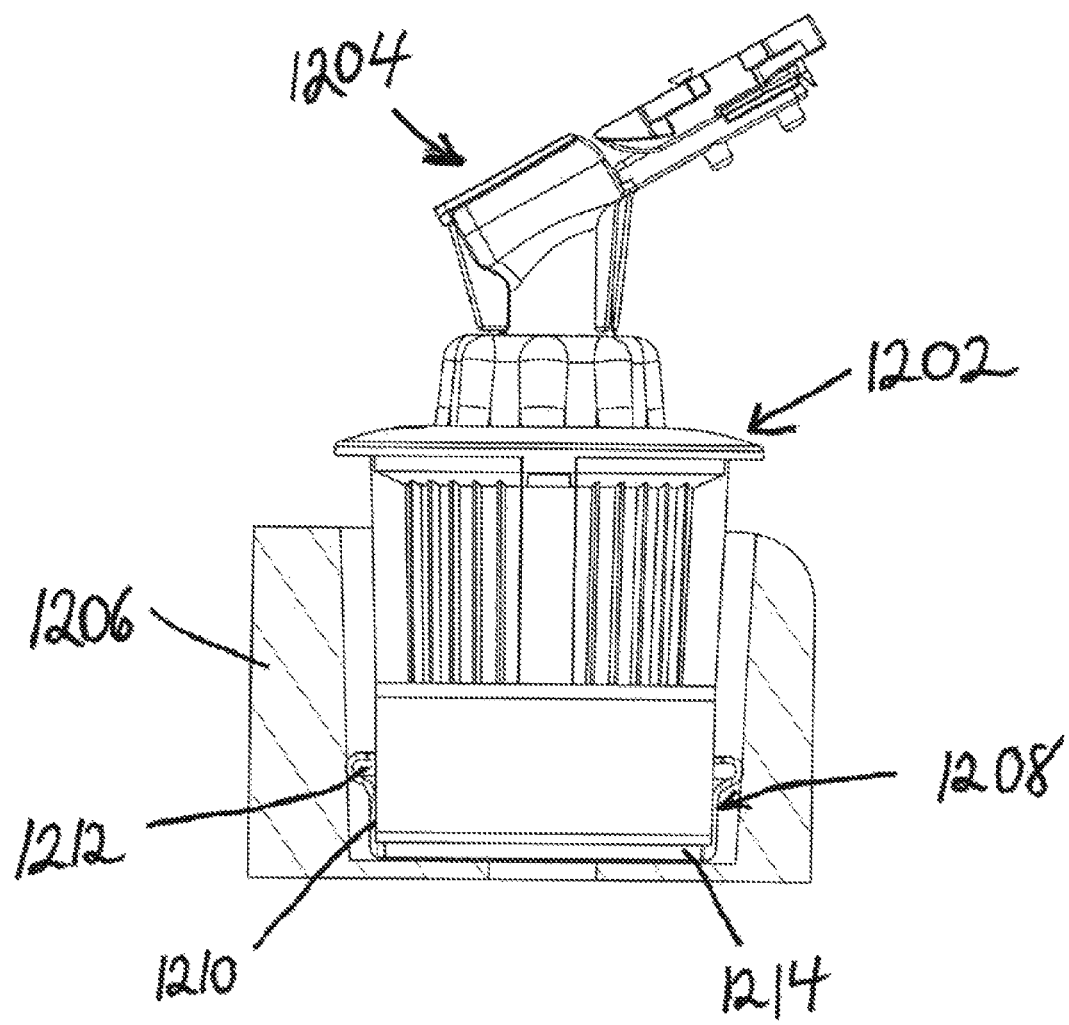
FIG. 30 is a side cross-section view of an embodiment of a support element in a cupholder.

FIG. 30 shows an embodiment of a base 1202 in a cupholder 1206. Similar to other embodiments, the base 1202 includes an attachment arm 1204 connected to the top of the base 1202. In addition, a foot component 1208 is shown around the bottom of the base 1202 in this embodiment.

In this embodiment, the foot component 1208 includes side wall 1210 with a lip 1212 at the top of the side wall 1210 and a bottom 1214. Embodiments of the foot component 1208 may be comprised in whole or in part of flexible materials. For example, the foot component 1208 may be a formed or molded piece of rubber that can flex with applied pressures. Some embodiments, may be made of rubber, plastic, foam, metal and/or other materials configured to provide flexibility. For another example, the bottom 1214 may be made of an inflexible material while the attached side wall 1210 is a flexible material. Embodiments of the foot component 1208 may use a variety of materials and/or design configurations to facilitate flexibility. In addition, all or part of the foot component 1208 may be made of a material and/or structurally configured to create friction when engaged with another surface.

In some embodiments, the foot component 1208 is conical in shape with the diameter at the lip 1212 larger than the outer diameter of the bottom 1214 with the side wall 1210 angling inward (towards the opposing side) from the top to the bottom 1214. In some embodiments, the diameter of the bottom 1214 of the foot component 1208 from one point on the interior of the side wall 1210 to the opposite point on the interior of the side wall 1210 is less than the outer diameter of the bottom of the base 1202. When the base 1202 presses downward in the foot component 1208, the side walls 1210 are pushed outward toward the interior walls of the cupholder 1206. The outward pressure on the side walls 1210 forces the outer portion of the lip 1212 against the interior walls of cupholder 1206. The pressure on the foot component 1208 between the base 1202 and the cupholder 1206 creates a connection to further stabilize the base 1202 within the cupholder.

In this embodiment, the lip 1212 is located at the top of the side walls 1210 and has an arch shape protruding outward from the side wall 1210 with an opening adjacent to the base 1202. The engagement of the lip 1212 above the bottom of the base 1202 expands support for the base 1202 by the foot component 1208 vertically. In some embodiments, when outward pressure is applied to the lip 1212 by the expanding side wall 1210, the upper portion of the lip 1212 (at the top of the foot component 1208) may be pressed back inward further engaging the base 1202 and creating additional points of contact between the foot component 1208 and the base 1202.

In some embodiments, the foot component 1208 is configured to provide a connection between the base 1202 and the cupholder 1206 with materials and designs configured to provide friction and pressure between the base 1202 and the cupholder 1206. The foot component 1208 may be made of a rubber material that is flexible and has a high friction coefficient. The foot component 1208 is formed or molded into a shape (such as the illustrated shape) that causes pressure to be applied between the base 1202 and the cupholder 1206. In such an embodiment, the bottom 1214 may create friction with the lower surface of the cupholder 1206 to limit sliding. The weight or other applied downward pressure may also be transferred through the foot component 1208 to increase the connection along the bottom 1214. In addition, the lip 1212 located at the top of the foot component 1208 expands outward engaging the walls of the cupholder 1206 above the lower surface of the cupholder 1206. The force from the lip 1212 and the friction created by the engagement of the lip 1212 further limits the movement of the base 1202 relative to the cupholder 1206.

When the base 1202 is placed in a cupholder, the lip 1212 is compressed inward by the walls of the cupholder 1206. When the lip 1212 is compressed, it creates a force between the walls of the cupholder 1206 and the base 1202. The compressive force on the lip 1212 may also cause additional surface area of the foot component 1208 to contact the cupholder 1206 increasing the connection between the foot component 1208 and the cupholder 1206. In such an embodiment, the combination of the friction of the rubber with the force created by the lip 1212 creates a sufficient connection to hold the base 1202 in place when it is holding additional components, such as an air conditioning device. In some embodiments, the connection holds the base 1202 in place until a sufficient force is applied to move the base 1202 in the cupholder 1206 and/or remove the base 1202 from the cupholder 1206.

The foot component 1208 may be applied to other base designs in some embodiments. For example, the foot component 1208 may be configured to fit on the base 1002 discussed above.

Figure 31:
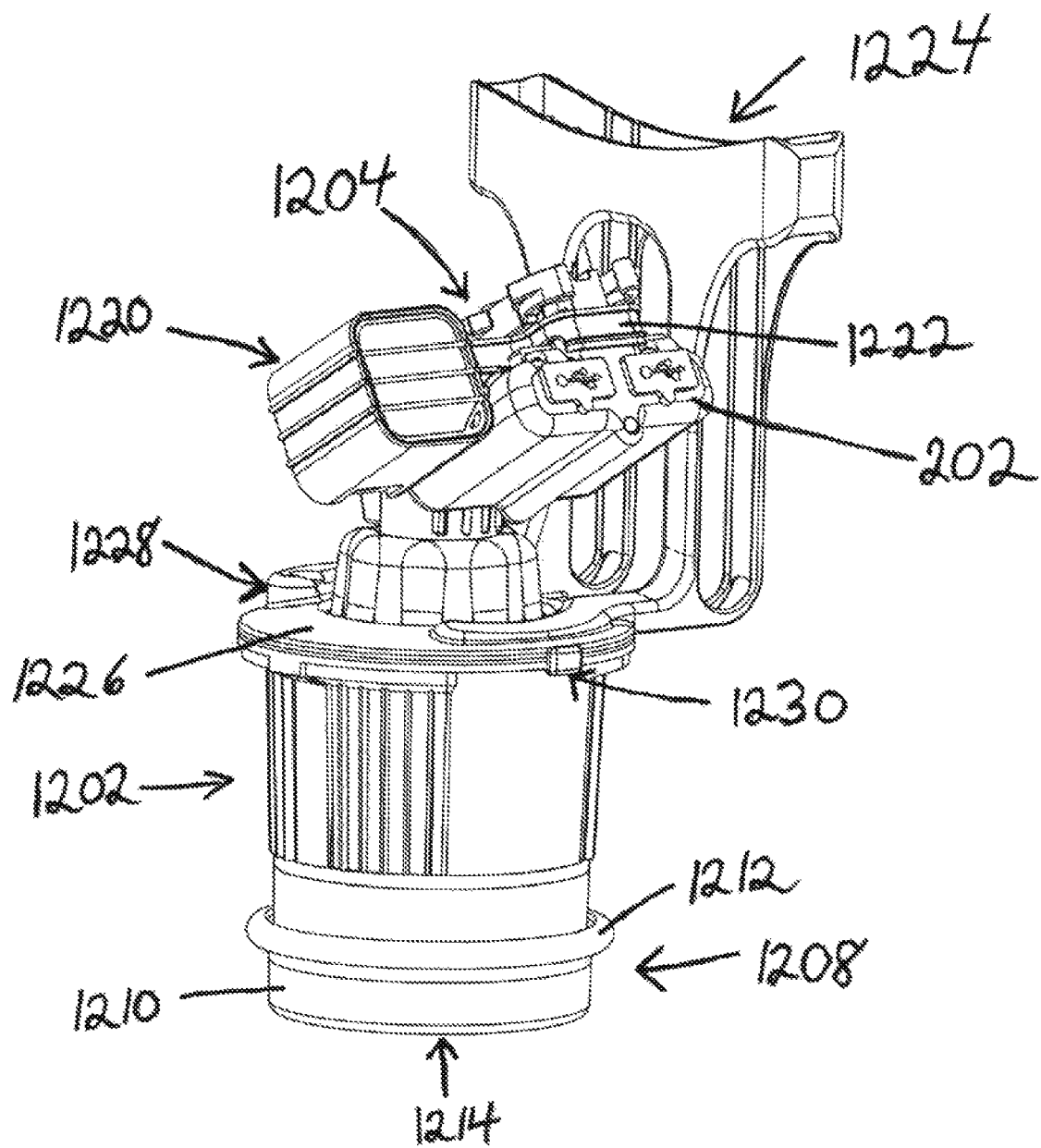
FIG. 31 is a perspective view of an embodiment of a support element with additional elements.
Figure 32:
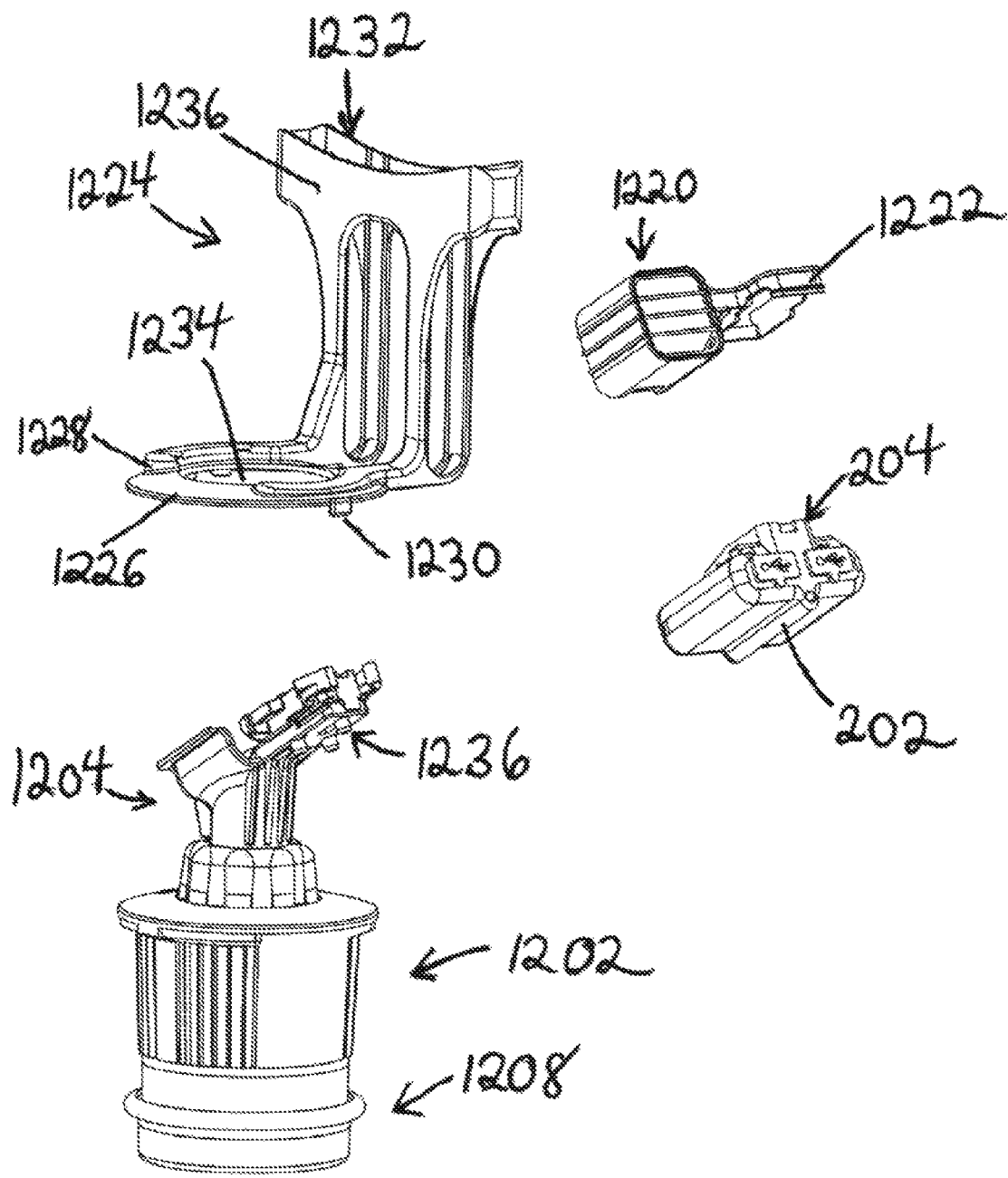
FIG. 32 is a partially exploded view of FIG. 31.
Figure 33:
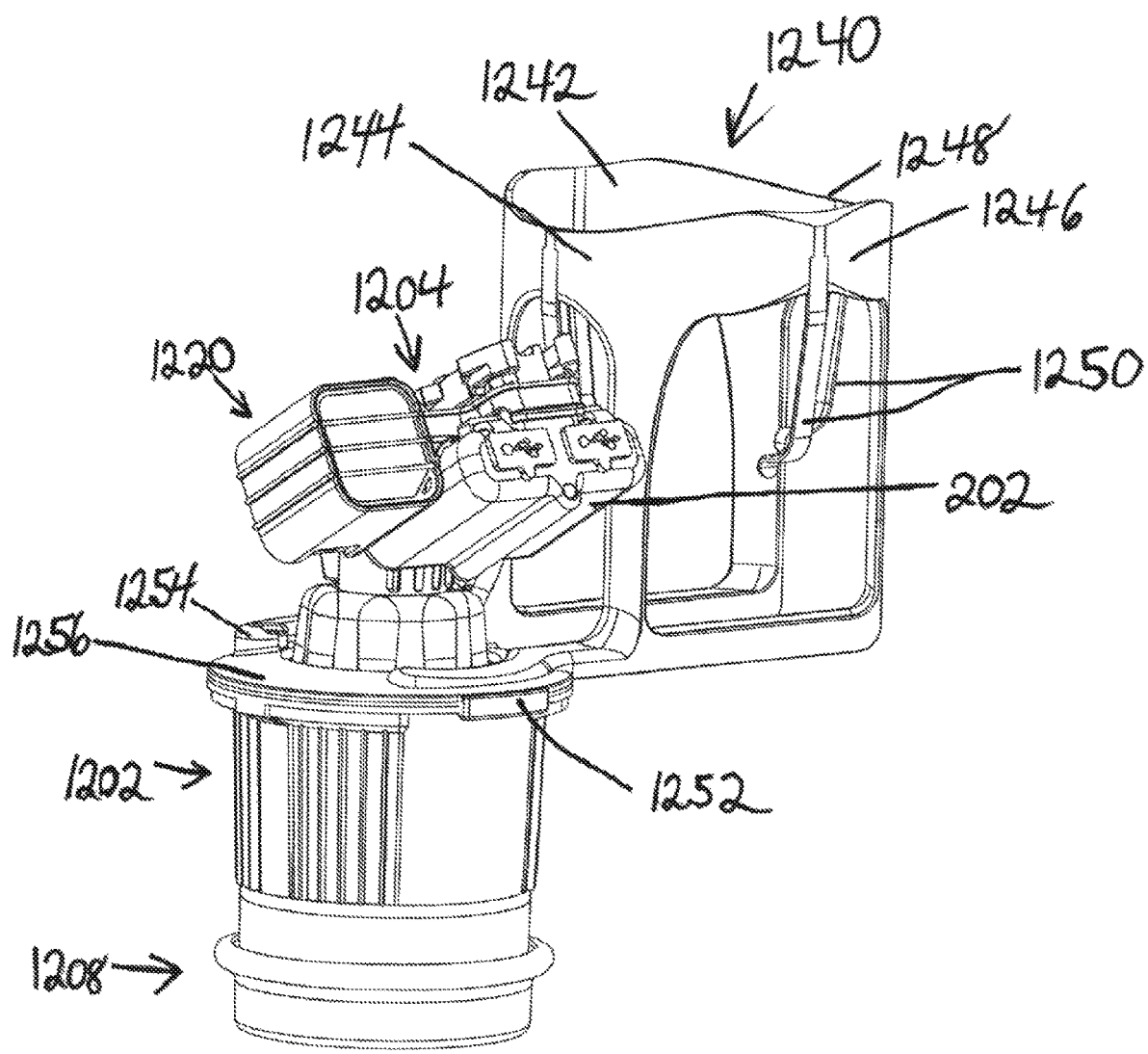
FIG. 33 is a perspective view of an embodiment of a support element with alternative additional elements.
Figure 34:
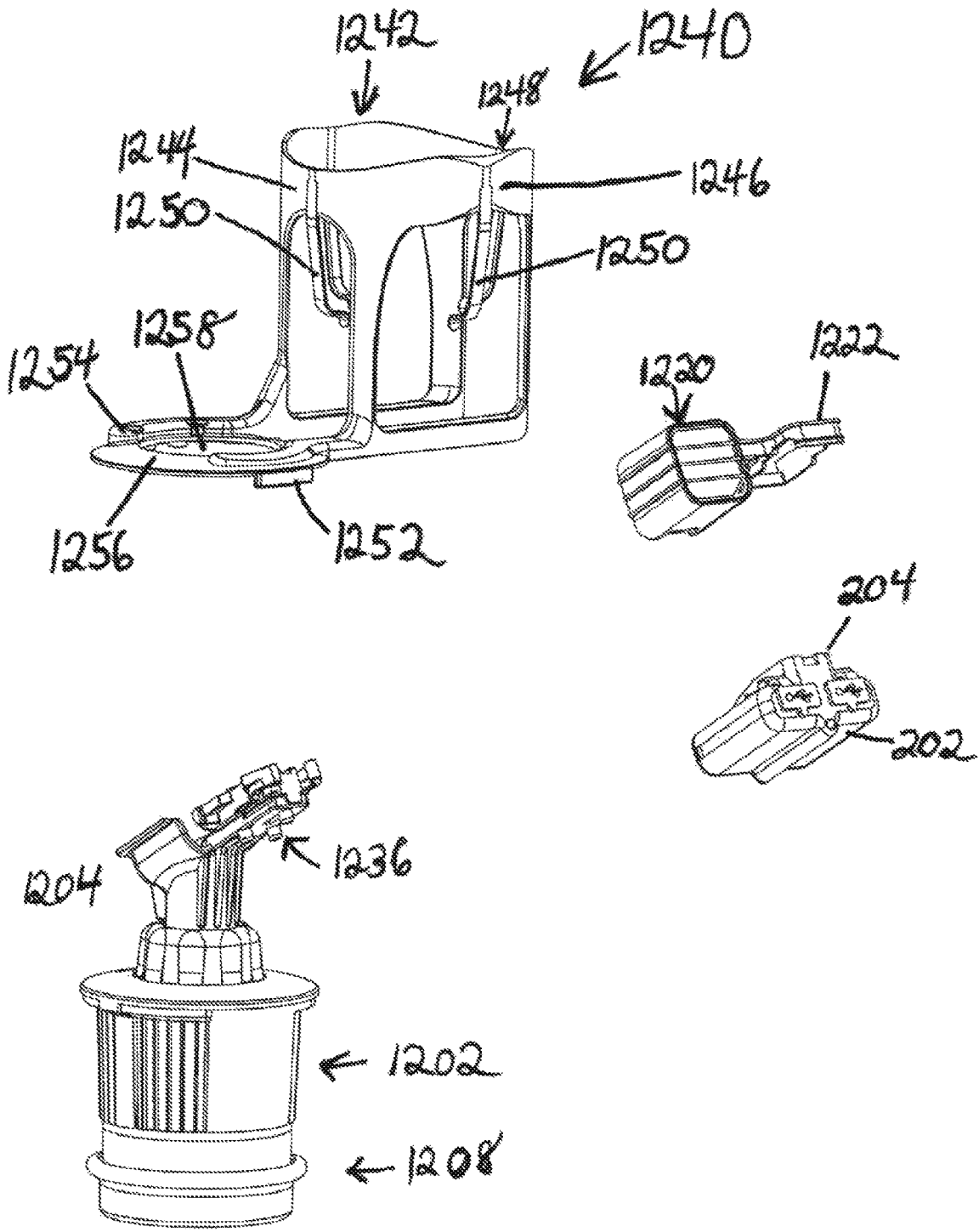
FIG. 34 is a partially exploded view of FIG. 33.

FIGS. 31 through 34 show assembled and exploded views of the base 1202 with additional features including an electronics port (shown as the charging apparatus 202 (discussed above)), a speaker 1220, a device holder 1224 and a cupholder 1240. FIGS. 31 and 32 respectively show assembled and exploded views of the base 1202 with the charging apparatus 202, the speaker 1220 and the device holder 1224. FIGS. 33 and 34 respectively show assembled and exploded views of the base 1202 with the charging apparatus 202, the speaker 1220 and the cupholder 1240.

In the embodiment shown in FIGS. 31 and 32, the base 1202 includes the attachment arm 1204 and the foot component 1208 discussed above. In addition, this embodiment includes the speaker 1220 with a speaker connection arm 1222 extending to one side of the speaker 1220. In this embodiment, the speaker connection arm 1222 includes a frame with an open middle configured to fit around the connection frame 204 on the top portion of the charging apparatus 202. The speaker connection arm 1222 is held in place by attaching the connection frame 204 to connecting elements 1236 on the attachment arm 124 with the speaker connection arm 1222 around the connection frame 1204. One skilled in the art will recognize that the connection frame 204 may be configured in other manners to facilitate attachment to the connecting elements 1236 and/or an air conditioning apparatus.

This embodiment includes one speaker 1220. Some embodiments may include any one or more of the speakers 1220. In some embodiments, the location of the speaker 1220 may be moved to different locations and/or may attach to the base 1202 through different connection mechanisms. One having ordinary skill in the art will understand that the arrangement, configuration, shape, size and/or other characteristics of speaker 1220 shown in this embodiment may vary and remain within the scope of the disclosure. In some embodiments, the speaker 1220 includes power cord, a port for a power cord and/or an internal power source. For example, a power cord may be including for connecting the speaker 1220 to the charging apparatus 202 to receive power.

In some embodiments, the speaker 1220 may be a wireless speaker that includes a wireless module to receive data (e.g. audio files, software, firmware, updates, etc.) over a communication standard, such as a near field communication. The wireless communication component could be a BLUETOOTH® communication module, a Wi-Fi communication module and/or another communication module. In some embodiments, the speaker 1220 may include an audio jack for connecting an audio source via a wire connection. In some embodiments, the charging apparatus 202 may be configured to facilitate power and/or audio communication to the speaker 1220.

During operation, a mobile phone, portable music player and/or other device may be operable to send music or other audio to the speaker 1220 in order to play the music or audio. In some embodiments, the speaker 1220 may be configured to play a ringtone so that the user will know there is an incoming call.

This embodiment also includes the device holder 1224 attached to the base 1202. The device holder 1224 includes a mounting bracket 1226 with attachment section 1228 and clip 1230. In some embodiments, the attachment section 1228 includes one or more guide holes for a connector, such as a bolt, screw, pin, snap and/or other connector. The top of the base 1202 may include corresponding holes and/or corresponding connection elements. For example, the base 1202 may include a connector extending upward that passes through the attachment section 1228 for connecting the two pieces together. In some embodiments, the attachment section 1228 may include downward projecting connection pieces (e.g. snaps, pins, etc.) that may engage or pass through a corresponding portion of the base 1202. In some embodiments, the base 1202 may not include predetermined connection features. In such embodiments, a user may add the connection features or during installation may create the corresponding feature. For example, a user may use a screw to connect the mounting bracket 1226 to the top of the base 1202, wherein as the screw is applied, it forms a hole into the base 1202.

The clip 1230 is located on an opposing side of the mounting bracket 1226 from the attachment section 1228. The clip 1230 is configured to wrap around the upper rim of the base 1202. When the attachment section 1228 is engaged to the opposing side of the base 1202, the clip 1230 operates to hold the side of the mounting bracket 1226 to the base 1202. When the attachment section 1228 is not engaged, the clip 1230 may be unclipped to pull the device holder 1224 from the base 1202. In some embodiments, the size, configuration and/or placement of the clip 1230 may vary. In addition, some embodiments may include more than one clip 1230 dispersed on the mounting bracket 1226.

In this embodiment, the mounting bracket 1226 includes an opening 1234 configured to allow the mounting bracket 1226 to fit the top of the base 1202 and allows the attachment arm 1204 to pass through the opening 1234. In some embodiments, the opening 1234 is configured to allow the mounting bracket 1226 to be added after the attachment arm 1204 is in place by passing around the attachment arm 1204 during the attachment process.

In this embodiment, the device holder 1224 includes a frame 1236 extending to the side of the mounting bracket 1226. The frame 1236 is configured to hold a device in the opening 1232 of the frame 1236. In some embodiments, the frame 1236 is configured to hold a mobile communication device, such as a mobile phone, a tablet or another communication device. In some embodiments, the frame 1236 may be configured to hold other devices, such as audio players, and/or other things, such as notepads, scoresheets, snacks and/or other things. In some embodiments configured to hold mobile communication devices, the design of the frame 1236 may be configured to allow a cable to attach to the device (e.g. a charging cable, audio cable, etc.). In some embodiments, the configuration of the frame 1236 may include openings to allow a user to operate the device in the frame 1236.

In the embodiment shown in FIGS. 33 and 34, the base 1202 includes the attachment arm 1204 and the foot component 1208 discussed above. In addition, this embodiment includes the speaker 1220 with the charging apparatus 202 discussed above. In addition to these common components with the embodiment from FIGS. 31 and 32, this embodiment also includes the cupholder 1240 attached to the base 1202.

The cupholder 1240 includes a mounting bracket 1256 with attachment section 1254 and clip 1252. In some embodiments, the attachment section 1254 includes one or more guide holes for a connector, such as a bolt, screw, pin, snap and/or other connector. The top of the base 1202 may include corresponding holes and/or corresponding connection elements. For example, the base 1202 may include a connector extending upward that passes through the attachment section 1254 for connecting the two pieces together. In some embodiments, the attachment section 1254 may include downward projecting connection pieces (e.g. snaps, pins, etc.) that may engage or pass through a corresponding portion of the base 1202. In some embodiments, the base 1202 may not include predetermined connection features. In such embodiments, a user may add the connection features or during installation may create the corresponding feature. For example, a user may use a screw to connect the mounting bracket 1256 to the top of the base 1202, wherein as the screw is applied, it forms a hole into the base 1202.

The clip 1252 is located on an opposing side of the mounting bracket 1256 from the attachment section 1254. The clip 1252 is configured to wrap around the upper rim of the base 1202. When the attachment section 1254 is engaged to the opposing side of the base 1202, the clip 1252 operates to hold the side of the mounting bracket 1256 to the base 1202. When the attachment section 1254 is not engaged, the clip 1252 may be unclipped to pull the cupholder 1240 from the base 1202. In some embodiments, the size, configuration and/or placement of the clip 1252 may vary. In addition, some embodiments may include more than one clip 1252 dispersed on the mounting bracket 1256.

In this embodiment, the mounting bracket 1256 includes an opening 1258 configured to allow the mounting bracket 1256 to fit the top of the base 1202 and allows the attachment arm 1204 to pass through the opening 1258. In some embodiments, the opening 1258 is configured to allow the mounting bracket 1256 to be added after the attachment arm 1204 is in place by passing around the attachment arm 1204 during the attachment process.

In this embodiment, the cupholder 1240 includes a frame for holding a cup extending to the side of the mounting bracket 1256. The frame is shown with four frame sections 1242, 1244, 1246 and 1248 dimensioned fit around the cup. In some embodiments, the frame may include one or more frame sections 1242, 1244, 1246 and 1248.

The frame sections 1242, 1244, 1246 and 1248 may include bottom elements in some embodiments to support the base of a cup. In some embodiments, the frame may include a bottom section. In some embodiments, the frame sections 1242, 1244, 1246 and 1248 are configure to hold the sides of a cup, supporting the cup without a bottom section.

In some embodiments, the frame may be a cylindrical shape with each frame section 1242, 1244, 1246 and 1248 comprising a portion of the side walls. In some embodiments, the frame is conical in shape with the top wider than the bottom. In some embodiments, the shape of the frame has varies at different points. For example, the frame may be round at the top and become rectangular at the bottom.

In some embodiments, the cupholder 1240 includes a series of flexible prongs 1250 dispersed around the frame which are biased inward of the frame dimensions to apply pressure to the exterior of any cup placed in the cupholder 1240. In some embodiments, each frame section 1242, 1244, 1246 and 1248 includes one of the prongs 1250. The embodiment shown includes one prong 1250 in each of the frame sections 1242, 1244, 1246 and 1248. The top of each prong 1250 is attached to the upper portion of the frame section 1242, 1244, 1246 and 1248. Each prong 1250 extends downward and has an inward bend. In some embodiments, the material of each prong 1250 is resilient to provide flexibility to the prong. In some embodiments, the prong 1250 may be designed with a flexible configuration, such as a flexible material or a flexible feature (e.g. a spring) at the location of the inward bend.

In some embodiments, the additional features are designed to connect near the base 1202 in order to provide a low center of gravity relative to the base. Lowering the center of gravity for the assembly including the base, an attached air conditioning component and any additional elements helps improve the stability of the assembly when in use.

Embodiments may include a base for supporting an air conditioning apparatus having a support component and a foot component. The support component may include a top portion above a bottom portion along a vertical axis. Embodiments of the top portion may be wider along a horizontal axis than the bottom portion and configured to facilitate support of the air conditioning apparatus above the base. The bottom portion may be configured to fit within a cupholder. Embodiments of a foot component may be configured to fit around the bottom portions and fit within the cupholder. The foot component may include a bottom surface and a side wall which includes a protrusion. When installed, the protrusion may be configured to compress between the cupholder and the bottom portion of the support component to form a connection between the base and the cupholder.

In some embodiments of the base, the foot component narrows from a top of the side wall to the bottom surface. The bottom diameter of the bottom portion may be larger than a diameter of the bottom surface between opposing interior surfaces of the side wall. Embodiments of the protrusion may include a lip located at the top of the side wall. In some embodiments, the foot component includes a plurality of the protrusions on the side wall. Each of the plurality of protrusions may be elliptical.

Embodiments may include a supporting assembly for an air conditioning apparatus having a base, an attachment arm and an accessory component. The base may have a top and a bottom section configured to fit within a cupholder. The attachment arm may extend from the top of the base and be configured to connect to the air conditioning apparatus. Embodiments of the accessory component may include at least one of an electronics port, a speaker, a device holder and/or a cupholder.

Some embodiments of the supporting assembly may include the electronics port and the speaker. The electronics port may include a connection frame configured to connect to the attachment arm. The speaker may include a speaker connection arm configured to fit the connection frame. In such embodiments, the connection frame may facilitate a connection of the electronics port and the speaker to the attachment arm.

In some embodiments of the supporting assembly, the accessory component may include a mounting bracket configured to attach to the top of the base. The mounting bracket may include an attachment section and a clip on an opposing side of the mounting bracket. The clip may be configured to fit over an outer edge of the top of the base. The attachment section may be configured to facilitate a structural connection between the mounting bracket and the base. Embodiments of the mounting bracket may support the device holder on a side of the base sufficient to clear the air conditioning apparatus. Embodiments of the mounting bracket may support the cupholder on a side of the base sufficient to clear the air conditioning apparatus.

The invention being thus described and further described in the claims, it will be obvious that the same may be varied in many ways. Such variations are not to be regarded as a departure from the spirit and scope of the invention and all such modifications as would be obvious to one skilled in the art are intended to be included within the scope of the apparatus, system and method described.

The invention claimed is:

1. An electric air conditioning apparatus comprising:
a housing having an air inlet and an air outlet;
a user interface on an external surface of the housing;
a power input configured to facilitate an electric connection to an external battery;
a fan within the housing between the air inlet and the air outlet configured to move air through said housing from the air inlet to the air outlet;
a heater core within said housing between the air inlet and the air outlet, wherein said fan moves air through said heater core, said heater core comprising:
a control module operably connected to said power input, said user interface and said fan, and configured to operate said electric air conditioning apparatus based on an operation input received through said user interface,
a first PTC heater operably connected to said control module,
a second PTC heater in a stacked configuration with said first PTC heater and operably connected to said control module, wherein during operation said fan is configured to move air through said first PTC heater and said second PTC heater serially and said control module is configured to control the operation of said first PTC heater separate from said second PTC heater; and
wherein, when said operation input is received, said control module staggers application of power to said first PTC heater and to said second PTC heater, wherein said application of power is configured to limit overall power loss during start-up of the first PTC heater and second PTC heater.

2. The electric air conditioning apparatus according to claim 1, comprising an optical sensor operably connected to said control module, wherein said optical sensor is configured to sense distance to an object and said control module modifies the operation of said electric air conditioning apparatus based upon a determination of whether the distance to said object indicates that a user is present.

3. The electric air conditioning apparatus according to claim 2, wherein said control module turns the air conditioning apparatus off when said determination indicates that the user is not present and turns the air conditioning apparatus on when said determination indicates that the user is present.

4. The electric air conditioning apparatus according to claim 1, comprising a plurality of PTC heaters with a first row of PTC heaters including said first PTC heater and a second row of PTC heaters including said second PTC heater, wherein said first row of PTC heaters and said second row of PTC heaters are in a stacked configuration, and wherein, when said operation input is received, said control module applies power to said first row of PTC heaters and separately to said second row PTC heaters, wherein said application of power is configured to limit overall power loss during start-up of said plurality of PTC heaters.

5. The electric air conditioning apparatus according to claim 1, comprising a visual output configured to indicate an operational state of said electric air conditioning apparatus.

6. The electric air conditioning apparatus according to claim 5, wherein said visual output is a light emitting diode.

7. The electric air conditioning apparatus according to claim 1, wherein said electric air conditioning apparatus is configured to include a first heat setting and a second heat setting, wherein said user interface is operable to select either said first heat setting and said second heat setting, and wherein during operation at said first heat setting, said control module turns on said first PTC heater and does not turn on said second PTC heater, and during operation at said second heat setting, said control module turns on said first PTC heater and said second PTC heater.

8. The electric air conditioning apparatus according to claim 7, wherein said control module is configured to limit operation at said second heat setting by turning off said second PTC heater after reaching a threshold parameter.

9. The electric air conditioning apparatus according to claim 8, wherein said threshold parameter is at least one of an amount of time, a temperature and/or a battery charge level.

10. The electric air conditioning apparatus according to claim 1, wherein said electric air conditioning apparatus is configured to shut off when a charge level of said external battery falls below a threshold charge level.

11. The electric air conditioning apparatus according to claim 1, comprising a support assembly configured to connect said housing to a structure.

12. The electric air conditioning apparatus according to claim 11, wherein said support assembly is configured to fit in a cupholder of an electric vehicle.

13. The electric air conditioning apparatus according to claim 12, wherein said support assembly includes an attachment arm configured to connect to said housing and hold said housing at an angle towards a seat of said electric vehicle.

14. The electric air conditioning apparatus according to claim 11, wherein said support assembly is configured to fixedly mount to an electric vehicle.

15. The electric air conditioning apparatus according to claim 11, wherein said support assembly houses a cooling component configured to facilitate cooling the air in said housing.

16. The electric air conditioning apparatus according to claim 15, wherein said cooling component is at least one of a pump and/or a cooling fan.

17. The electric air conditioning apparatus according to claim 1, wherein said electric air conditioning apparatus is portable.

18. The electric air conditioning apparatus according to claim 1, comprising a misting system, wherein said misting system supplies a mist into the air.

19. An electric air conditioning apparatus comprising:
a housing having an air inlet, an air outlet and a mounting element connectable to a support structure;
a vent assembly in said air outlet;
a user interface on an external surface of the housing;
a power input configured to facilitate an electric connection to an external battery;
a fan within the housing between the air inlet and the air outlet configured to move air through said housing from the air inlet to the air outlet;
a heater core within said housing between the air inlet and the air outlet, wherein said fan moves air through said heater core, said heater core comprising:
a control module operably connected to said power input, said user interface and said fan, and configured to operate said electric air conditioning apparatus based on an operation input received through said user interface,
a first PTC heater operably connected to said control module,
a second PTC heater in a stacked configuration with said first PTC heater and operably connected to said control module, wherein during operation said fan is configured to move air through said first PTC heater and said second PTC heater serially and said control module is configured to control the operation of said first PTC heater separate from said second PTC heater; and wherein, when said operation input is received, said control module staggers application of power to said first PTC heater and to said second PTC heater, wherein said application of power is configured to limit overall power loss during start-up of the first PTC heater and second PTC heater.

20. The electric air conditioning apparatus according to claim 19, comprising an optical sensor in the external surface of the housing operably connected to said control module, wherein said optical sensor is configured to sense distance to an object and said control module modifies the operation of said electric air conditioning apparatus based upon a determination of whether the distance to said object indicates that a user is present.

* * * * *